United States Patent [19]

Okumura et al.

[11] Patent Number: 5,428,457
[45] Date of Patent: Jun. 27, 1995

[54] IMAGE COMMUNICATION APPARATUS

[75] Inventors: Takahito Okumura, Ueda; Hikaru Fukuda, Nagano; Hitoshi Kuga, Ueda; Yutaka Nitta, Nagano, all of Japan

[73] Assignee: Matsushita Graphic Communication Systems, Inc., Tokyo, Japan

[21] Appl. No.: 899,527

[22] Filed: Jun. 15, 1992

[30] Foreign Application Priority Data

Jun. 18, 1991 [JP] Japan .................. 3-145880

[51] Int. Cl.6 .............................. H04N 1/00
[52] U.S. Cl. .................. 358/403; 358/404; 358/468; 379/100
[58] Field of Search ........... 358/403, 408, 404, 444, 358/468, 442; 379/100

[56] References Cited

U.S. PATENT DOCUMENTS

| | | | |
|---|---|---|---|
| 4,746,986 | 5/1988 | Tanigawa | 358/442 |
| 4,809,297 | 2/1989 | Polansky et al. | 358/400 |
| 4,825,461 | 4/1989 | Kurita et al. | 379/100 |
| 4,935,955 | 6/1990 | Neudorfer | 379/100 |
| 4,964,154 | 10/1990 | Shimotono | 358/442 |
| 4,989,238 | 1/1991 | Iggulden et al. | 379/100 |
| 5,050,005 | 9/1991 | Kagami | 358/434 |
| 5,068,888 | 11/1991 | Scherk et al. | 358/403 |
| 5,084,770 | 1/1992 | Nakayama | 358/403 |
| 5,095,373 | 3/1992 | Hisano | 358/403 |
| 5,144,650 | 9/1992 | Kiguchi | 379/100 |
| 5,146,488 | 9/1992 | Okada et al. | 379/100 |
| 5,170,266 | 12/1992 | Marsh et al. | 358/403 |
| 5,191,604 | 3/1993 | Shigeeda | 379/100 |
| 5,276,687 | 1/1994 | Miyamoto | 379/100 |

FOREIGN PATENT DOCUMENTS 1-280961 11/1989 Japan .
3-155276 7/1991 Japan .

*Primary Examiner*—Scott A. Rogers
*Assistant Examiner*—Thomas L. Stoll
*Attorney, Agent, or Firm*—Lowe, Price, LeBlanc & Becker

[57] ABSTRACT

An image communication apparatus includes a plurality of communication units each for performing communication. A first control device serves to generate and control communication jobs of executing communications of image information by the respective communication units, and serves to generate and control a sequence of the communication jobs in accordance with types of the communication units. A second control device serves to perform processes by which the communication units independently start and end the communication jobs generated by the first control device.

3 Claims, 43 Drawing Sheets

COMMUNICATION UNIT
SELECTING INFORMATION

LINE TYPE INFORMATION

| | | DIAL TYPE DP/PB | F LINE FUNCTION ABSENT/ PRESENT | EXCLUSIVE LINE FUNCTION ABSENT/ PRESENT | FOR RECEPTION ONLY | NETWORK |
|---|---|---|---|---|---|---|
| COMM UNIT 1 | LINE WIRE 1 | | | ╲ | | |
| COMM UNIT 2 | LINE WIRE 2 | | | ╲ | | |
| COMM UNIT 1 | EXTEN-SION 1 | | ╲ | ╲ | | |
| COMM UNIT 2 | EXTEN-SION 2 | | ╲ | | | |

134

IMAGE COMMUNICATION APPARATUS

BACKGROUND OF THE INVENTION

1. Field of the Invention

This invention generally relates to an apparatus for providing communication of image information via a line.

2. Description of the Prior Art

Some of prior-at image communication apparatus or facsimile machines connected to a telephone line have a single communication unit which sequentially processes communication jobs for transmitting or receiving image information. The prior-art apparatus also has an operation panel, a display panel, and a telephone set. The display panel is located near the operation panel. In general, the display panel indicates current communication conditions of the apparatus. When the operator executes an operation of communication reservations which generate communication jobs, the display panel is changed so as to indicate information related to the operation of communication reservations. Furthermore, in cases where telephone-set reservations are instructed during the execution of communication of image information, speech communication by the telephone set is enabled after the completion of the communication of image information.

The prior-art image communication apparatus have problems as follows. Since it is difficult to process two or more communication jobs at once, a long time tends to be spent in the execution of communication jobs if the number of communication jobs is large. A long time is also spent by a job of transmitting same image information to many destinations. Even in the case of communication jobs related to a common communication destination, since the communication jobs are processed independently of each other and the connection and disconnection of the apparatus to and from the telephone line are executed every communication job, the efficiency of communication tends to be low.

SUMMARY OF THE INVENTION

It is an object of this invention to provide an improved image communication apparatus.

A first aspect of this invention provides an image communication apparatus comprising a plurality of communication units each for performing communication; first control means for generating and controlling communication jobs of executing communications of image information by the respective communication units, and for generating and controlling a sequence of the communication jobs in accordance with types of the communication units; and second control means for performing processes by which the communication units independently start and end the communication jobs generated by the first control means.

A second aspect of this invention provides an image communication apparatus comprising a communication unit for performing communication; input means for inputting a level of priority concerning the communication performed by the communication unit; and control means for connecting the communication priority level inputted by the input means with image information and generating and controlling a communication job, and for performing processes by which the communication unit starts and ends the communication job; wherein the control means is operative to vary the priority level in accordance with conditions of execution of processing of the communication job.

A third aspect of this invention provides an image communication apparatus comprising a plurality of communication units each for executing communication of image information; and means for simultaneously activating the communication units to simultaneously execute different communications of image information.

DESCRIPTION OF THE FIRST PREFERRED EMBODIMENT

Hardware Design

Figure 1:
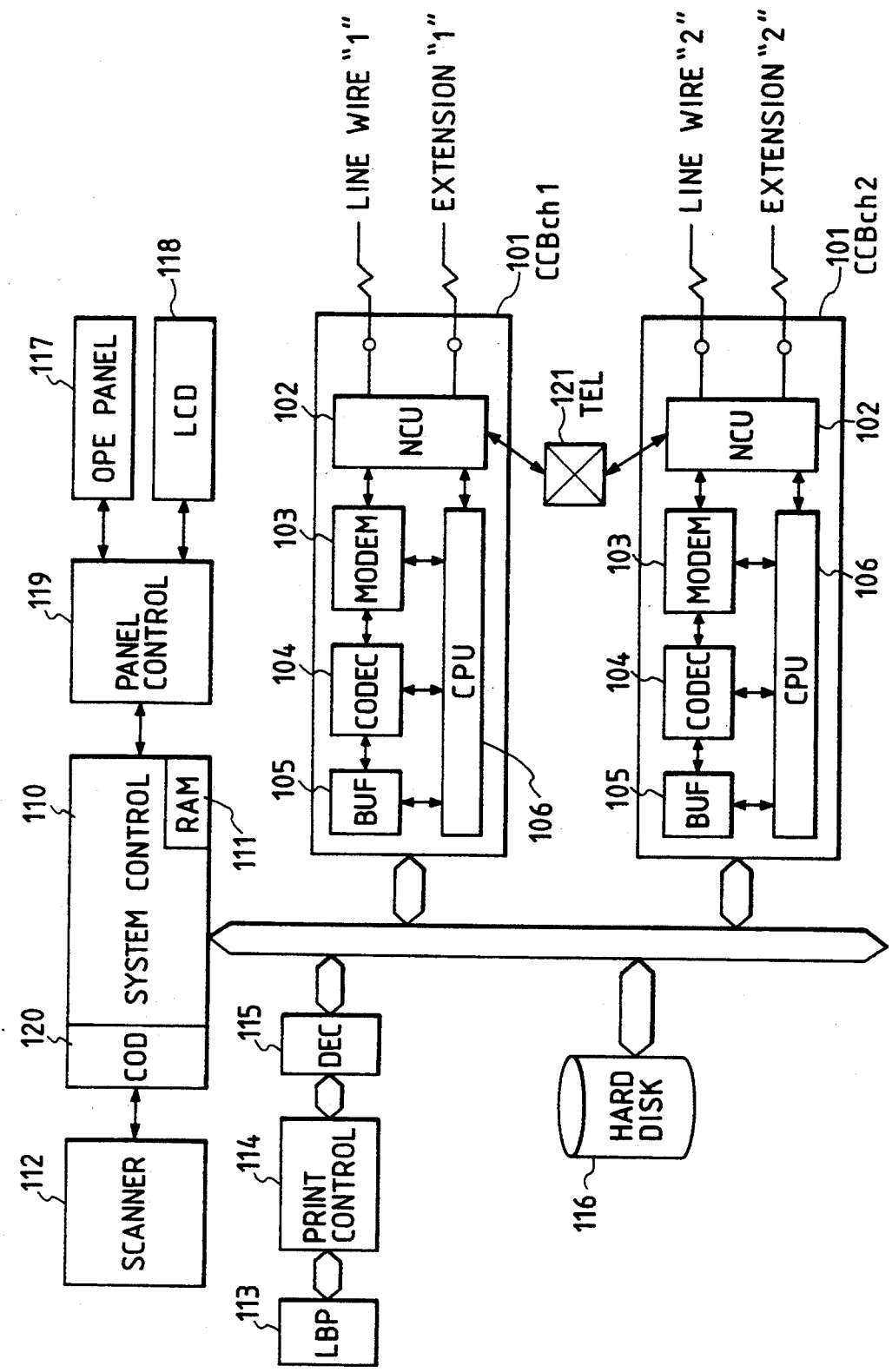
FIG. 1 is a block diagram of an image communication apparatus according to a first embodiment of this invention.

With reference to FIG. 1, an image communication apparatus includes two communication units 101 which can operate independently of each other. In some cases, the communication units are denoted by CCBch1 and CCBch2 respectively.

The communication units 101 have similar structures. Each of the communication units 101 includes a combination of a network control unit (NCU) 102, a modem 103, a coder and decoder unit (CODEC) 104, a buffer 105, and a controller 106. The network control unit 102 serves to control a line network and the connection with a telephone set 121. The modem 103 serves to modulate and demodulate a communication signal. The coder and decoder unit 104 serves to code image information and to decode coded image information. The buffer 105 serves to temporarily store transmitted information and received information. The devices 102–105 are controlled by the controller 106. The controller 106 includes a combination of a CPU, a ROM, and a RAM. The controller 106 operates to control communication in accordance with a program stored in the ROM.

A line wire "1" and an extension (a private line) "1" are connected to the communication unit CCBch1. A line wire "2" and an extension (a private line) "2" are connected to the communication unit CCBch2. The communication units 101 can operate independently to execute communication.

The image communication apparatus also includes a system controller 110, a decoder 115, and a hard disk device 116. These devices 110, 115, and 116, and the communication units 101 are mutually connected by a bus. The system controller 110 includes a combination of a CPU, a ROM, a RAM 111, and an I/O section. The I/O section has a coder 120. The system controller 110 operates in accordance with a program stored in the ROM. The system controller 110 serves to control respective sections of the image communication apparatus and to generate and control communication jobs. A working storage area (a work area) for the system controller 110 is provided in the RAM 111. A scanner 112 connected to the coder 120 in the system controller 110 serves to convert an image of documents into a corresponding electric image signal. The coder 120 serves to code the output image signal of the scanner 112. An operation panel 117 and a liquid crystal display panel 118 are connected to the system controller 110 via a panel controller 119. The operator can instructs communication reservations and telephone-set reservations by actuating the operation panel 117 and monitoring the liquid crystal display panel 118. The panel controller 119 serves to control output signals of the operation panel 117 and the contents of information indicated by the liquid crystal display panel 118. A laser beam printer (LBP) 113 is connected to the decoder 115 via a printer controller 114. The decoder 115 serves to decode a received image code into corresponding image data which is fed to the printer controller 114. The printer controller 114 serves to control the laser beam printer 113 in response to the image data so that an image corresponding to the image data will be printed on a sheet by the laser beam printer 113. Storage areas for image information and control information can be provided in the hard disk device 116.

Communication Job Management

The system controller 110 serves to control various processes and actions while a job is used as unit. Blocks of information for executing and controlling jobs are placed on the hard disk device 116 in correspondence with the jobs. The information is read out from the hard disk device 116, and is transmitted to the RAM 111 if required jobs which wait to be executed compose cues for the respective job types, and a table for managing the cues is placed on the RAM 111.

Figure 2:
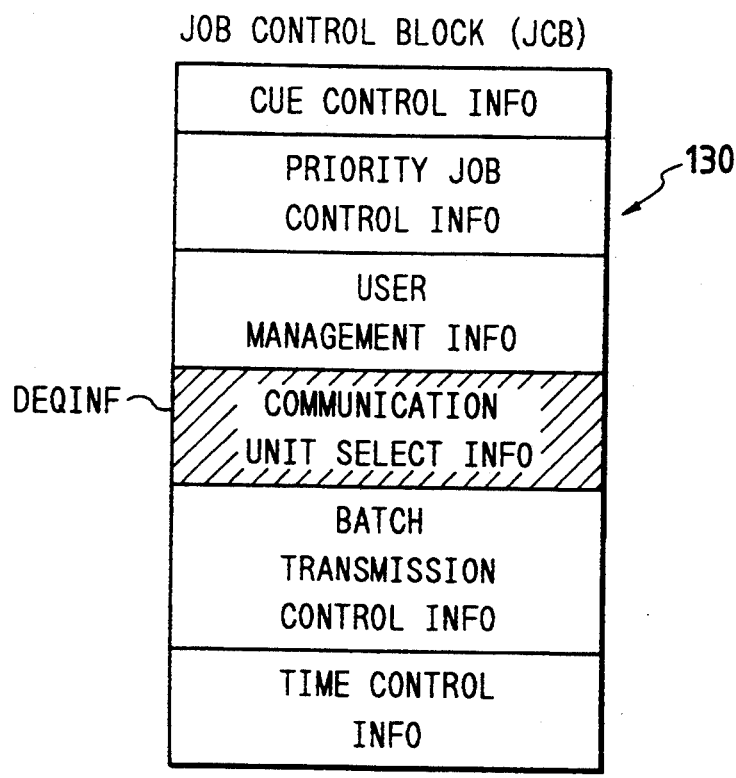
FIG. 2 is a diagram showing the structure of a job control block (JCB).
Figure 4:
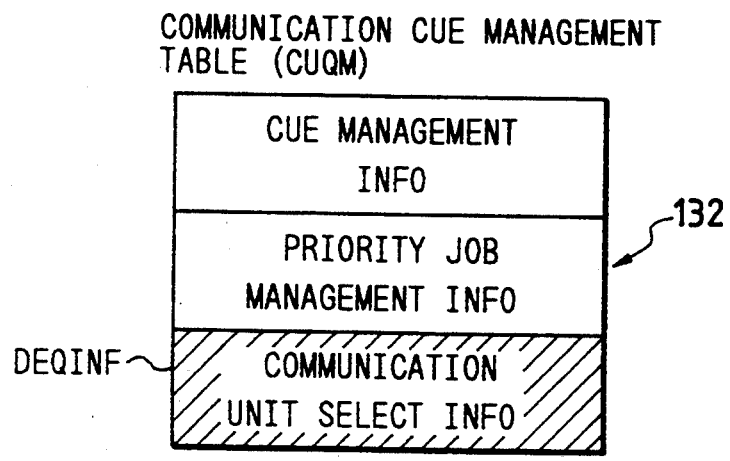
FIG. 4 is a diagram showing the structure of a communication cue management table (CUQM).
Figure 3:
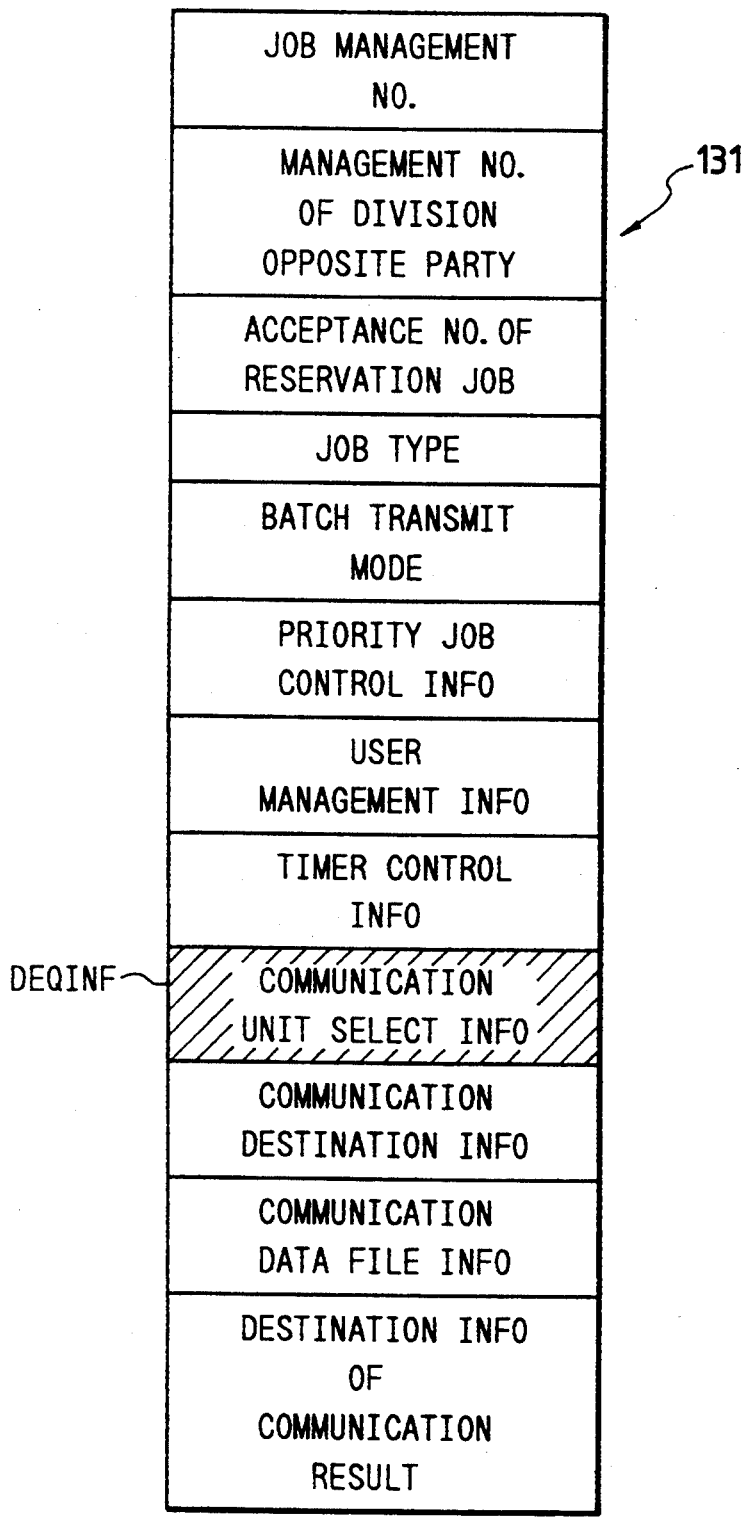
FIG. 3 is a diagram showing the structure of a job information block (JIB).

With respect to communication jobs for transmission (which includes repeating transmission) and polling reception, a job control block (referred to as a JCB hereinafter) 130 and a job information block (referred to as a JIB hereinafter) 131 are generated for each job. The JCB 130 has contents as shown in FIG. 2. The JIB 131 is fixedly linked with the JCB 130, and has contents such as shown in FIG. 3. Communication jobs which can be executed and which wait to be executed compose a communication cue, and a table 132 for managing the communication cue is generated. The communication cue managing table 132 has contents such as shown in FIG. 4.

As shown in FIG. 2, information in a JCB 130 includes "cue control information" which is a pointer to a communication job linked subsequently to the present communication job on the communication cute, "priority job control information" which indicates a priority level and also indicates whether or not priority designation regarding the present communication job exists, "communication unit selecting information" (referred to as DEQINF hereinafter) which indicates the possibilities of use of the respective communication units 101 with respect to the present communication job, "batch transmission control information" which relates to a batch transmission process described later, and "timer control information" for managing timers regarding the present communication job.

As shown in FIG. 3, the contents of a JIB 131 contain information similar to the information in a JCB 130 and also pieces of other information such as "a job type" and "a job management number" used for managing the related communication job, "a management number of a job of a division opposite party" into which a management number of the other divisional job divided from a communication job is set in cases where the related communication job is a divisional job, "a receipt number of a reservation job" which is set upon reservation in cases where the related communication job is given by communication reservations, "communication destination information" into which information of one or more communication destinations is set, "communication result destination information" into which a destination regarding a communication result report is set in cases where communication ends with an error, and "communication data file information" into which a file size and a pointer of a communication data file on the hard disk device 116 are set.

Figure 5:
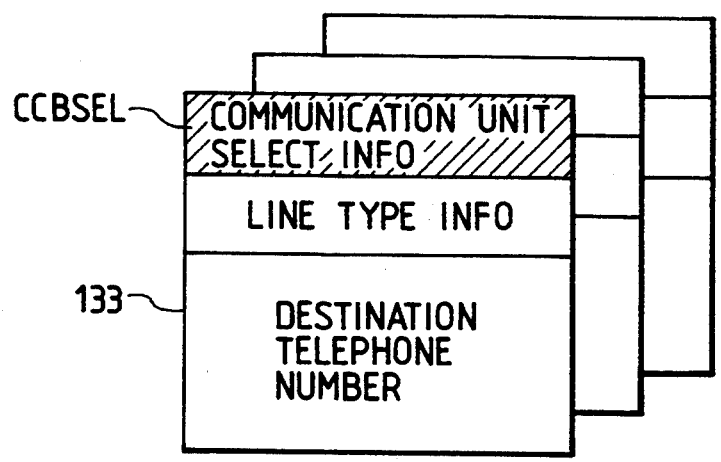
FIG. 5 is a diagram showing the structure of destination information.
Figure 6:
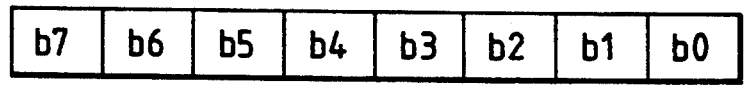
FIG. 6 is a diagram showing the bit structure of communication unit selecting information (CCBSEL, DEQINF).
Figure 7:
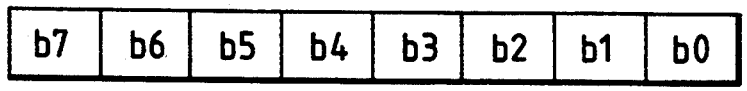
FIG. 7 is a diagram showing the bit structure of line type information.
Figure 8:
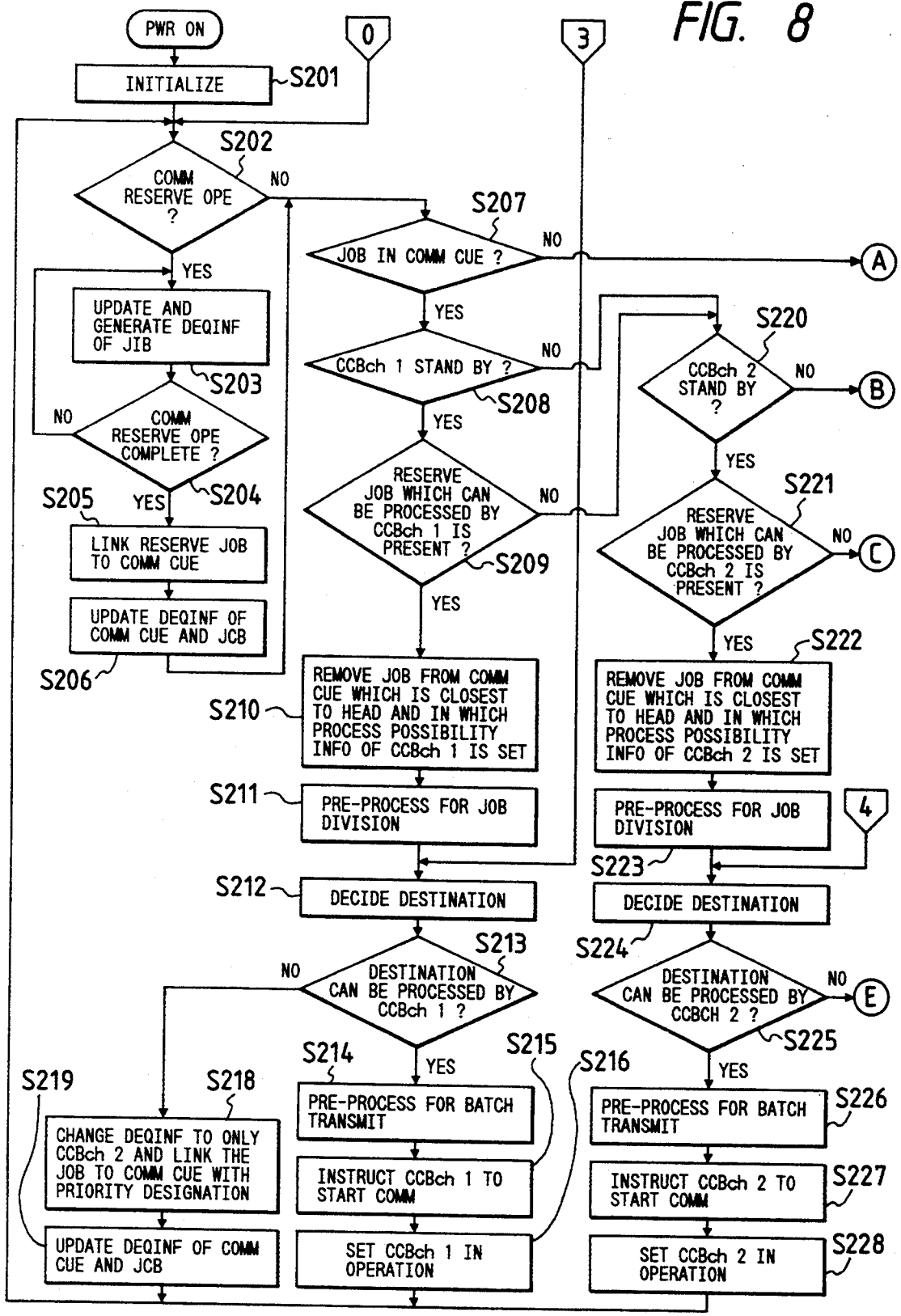
FIGS. 8–12 are a flowchart of the entire processing operation of the image communication apparatus of FIG. 1.
Figure 9:
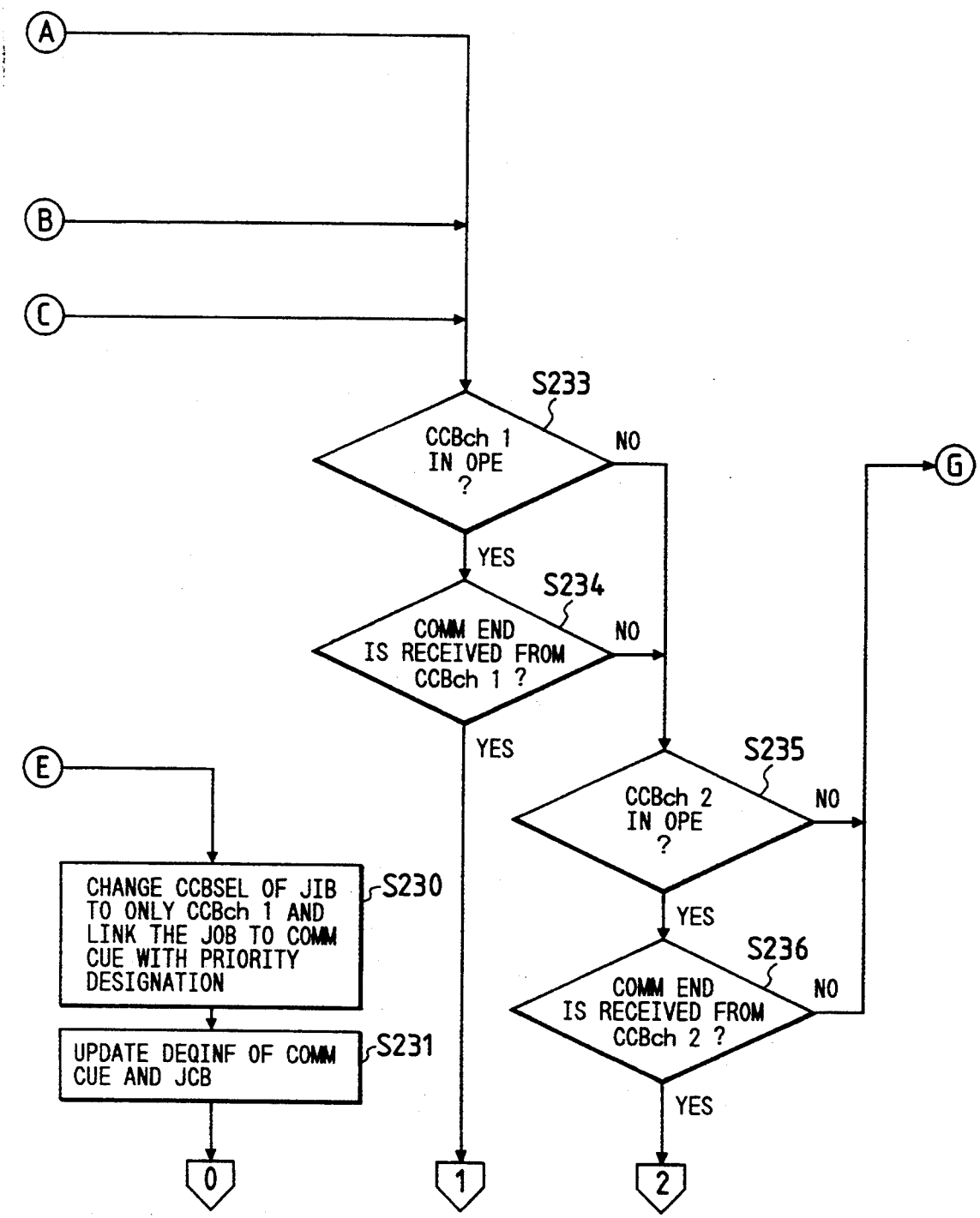
Figure 10:
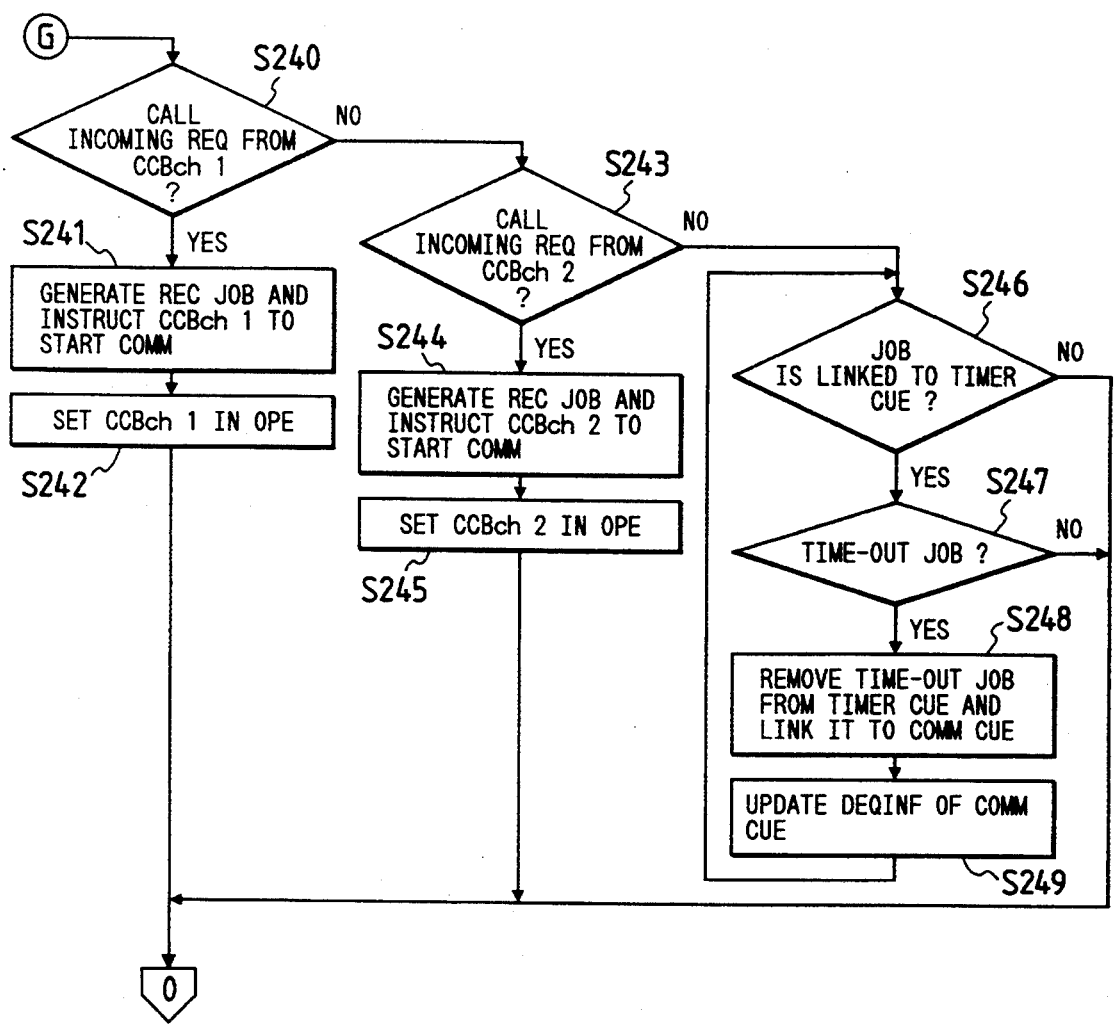
Figure 11:
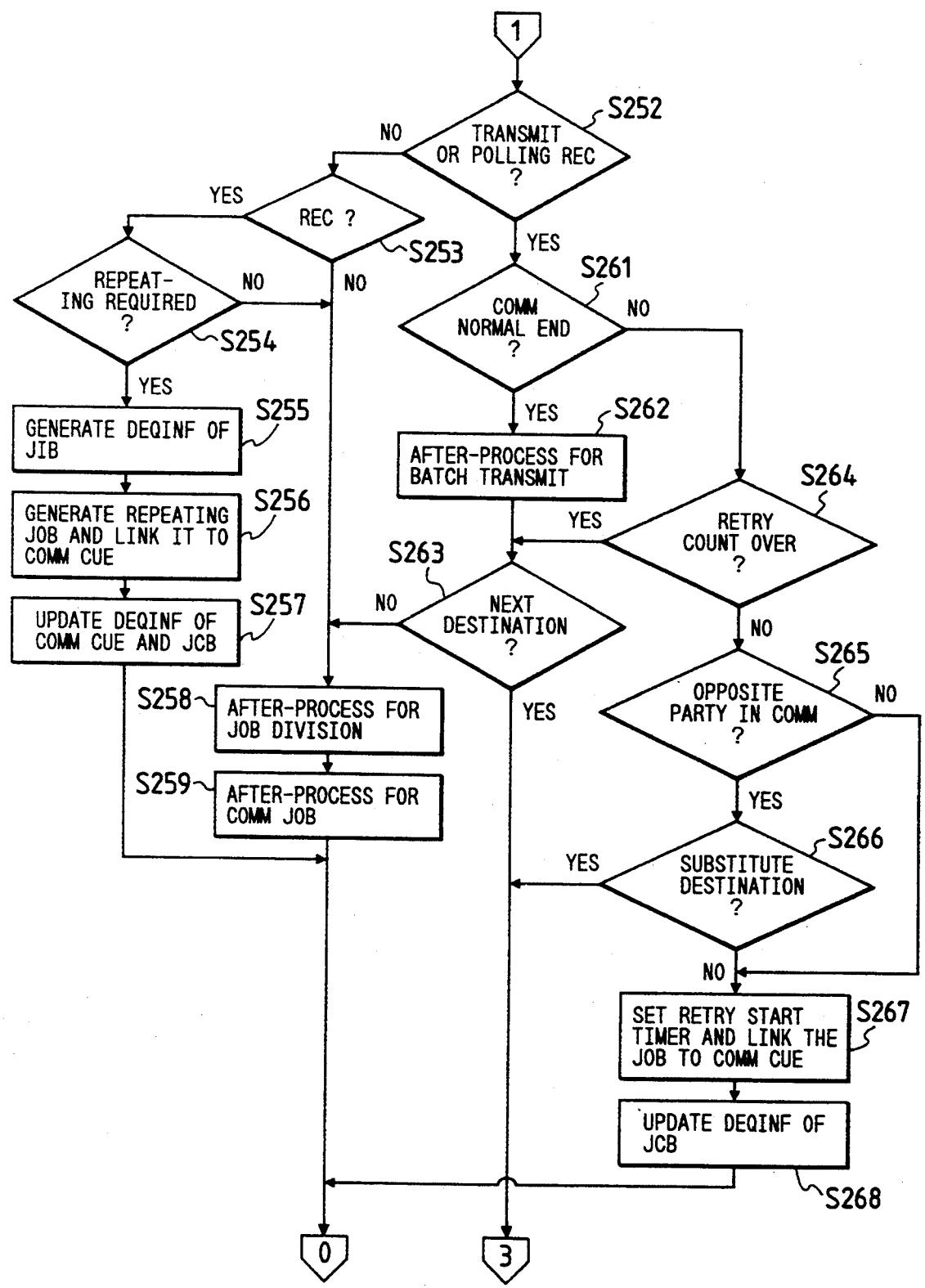
Figure 12:
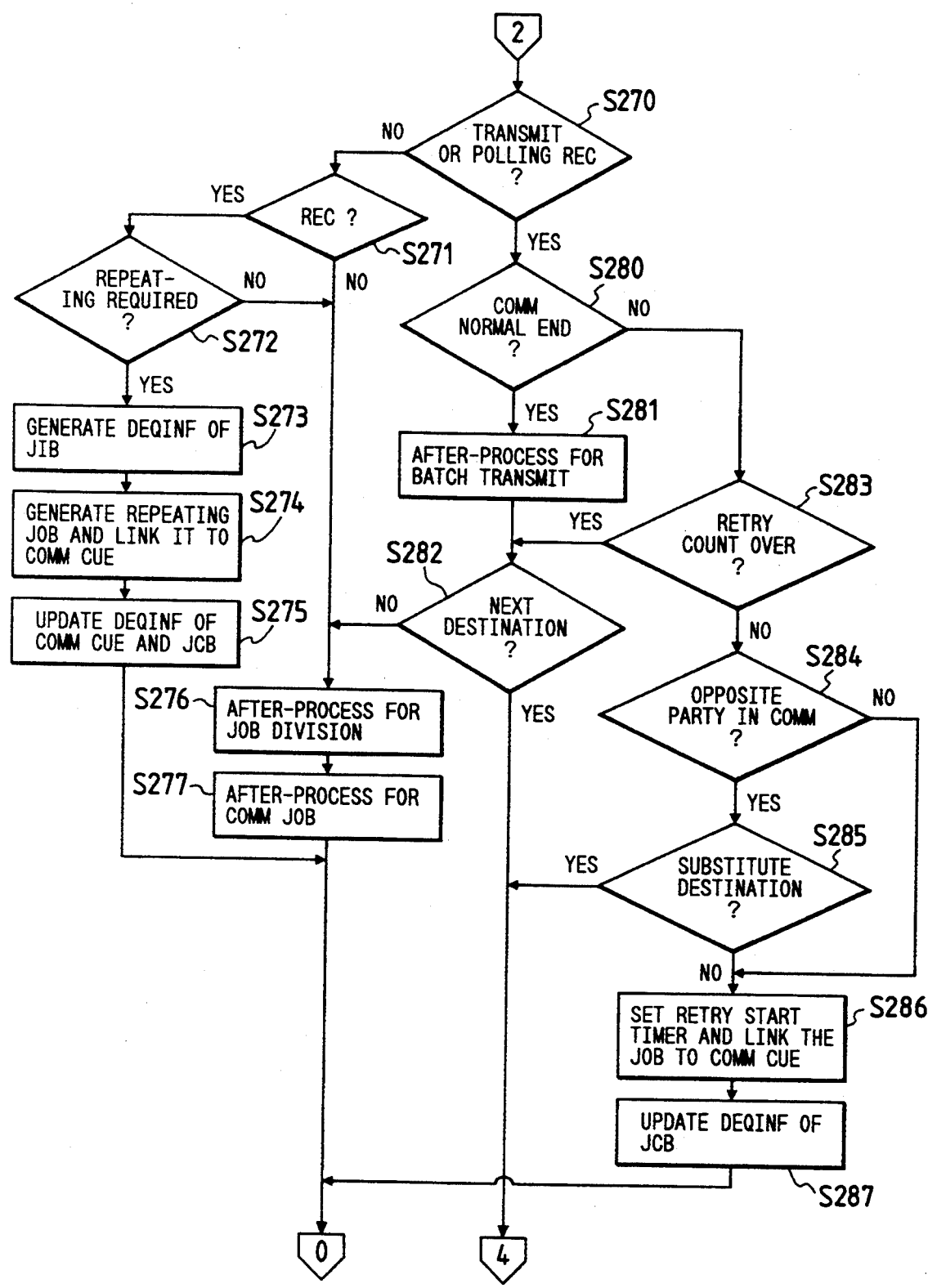

As shown in FIG. 5, the contents of information of each destination which is set in "the communication destination information" of a JIB 131 include "the telephone number of the destination", "information of a line type", and "communication unit selecting information" (referred to as CCBSEL). The CCBSEL has a format such as shown in FIG. 6. The CCBSEL has eight bits b0–b7. The two lower bits b1 and b0 of the CCBSEL indicate whether or not the CCBch1 and the CCBch2 can be used for communication regarding the related destination. Specifically, the bit b0 being "0" indicates that the CCBch1 can not be used. The bit b0 being "1" indicates that the CCBch1 can be used. The bit b1 being "0" indicates that the CCBch2 can not be used. The bit b1 being "1" indicates that the CCBch2 can be used. The line type information has a format such as shown in FIG. 7. The line type information has eight bits b0–b7. The two lower bits b1 and b0 of the line type information indicate which of a line wire, an extension (a private line), and an exclusive line the related communication destination concerns. Specifically, the bits b1 and b0 being "00" indicate that the related communication destination concerns the line wire. The bits b1 and b0 being "01" indicate that the related communication destination concerns the extension (the private line). The bits b1 and b0 being "10" indicate that the related communication destination concerns the exclusive line. The DEQINF of a JIB 131 has a format such as shown in FIG. 6.

The line type information and the CCBSEL are used as information to select a line for each communication destination. While the line type information is handled as independent information for the sake of communication control, the line type information may be regarded as information for designating the communication destination together with the destination telephone number. The destination telephone number may be exactly direct dial information or may be a pre-registered shortened telephone number (shortened dial information). It may be good that the direct dial information or the shortened dial information is placed on the hard disk device 116; the pointer information thereof is set to the destination telephone number; and the related dial information is read out from the hard disk device 116 upon the execution of the communication job or upon the start of the communication with each destination.

The DEQINF and the CCBSEL of a JIB 131 are automatically set upon the generation of a communication job. During a subsequent period, the DEQINF is updated if necessary. In the case where a communication job relates to only a single communication destination, the DEQINF and the CCBSEL of a JIB 131 are equal in contents. In the case of a job for transmitting same information to a plurality of destinations, information corresponding to a result of OR operation between the CCBSEL of the respective communication destinations is set into the DEQINF.

In this way, the JIB 131 of a communication job has the DEQINF and the CCBSEL. The DEQINF is information for selecting the communication units, while the CCBSEL is information given for each of communication destinations. As will be explained later, this design of the JIB 131 provides the following advantages. The selection of a communication unit and the selection of a line can be done in a same sequence for both a job for transmitting equal information to a plurality of destinations and a job for transmitting information to a single destination. The management of a communication cue can be easier. It should be noted that a communication job, may have only the CCBSEL for each destination. The details of the way of setting the CCBSEL will be described later with reference to a communication reservation process.

As shown in FIG. 4, the communication cue management table (referred to as CUQM hereinafter) 132 includes "cue management information" into which the management number (equal to the job management number) of the JCB 130 of a communication job linked with the head of the communication cue is set, "priority job management information" into which the total number of jobs on the communication cue for each priority level (only in the case where a priority process for each priority level is done) and the numbers of the last jobs on the communication cue for the respective priority levels are set, and "communication unit selecting information" (referred to as DEQINF hereinafter) indicative of the presence or absence of a communication job which may use each communication unit. Although the DEQINF has a format such as shown in FIG. 6, the DEQINF is different from the DEQINF of a JCB or a JIB of each communication job in that information corresponding to a result of OR operation between the DEQINF of all communication jobs linked to the communication cue is set thereinto at respective moments.

A communication job for transmission or polling reception is generated when communication reservations are given by the operator. A communication job for transmission or polling reception is generated also when the request for a repeating function is received from another apparatus. In the case where a process of dividing a communication job is done as will be explained later, divisional jobs (child jobs) of the communication jobs are generated. A receiving job is generated during the reception. In practice, the JCB and the JIB for a given number of jobs are previously provided in the hard disk device 116, and one set of the JCB and the JIB is automatically assigned to a job during the generation of the job.

There is a communication job for timer polling reception or timer transmission in which the date and the time of the execution thereof are designated. There is a communication job which waits to be retried. These communication jobs can not be executed until the moment of the start of the retry or the designated date and time. Such communication jobs are linked with a cue called a timer cue, and are then managed. Upon a time-out, these jobs are removed from the timer cue, and are linked with the communication cue. After the completion of the reception, a receiving job generates a cue waiting for printing received image information.

Normal Communication Processing

As described previously, the system controller 110 operates in accordance with a program stored in the ROM. FIGS. 8–12 are a flowchart of this program. The operation of the image communication apparatus which relates to normal communication will be described hereinafter with reference to FIGS. 8–12.

When the system controller 110 decides a job to be present in the communication cue by referring to the CUQM (a step S207, YES), the status of the CCBch1 is checked. When the status of the CCBch1 corresponds to "stand by" (a step S208, YES), the DEQINF of the CUQM is referred to and a check is made as to whether or not a communication job which can be processed by the CCBch1 is present (a step S209).

In the presence of a communication job which can be processed by the CCBch1 (the step S209, YES), the DEQINF of the JCB is referred to in a sequence starting from a communication job located at the head of the communication cue, and thereby a communication job which may be processed by the CCBch1 is found. This communication job is removed from the communication cue (a step S210). The JIB of this communication job is copied onto the RAM 111, and will be referred to later. Communication destination information of the JIB is referred to, and thereby one communication destination to be processed is decided (a step S212). In the case of a communication job for transmitting equal information to a plurality of destinations, one of the destinations to which the transmission has been not yet executed is selected. In this case, the system controller 110 adds information to the JIB for each destination, the information representing whether the destination has been already selected or is being currently selected and representing whether or not the communication has been successfully completed.

When it is decided by referring to the CCBSEL of the destination information of the determined communication destination that the communication with the destination can be processed by the CCBch1 (a step S213, YES), the line type information and the telephone number of the destination and the communication dam file information of the JIB are delivered to the CCBch1 and the start of the communication is instructed (a step S215). In addition, the status of the CCBch1 is set to "in operation" (a step S216).

In this case, the controller 106 of the CCBch1 gives a call to the line wire "1" or the extension "1" according to the destination information, and establishes the connection with the communication destination. In the case of transmission, the transmitted data is transferred from the hard disk device 116 to the buffer 105 according to the communication data file information, and the image information is decoded and is then coded by the coder and decoder unit 104 in accordance with the ability of the communication opposite party. The coded image information is modulated by the modem 103 before being transmitted to the line. In the case of polling reception, the received signal is demodulated by the modem 103, and the image information is subjected by the coder and decoder unit 104 to an error checking process and a decoding process before being coded in a given manner. Then, the coded received information is stored into a prescribed area of the hard disk device 116 in accordance with the communication data file information.

In the case where the communication with the decided communication destination can not be processed by the CCBch1 (a step S213, NO), the DEQINF of the JIB of the present communication job is changed to contents which permit the use of only the CCBch2, and the communication job is linked with the communication cue by the priority designation (a step S218). The priority job management information and the cue management information of the CUQM are updated if necessary. Then, the DEQINF of the CUQM and the DEQINF of the JCB of the present communication job are updated while the DEQINF of the JIB is referred to (a step, S219).

The system controller 110 executes processes indicated hereinafter. The following conditions are now considered. After the communication is started by the CCBch1, or after the communication job is re-linked with the communication cue, the communication job is present in the communication cue (a step S207, YES) and the status of the CCBch1 is "in operation" (a step S208, NO). In addition, the status of the CCBch2 is "stand by" (a step S220, YES). Under these conditions, when communication jobs which can be processed by the CCBch2 are present in the communication cue, one of the communication jobs which is closest to the cue head is removed from the communication cue (a step S222). Then, the communication destination is decided (a step S224). When the communication with the communication destination can be processed by the CCBch2 (a step S225, YES), the CCBch2 is instructed to start the communication (a step S227) and the status of the CCBch2 is set to "in operation" (a step S228).

When the communication with the decided communication destination can not be processed by the CCBch2 (the step S225, NO), the DEQINF of the JIB of the present communication job is changed to contents which permit the use of only the CCBch1, and the communication job is linked with the communication cue by the priority designation (a step S230). The priority job management information and the cue management information of the CUQM are updated if necessary. Then, the DEQINF of the CUQM and the DEQINF of the JCB of the present communication job are updated while the DEQINF of the JIB is referred to (a step S231).

According to the image communication apparatus, when the two communication units 101 are unoccupied and can be used, two different communication jobs can be executed simultaneously. In the case where the CCBch1 (or the CCBch2) is going to execute a step of a job of transmitting equal information to a plurality of destinations, when it is found that the communication with some of the destinations can not be processed by the CCBch1 (or the CCBch2) due to line-type mismatching, processing the communication job, is interrupted temporarily. After the interruption, the other CCBch2 (or the CCBch1) processes the communication job with a priority. Thus, it is possible to complete a job of transmitting equal information to a plurality of destinations via different lines in an acceptable time.

In the case where the system controller 110 receives the notice of communication end from the CCBch1 which started the transmission (steps S233, S234, and S252, YES), when the communication end is normal (a step S261, YES) and the present communication job has a next communication destination (S263, YES), the system controller 110 causes the CCBch1 to execute the communication with the next communication destination by a step S212 and subsequent steps. In the absence of a next communication destination, the system controller 110 executes after-processes concerning the present communication job such as a process of generating a communication result report, a process of erasing the job, and a process of erasing the related communication data file in the hard disk device 116 (a step S259). The status of the CCBch1 is set to "stand by".

In the case where the communication via the CCBch1 ends abnormally (a step S261, NO), when the number of times of the retry of the present communication job which is counted by the retry counter does not exceed a given number and the cause of the abnormal end is "the destination being in use" or "the destination being occupied by another" (a step S265, YES), a decision is made as to whether or not there is a substitute destination concerning the present communication job or whether or not a substitute destination remains (a step S266).

Substitute destinations will now be explained. According to the image communication apparatus, in the case where a destination is in use and the communication with the destination is impossible, it is possible to designate one or more substitute destinations for the former destination and to transmit data to the substitute destinations. When a plurality of substitute destinations are designated, the substitute designations are ranked. Information of substitute destinations has a format similar to the format of the destination information, and contains CCBSEL.

In the case where a substitute destination is decided to be present at the step S266 and where the CCBch1 gives a call but the destination is in use, the advance to the step S212 is executed. In the case where a substitute destination is decided to be present at the step S266 and where the CCBch2 gives a call but the destination is in use, the advance to the step S224 is executed. When the communication with the substitute destination can be processed by the communication unit 101 (the step S213 or S225, YES), the communication will the substitute destination is started (the step S215 or S227). In the case where the communication with the substitute destination is impossible due to the fact that the substitute destination is in use, when the number counted by the retry counter does not exceed the given number and there is a subsequent substitute destination, similar processes are executed with respect to the subsequent substitute destination.

Such a substitute communication process provides an advantage as follows. In the case of a destination connected to a plurality of lines, even when an expected line is occupied, the communication with the destination can be executed via an unoccupied line.

In the case where the cause of the abnormal communication end is decided to be not "the destination being in use" at the step S265, or in the case where a substitute destination is decided to be absent at the step S266 or a subsequent substitute destination is decided to be absent, a timer for starting the retry is set and the present communication job is liked with the timer cue. In addition, the DEQINF of the JCB is updated by referring to the DEQINF of the JIB (steps S267 and S268). Thus, the present communication job waits to be retried. In the case where the number counted by the retry counter exceeds the given number (a step S264, YES), when a next destination is present (a step S263, YES), the retry counter is set and the step S212 and the subsequent steps are executed to start the communication with the next destination. In the absence of a next destination, the present communication job ends with an error, and a related after-process is executed (the step S259). Specifically, the communication job is linked with a cue of error-end jobs. The communication jobs linked with this cue are erased after a process of generating a communication result report is executed. The destination information for the communication result report is logged as "destination information of the communication result" at all times during the communication process.

In the case where the system controller 110 receives the notice of communication end from the CCBch2 which started the transmission or the polling reception (steps S235, S236, and S270, YES), processes similar to those in the case of the CCBch1 are executed by steps S280 to S287 and a step S277.

With respect to the communication jobs which are linked with the timer cue and which wait to be retried, or with respect to the communication jobs of polling reception and transmission having designated communication start dates and times, the system controller 110 executes the following processes. In the case where the system controller 110 confirms the presence of the communication jobs in the timer cue (a step S246, YES), when some of them are in time-out conditions (a step S247, YES), that communication jobs are removed from the timer cue and are linked with the communication cue (a step S248). In addition, the DEQINF of the CUQM is updated by referring to the DEQINF of the JCB of the present communication job (a step S249).

Next, a description will be given of reception cases where the communication unit which does not start the communication issues a call incoming requirement. When the CCBch1 issues a call incoming requirement (a step S240, YES), the system controller 110 generates a receiving job and instructs the CCBch1 to start communication. In addition, the system controller 110 sets the status of the CCBch1 to "in operation" (steps S241 and S242). Similarly, when the CCBch2 issues a call incoming requirement (a step S243, YES), the system controller 110 generates a receiving job and instructs the CCBch2 to start communication. In addition, the system controller 110 sets the status of the CCBch2 to "in operation" (steps S244 and S245). In the case of such normal reception, the received image information is subjected to an error checking process and a decoding process by the communication unit 101, and then the resultant information is subjected to a given coding process by the coder and decoder unit 104. The resultant correct received image information is transmitted to the hard disk device 116. The location of storing the received image data is designated by the system controller 110, or is set as default. When the reception is completed, a notice of end is issued. In the case where the system controller 110 confirms the notice of end of normal communication (a step S253 or S271, YES), the system controller 110 executes after-processes concerning the receiving job (a step S259 or S277). Specifically, the received image information is printed out by the laser beam printer 113, and then the receiving job is erased. In the case where the laser beam printer 113 can not be used, the receiving job is temporarily linked with a print waiting cue, and the moment at which the laser beam printer 113 becomes usable is waited. When the laser beam printer 113 becomes usable, the receiving job is removed from the print waiting cue and the image information is printed out by the laser beam printer 113. Then, the receiving job is erased. An after-process which takes a long time such as a process of printing out the received image information is executed as a background process of the communication process.

In the case where the communication end confirmed at the step S234 corresponds to the end of reception of a repeating function requirement (a step S252, NO, and steps S253 and S254, YES), the system controller 110 generates information of the DEQINF and the CCBSEL of the JIB from the destination information concerning the repeating function. In addition, the system controller 110 generates a communication job for the repeating transmission, and links the generated communication job with the communication cue. The DEQINF of the CUQM and the DEQINF of the JCB thereof aloe updated by referring to the information in the DEQINF of the JIB (steps S255, S256, and S257). The method of generating information of the DEQINF of the JIB and the CCBSEL from the destination information for each destination will be explained later.

Communication Job Dividing Process

Figure 13:
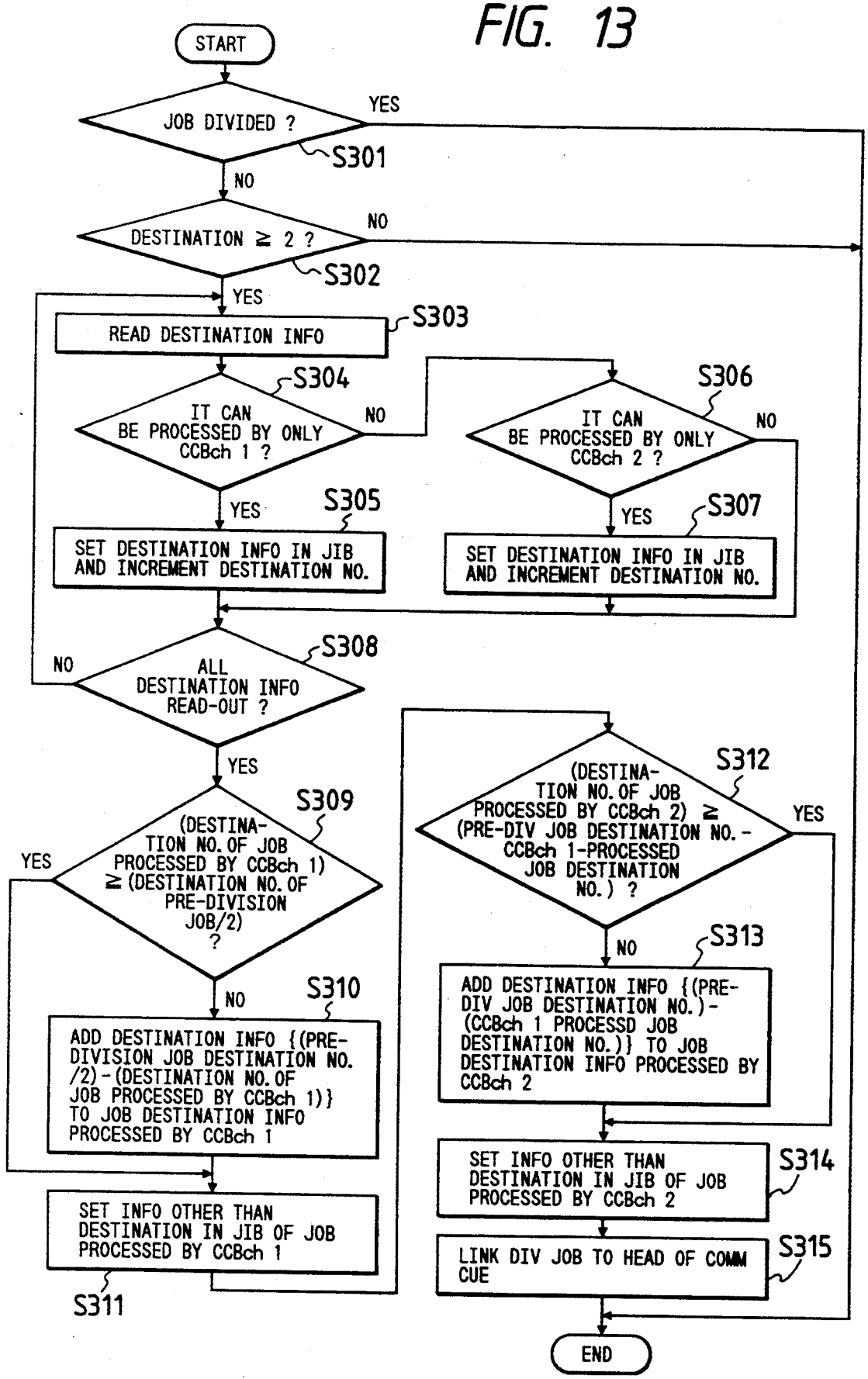
FIG. 13 is a flowchart of pre-processes concerning communication job division.
Figure 14:
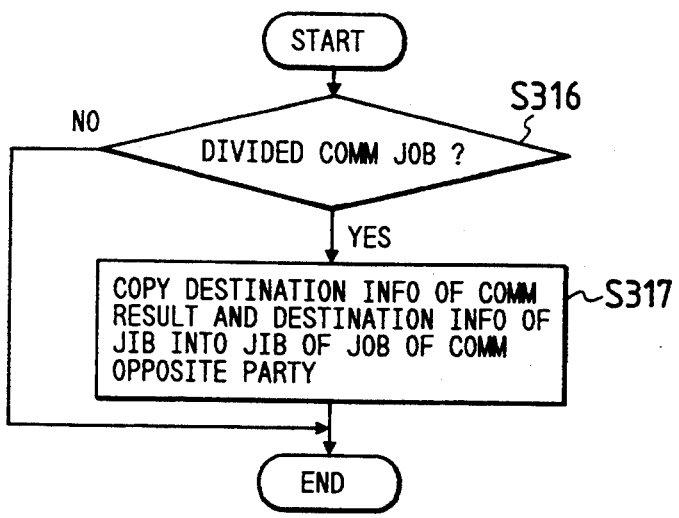
FIG. 14 is a flowchart of after-processes concerning communication job division.

Next, a description will be given of processing a communication job for transmission (which includes repeating transmission) and polling reception. The steps S211 and S223 of FIG. 8 execute pre-processes for the division of a communication job, and the contents thereof are shown in FIG. 13. The step S258 of FIG. 11 and the step S276 of FIG. 12 execute after-processes for the division of a communication job, and the contents thereof are shown in FIG. 14. Since there are the two communication units 101, the number of divided segments of a communication job is two. It should be noted the number of divided segments of a communication job may be three or more when there are three or more communication units.

After the communication job is removed from the communication cue at the step S210 or S222, pre-processes for the division of the communication job are executed (the step S211 or S223). First, a check is made as to whether or not this communication job has been already divided (a step S301). The step S301 is provided in view of the designing that the number of times of the division of a communication job is limited to one and the division of a divided communication job is avoided. When the management number of a job of the division opposite party which is in the JIB is "0", the division has not yet been executed. In the case where the communication job has not yet been divided and there are two or more communication destinations concerning the communication job (a step S302, YES), that is, in the case of a communication job of transmitting equal information to a plurality of destinations, the division is performed. In this case, two JIB for each of two child lobs or divided jobs are provided on the RAM 111. For the sake of explanation, a child job processed by the CCBch1 is referred to as a first child job while a child job processed by the CCBch2 is referred to as a second child job. In addition, a communication job which has not yet been divided is referred to as a parent job.

First, the destination information is read out from the JIB of the parent job on the hard disk device 116, and is transferred to the RAM 111 destination by destination (a step, S303). When it is decided from the information of the CCBSEL thereof that the communication with the present destination can be processed by only the CCBch1 (a step S304, YES), the corresponding destination information is set to the JIB of the first child job and the number of the destinations concerning the first child job is incremented by 1 (a step S305). When it is decided that the communication with the present destination can be processed by only the CCBch2 (a step S306, YES), the corresponding destination information is set to the JIB of the second child job and the number of the destinations concerning the second child job is incremented by 1 (a step S307). Similar processes are periodically executed for all the destination information, and thereby only the destinations among the communication destinations of the parent job which can be processed by only the CCBch1 or the CCBch2 are distributed to the child jobs.

After the destination distributing process is completed for the last destination (a step S308, YES), remaining communication destinations which have not yet been distributed and which can be processed by either the CCBch1 or the CCBch2 are distributed to the child jobs so that the child jobs which have equal numbers of the destinations.

When the number of the destinations of the first child job is smaller than a half of the number of the destinations of the parent job (a step S309, NO), a number of the un-distributed destinations of the parent job which equals the difference between the half of the number of the destinations of the parent job and the current number of the destinations of the first child job is added to the first child job (a step S310). Then, information other than the information of the communication destinations in the JIB of the parent job is copied into the JIB of the first child job (a step S311). The management number of the job of the division opposite party in the JIB of the parent job is "0", and thus the management number of the job concerning the second child job is set into the management number of the job of the division opposite party in the JIB of the first child job. Then, when an un-distributed communication destination remains in the parent job (a step S312, NO), the information of the remaining destination is added to the JIB of the second child job. In addition, information other than the information of the communication destinations in the JIB of the parent job is copied into the JIB of the second child job (a step S314). In this case, the management number of the first child job is set into the management number of the job of the division opposite party in the JIB of the second child job. Finally, in the case where the parent job is being executed by the CCBch1, that is, in the case where the pre-processes for the division of the present job are executed by the step S211, the second child job is linked with the head of the communication cue in priority designation (a step S315). In the opposite case, that is, in the case where the pre-processes for the division of the present job are executed by the step S223, the first child job is linked with the head of the communication cue in priority designation. Thereby, the child jobs result from dividing the parent job which is removed from the communication cue, and the child jobs are executed with priority and it is possible to attain the synchronization of processing the child jobs.

Each of the child jobs is processed similarly to the processing of a general communication job. After the division of a communication job is executed, the resultant child jobs are removed from division objects. In addition, immediately before the after-processes for the communication job (the steps S259 and S277), particular after-processes are executed (the steps S258 and S276). During the after-processes for the communication job division, as shown in FIG. 14, In the case of a division-result child job (a step S316, YES), the contents of the destination information of the communication result and the communication destination information of the JIB thereof are copied into the JIB of the other child job denoted by the management number of the job of the division opposite party (a step S317). In the case where the processing of one of the child jobs originating from a parent job is previously ended, the management number of the job of the division opposite party in the JIB of the other child job is returned to "0" and thus the above-mentioned copying process is not executed. It should be noted that this design is not shown in FIGS. 13 and 14.

In this way, the information regarding the communication result report on the previously-ended child job is collected and brought to the other child job, and thus the previously-ended job can be erased at that time. While a child job which results from dividing a communication job for polling reception can be erased similarly, the file of the received information can not be erased until the completion of the print-out thereof.

As mentioned above, in the image communication apparatus, a communication job of transmitting equal information to a plurality of destinations is divided into child jobs and it is possible to effectively and essentially simultaneously process the child jobs by the two communication units 101. Especially, in the case where lines of different types are connected to the communication units 101 respectively so that the destinations to which equal information is transmitted include destinations related to lines of different types, the destinations are distributed to the child jobs by referring to the information of the CCBSEL of each destination. The frequency of the occurrence of the interruption due to line mismatching can be reduced and more efficient processing can be done in comparison with the case where division is not executed.

Batch Transmission Process

Figure 15:
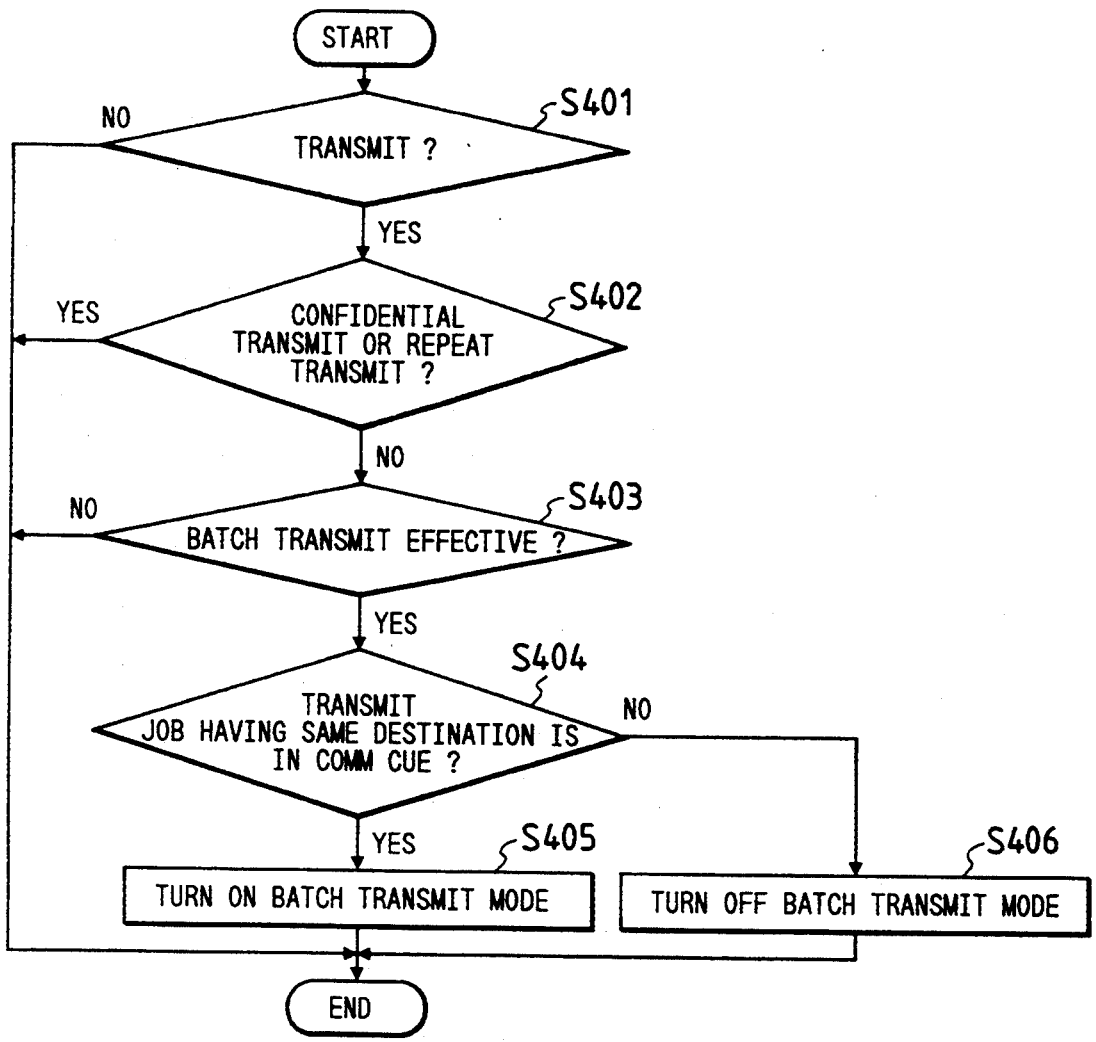
FIG. 15 is a flowchart of pre-processes concerning batch transmission.
Figure 16:
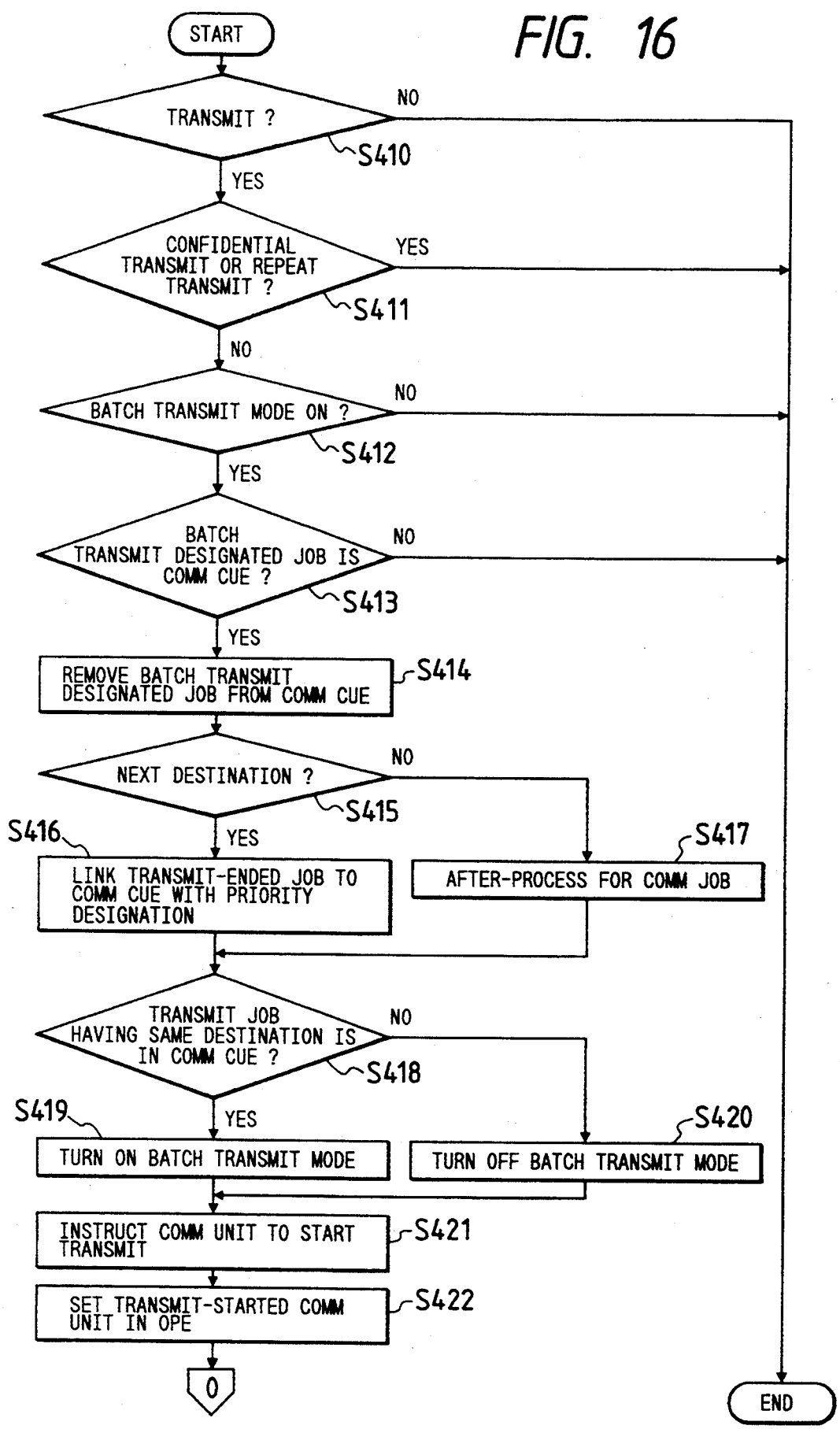
FIG. 16 is a flowchart of after-processes concerning batch transmission.
Figure 17:
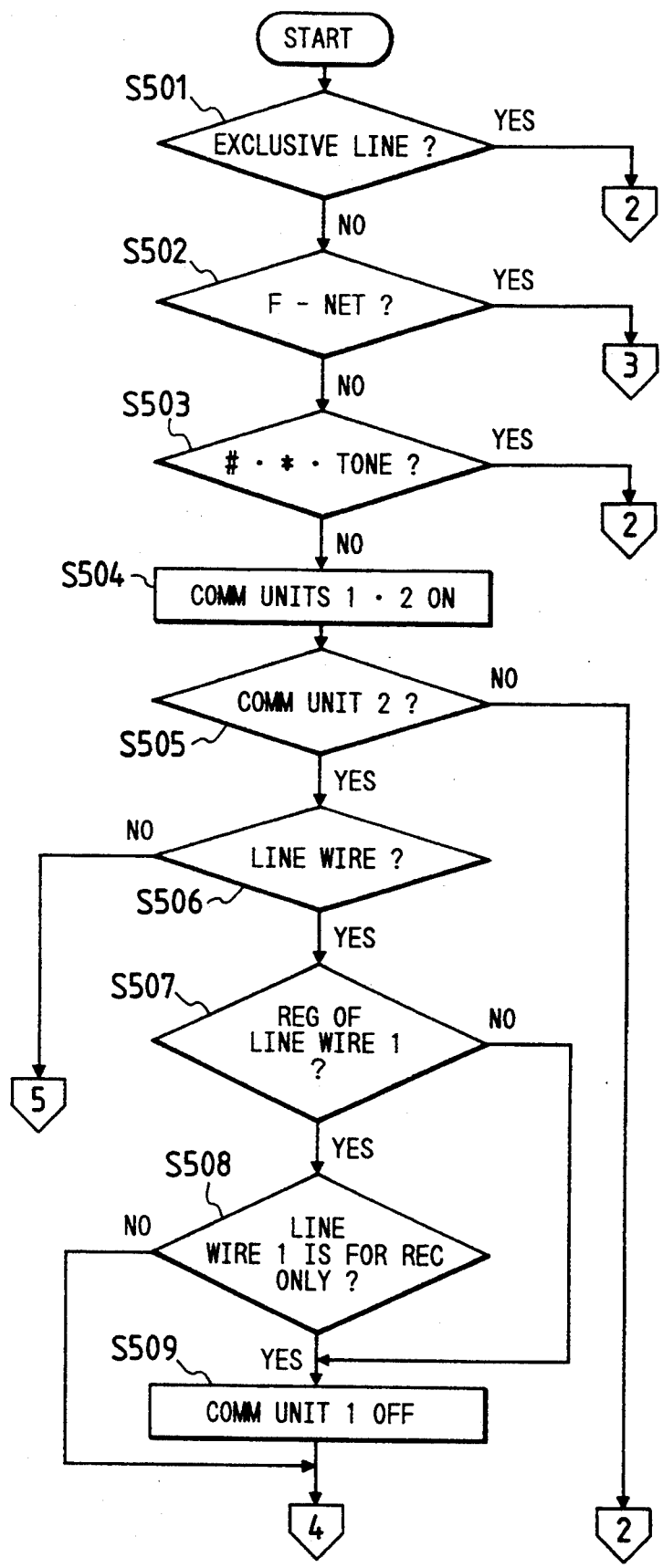
FIGS. 17–21 are a flowchart of processes of setting the CCBSEL in destination information and others.
Figure 18:
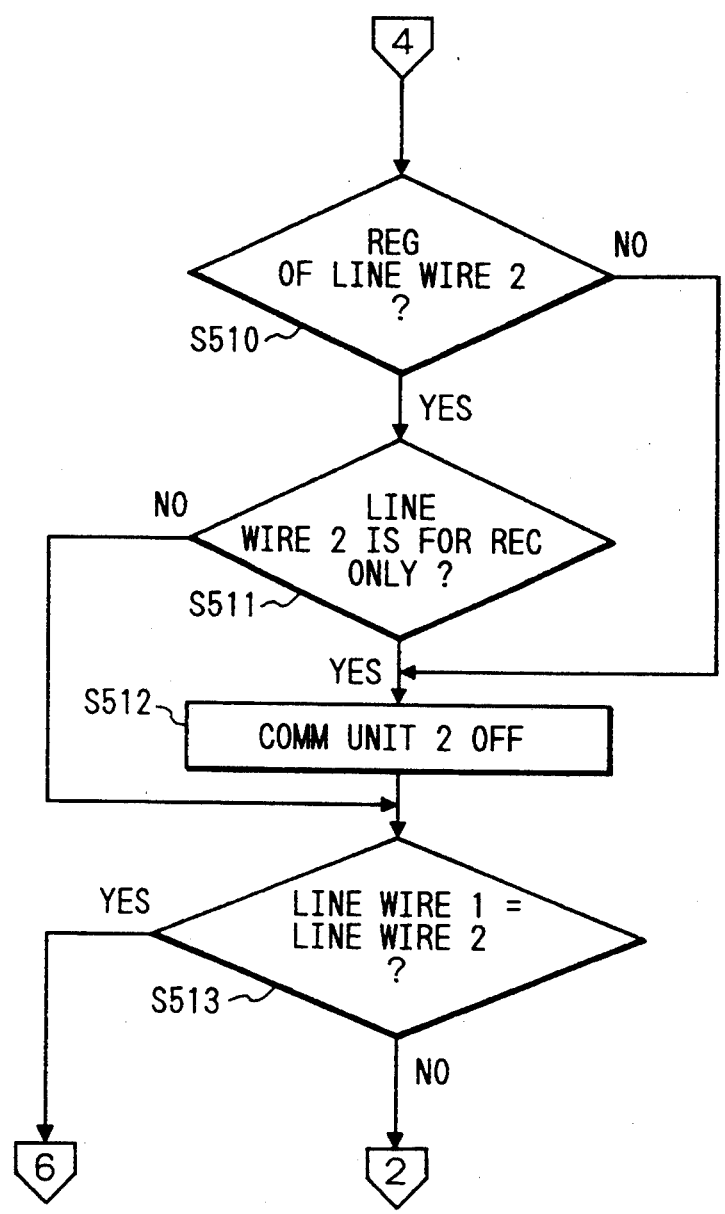
Figure 19:
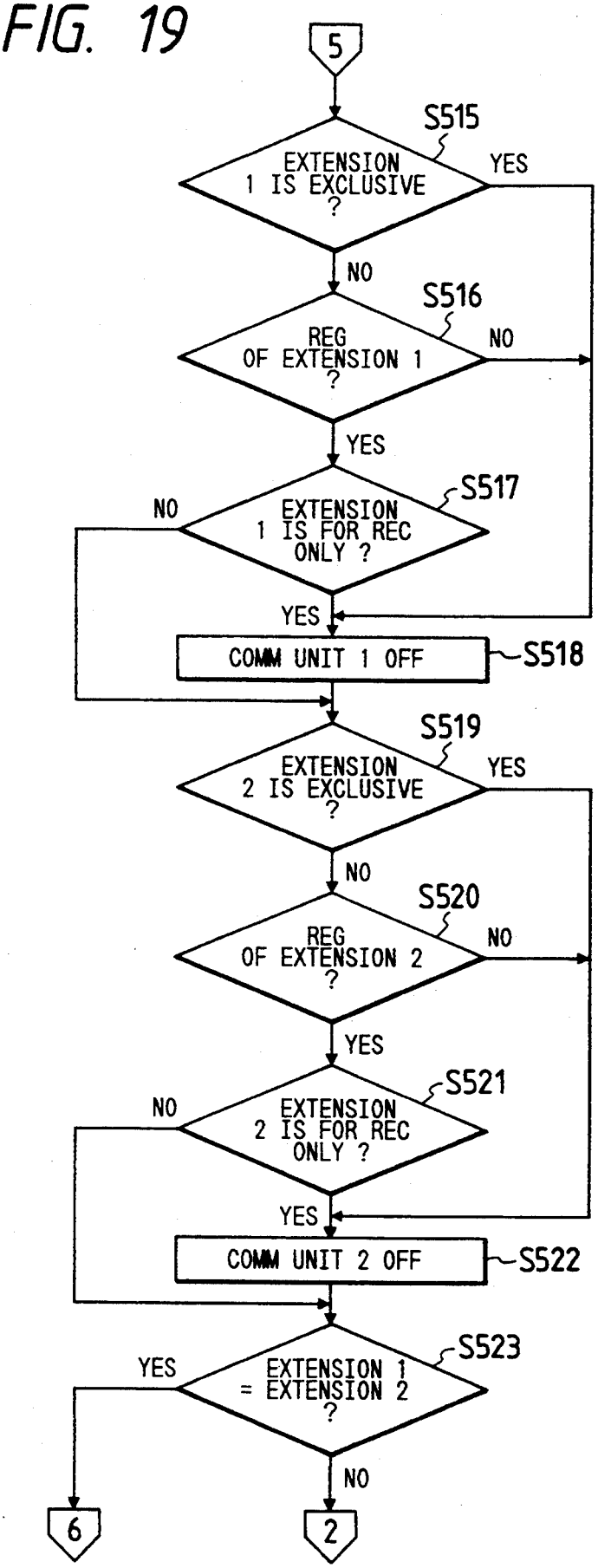
Figure 20:
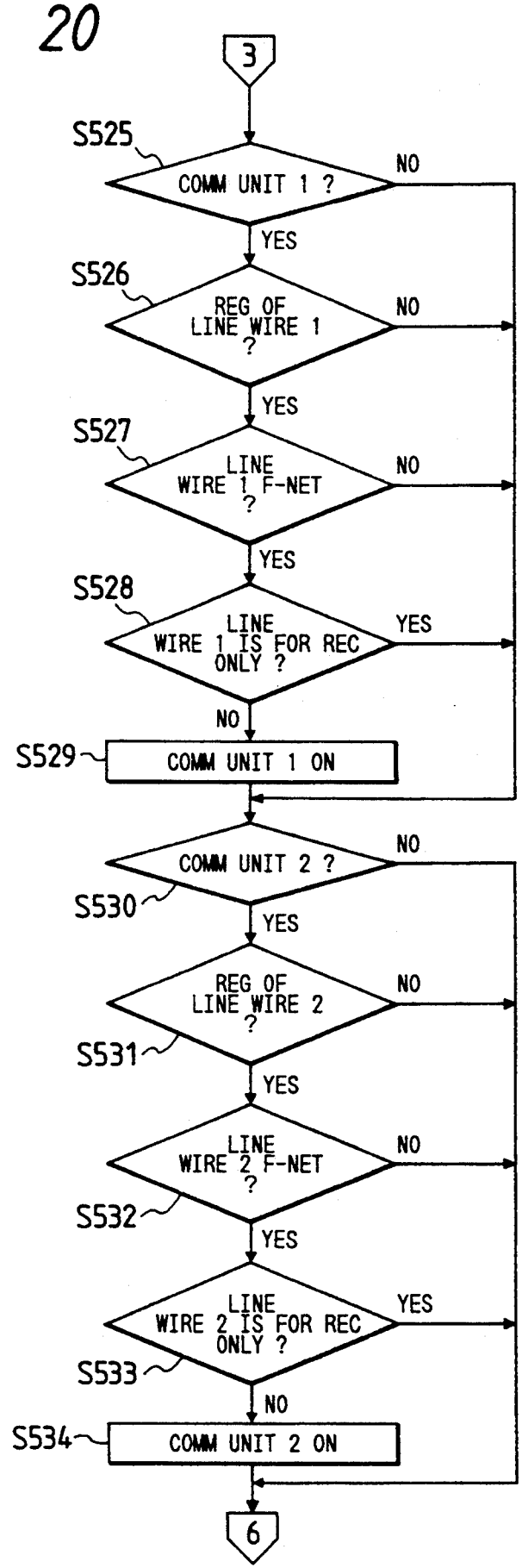

A batch transmission process will be explained hereinafter. In the case where a plurality of jobs of transmission concerning a same destination are present, the batch transmission process transmits data of a job to the destination, and then successively transmits data of another job to the destination without disconnecting the line. Steps S214 and S226 of FIG. 8 execute pre-processes for the batch transmission, and the contents thereof are shown in FIG. 15. A step S262 of FIG. 11 and a step S281 of FIG. 12 execute after-processes for the batch transmission, and the contents thereof are shown in FIG. 16.

In the case where it is decided at the step S213 or S225 that the determined destination of the current communication job can be processed, when the pre-processes (the step S211 or S223) for the batch transmission confirm that this communication job is a communication job (simply referred to as a transmission job) for transmission other than repeating transmission and confidential transmission and that the batch transmission function is effective (a step S401, YES, a step S402, NO, a step S403, YES), other transmission jobs including the present destination are searched from the head of the communication cue (a step S404). When such a transmission job, is found (the step S404, YES), the batch transmission mode of the present communication unit 101 is turned on and also the batch transmission mode in the JIB of the transmission job is set to a batch-transmission-designated state (a step S405). On the other hand, when other transmission jobs including the present destination are not found (the step S404, NO), the batch transmission mode of the present communication unit 101 is turned off (a step S406).

After the execution of these pre-processes, the present communication unit 101 is instructed to start the communication with the communication destination (the step S215 or S227). When this communication is completed, the communication unit 101 issues the notice of communication end. In the case where the batch transmission mode is turned on and then the start of the communication is instructed (in the case where the communication is stared with the batch transmission mode), the line is not disconnected and waiting is done. The system controller 110 detects the notice of the end of the communication which is started by turning on the batch transmission mode (the step S234 or S236). When the communication end corresponds to normal end (the step S261 or S280, YES), the after-processes for the batch transmission are executed (the step S262 or S281).

First, in the case where it is confirmed that the ended job is a transmission job other than repeating transmission and confidential transmission and that the batch transmission mode is on (steps S410 to S412, YES), transmission jobs which are completed in the batch transmission designation are searched in the communication cue. When such a transmission job is found (a step S413, YES), the transmission job is removed from the communication cue (a step S414). In the case where the present transmission job does not have a subsequent destination (a step S415, NO), after-processes for the end of the present transmission job are executed (a step S417). In the case where a subsequent destination remains (the step S415, YES), the present transmission job is linked with the communication cue in a priority manner for the restart of the processes with priority (a step S416). Next, transmission jobs containing a destination same as the destination of the batch transmission are searched in the communication cue. When such a transmission job is found (a step S418, YES), the transmission job is set into the batch-transmission-designated state and also the batch transmission mode of the related communication unit 101 is turned on (a step S419). When such a transmission job is not found (the step S418, NO), the batch transmission mode is turned off (a step S420). Then, the CCBch1 or the CCBch2 which is currently an object is instructed to start the transmission of data of the transmission job removed from the communication cue at the step S414, and also the status thereof is set to "in operation" (steps S421 and S422). Since the designated CCBch1 or the designated CCBch2 is in connection with the line to the destination, the transmission is immediately started.

In this way, data of a plurality of transmission jobs is continuously transmitted to a destination while the line remains connected. Thus, when there are many transmission jobs concerning a same destination, the time spent in connecting the line is shortened and efficient communication can be done. At intermediate points in the batch transmission process, the status of the communication unit is not returned to "stand by" even upon the completion of a communication job. The pre-processes (the step S214 or S226) for the batch transmission which concerns the present communication unit are executed only once.

During the batch transmission process, when the last transmission job among a plurality of transmission jobs containing the same destination is removed from the communication cue, other transmission jobs containing the same destination are not found so that the batch transmission mode is turned off (the step S420). Thus, during a period after the transmission of data of the last transmission job to the batch transmission destination is completed, when the transmission job has a remaining destination, the normal processes are executed with respect to the remaining destination. It should be noted that the last transmission job may be returned to the communication cue at the stage of the completion of the batch transmission even though a remaining destination is present. In addition, canceling reservations of a batch-transmission-designated transmission job is checked by the step S413.

Communication Reservations

A process of communication reservations will be described hereinafter. When the operator selects communication reservations by operating the operation panel 117 (a step S202, YES), a process of communication reservations is started (steps S203 to S206). In the case of communication reservations, the operator inputs dial information (direct dial information or shortened dial information) for each communication destination by operating the operation panel 117, and also the operator selects a line (one of the line wire "1", the line wire "2", the extension "1", and the extension "2") desired to be called. Then, the system controller 110 generates the destination information 133 of FIG. 5 for each communication destination, and also generates the DEQINF of the JIB of a reservation job. The CCBSEL in the destination information is generated from the dial information and the line selection according to a processing sequence shown in FIG. 17 to FIG. 21. The following description is based on the fact that there are the two communication units 101.

Figures 21, 22:
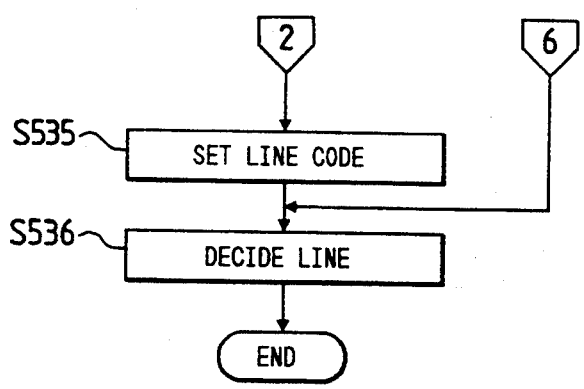
FIG. 22 is a diagram showing the structure of line information registered for each communication unit.

With respect to the lines connected to the communication units 101, line information 134 shown in FIG. 22 is previously set and is saved in a backup area of the RAM 111. During the setting of the CCBSEL information, the line information 134 is referred to.

In the case of an exclusive line (a step S501, YES), the code corresponding to the line selected by the operator is set into the CCBSEL (a step S535), and there is established a piece of destination information which is composed of the CCBSEL, line type information for discriminating between an extension and a line wire, and the telephone number of the destination (a step S536).

In the case of a facsimile network (a step S502, YES), it is necessary to select a line wire having a connection with the facsimile network. Thus, the line information is referred to. When the line wire "1" is registered and has a connection with the facsimile network and also the line wire "1" is different from a line used exclusively for reception (steps S526 and S527, YES, a step S528, NO), the bit b0 of the CCBSEL is set to "1" (a step S529). Otherwise, the bit b0 of the CCBSEL is held "0". The bit b0 being "1" indicates that the present destination can be processed by the CCBch1. Similar decisions and processes are given of the line wire "2" (steps S531 to S533), and the bit b1 of the CCBSEL which corresponds to the CCBch2 is set to "1" (a step S534) or is held "0". As a result, the destination information is established (the step 536).

In the case of a line different from both an exclusive line and a facsimile network, a check is made as to whether or not the dial information has segments corresponding to particular characters "#" and "*" in the push button (PB) line, and also whether or not a particular tone is contained in the dial pulse (DP) line (a step S503). When the dial information has segments corresponding to particular characters "#" and "*" in the push button (PB) line, a call to the push button line is necessary. When a particular tone is contained in the dial pulse (DP) line, a call to the dial pulse line is necessary. Thus, in the case where the result of the decision by the step S503 is YES, the CCBSEL is set in accordance with the line selected by the operator so that the destination information is established (the steps S535 and S536).

In the case where the result of the decision by the step S503 is NO, it is unnecessary to discriminate between the push button (PB) line and dial pulse (DP) line. Even when one of the communication units 101 relates to the PB line and the other communication unit 101 relates to the DP line, there is a chance that the job can be processed by either of the communication units 101. Thus, the bit b0 (corresponding to the CCBch1) and the bit b1 (corresponding to the CCBch2) of the CCBSEL are provisionally set to "1" (a step S504). Then, a check is made as to whether the selected line is a line wire or an extension (a step S506).

In the case of a line wire, when the line wire "1" which differs from a line used exclusively for reception is registered (a step S507, YES, a step S508, NO), the bit b0 of the CCBSEL is held "1". When the line wire "1" is not registered or when the line wire "1" is used exclusively for reception, the bit b0 of the CCBSEL is set to "0" (a step S509). Similarly, when the line wire "2" which differs from a line used exclusively for reception is registered (a step S510, YES, a step S511, NO), the bit b1 of the CCBSEL is held "1". When the line wire "2" is not registered or when the line wire "2" is used exclusively for reception, the bit b1 of the CCBSEL is set to "0" (a step S512). Then, a check is made as to whether or not the issue of a call is permitted without discriminating between the line wire "1" and the line wire "2" (a step S513). When the discrimination is unnecessary (the step S513, YES), the destination information is established (the step S536). When discriminating between the line wire "1" and the line wire "2" is necessary (the step S513, NO), the CCBSEL is set in accordance with the line selected by the operator and the destination information is established (the steps S535 and S536).

In the case where the present line agrees with an extension (the step S506, NO), when the extension "1" is an exclusive line (a step S515, YES) or the extension "1" is not registered (a step S516, NO) or when the extension "1" is used exclusively for reception (a step S517, YES), a call via the extension "1" is impossible and thus the bit b0 of the CCBSEL is set to "0". Similarly, when the extension "2" is an exclusive line or the extension "2" is not registered or when the extension "2" is used exclusively for reception, the bit b1 of the CCBSEL is set to "0" (steps S519 to S522). When discriminating between the extension "1" and the extension "2" is unnecessary (a step S523, YES), the CCBSEL is established as it is (the step S536). When the discrimination is necessary, the CCBSEL is set in accordance with the line selected by the operator and the destination information is established (the steps S535 and S536).

In this way, the destination information containing the CCBSEL for one destination is established. The established destination information is stored in the communication destination information area of the JIB of the reserved communication job. Then, OR operation between the information of the CCBSEL of the present destination and the information (the bits b0 and b1 are "0" at the stage of the, start of the reservation) of the DEQINF of the JIB is executed, and thereby the information in the DEQINF is updated.

In the case of a reservation of communication of transmitting equal information to a plurality destinations, similar processes are executed for each of the destinations. When the destinations include a destination corresponding to the CCBSEL bit b0 of "1" and also a destination corresponding to the CCBSEL bit b1 of "1", both the bit b0 and the, bit b1 of the DEQINF become "1".

When the operator instructs the completion of the communication reserving operation by operating the operation panel 117 and this is detected by the system controller 110 (a step S204, YES), the JCB of the reserved communication job is generated by referring to the JIB and the communication job is linked with the communication cue (a step S205). In addition, the DEQINF of the CUQM is updated (a step S206).

As described previously, one or more substitute destinations can be set for each destination by operating the operation panel 117. When substitute destinations are set, destination information concerning the substitute destinations is generated similarly. The destination information concerning the substitute destinations is stored into the JIB while the correspondence relation between the destinations and the substitute destinations are made clear and the substitute destinations are ranked. The image information is read out from transmitted documents by the scanner 112, and is then coded and compressed by the coder 120 before being stored into the hard disk device 116.

Line Selection Indicating Information Table

Figure 23:
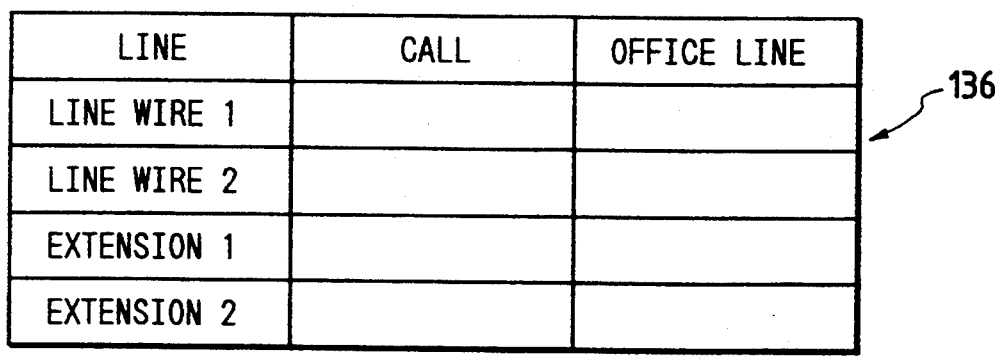
FIG. 23 is a diagram showing the structure of an information table for indicating line selection.

During the operation of reserving communication, a line selection key on the operation panel 117 is depressed, and thereby line conditions arc sequentially indicated on the liquid crystal display panel 118 in a line-by-line manner. When a desired line is indicated, a line setting key on the operation panel 117 is depressed to execute the line selection. The indication of the line conditions on the liquid crystal display panel 118 is executed by directly referring to such line information 134 as shown in FIG. 22 which is stored in the RAM 111. For faster and easier processing, the following alternative design may be adopted. Specifically, during an initializing process (a step S201), a line selection indicating information table 136 having contents such as shown in FIG. 23 is generated on the basis of the line information, and the table 136 is located on the RAM 111. During a subsequent period, the table 136 is used in the indication of the line selection information.

Figure 24:
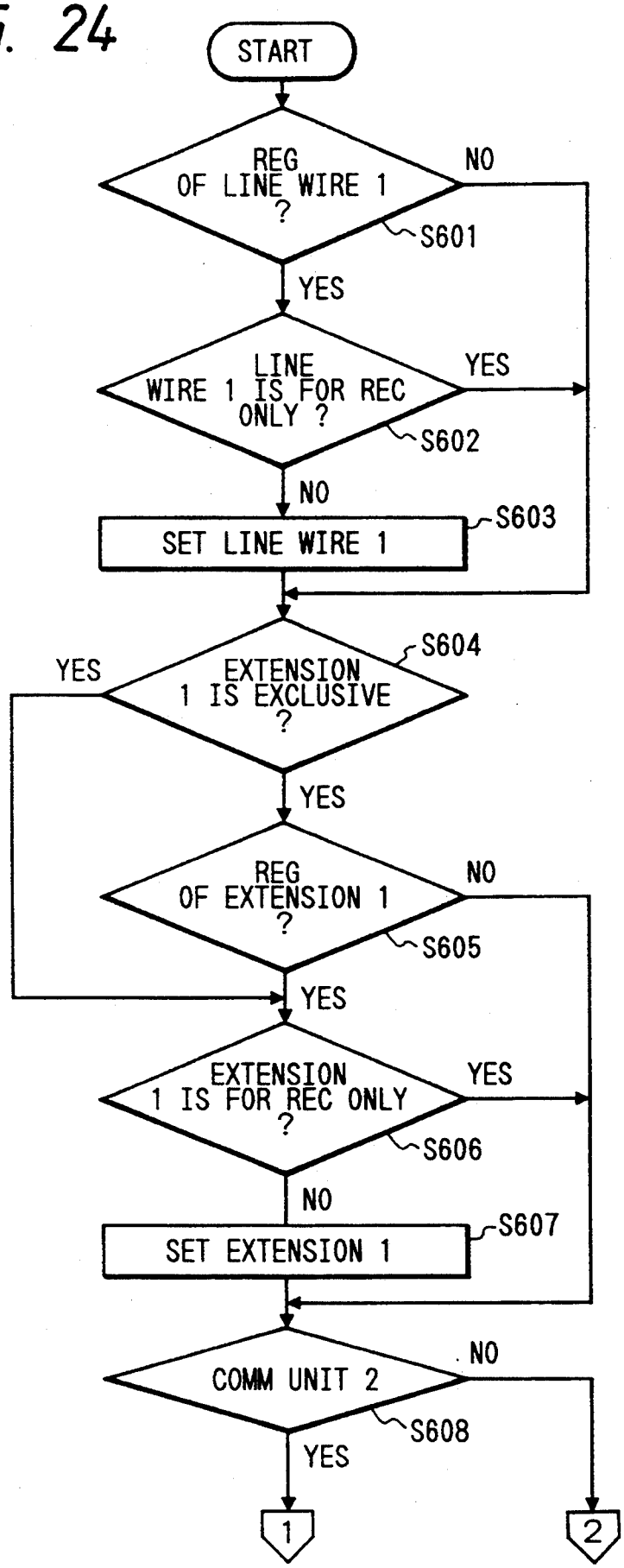
FIGS. 24–26 are a flowchart of processes of generating the information table for indicating line selection.
Figure 25:
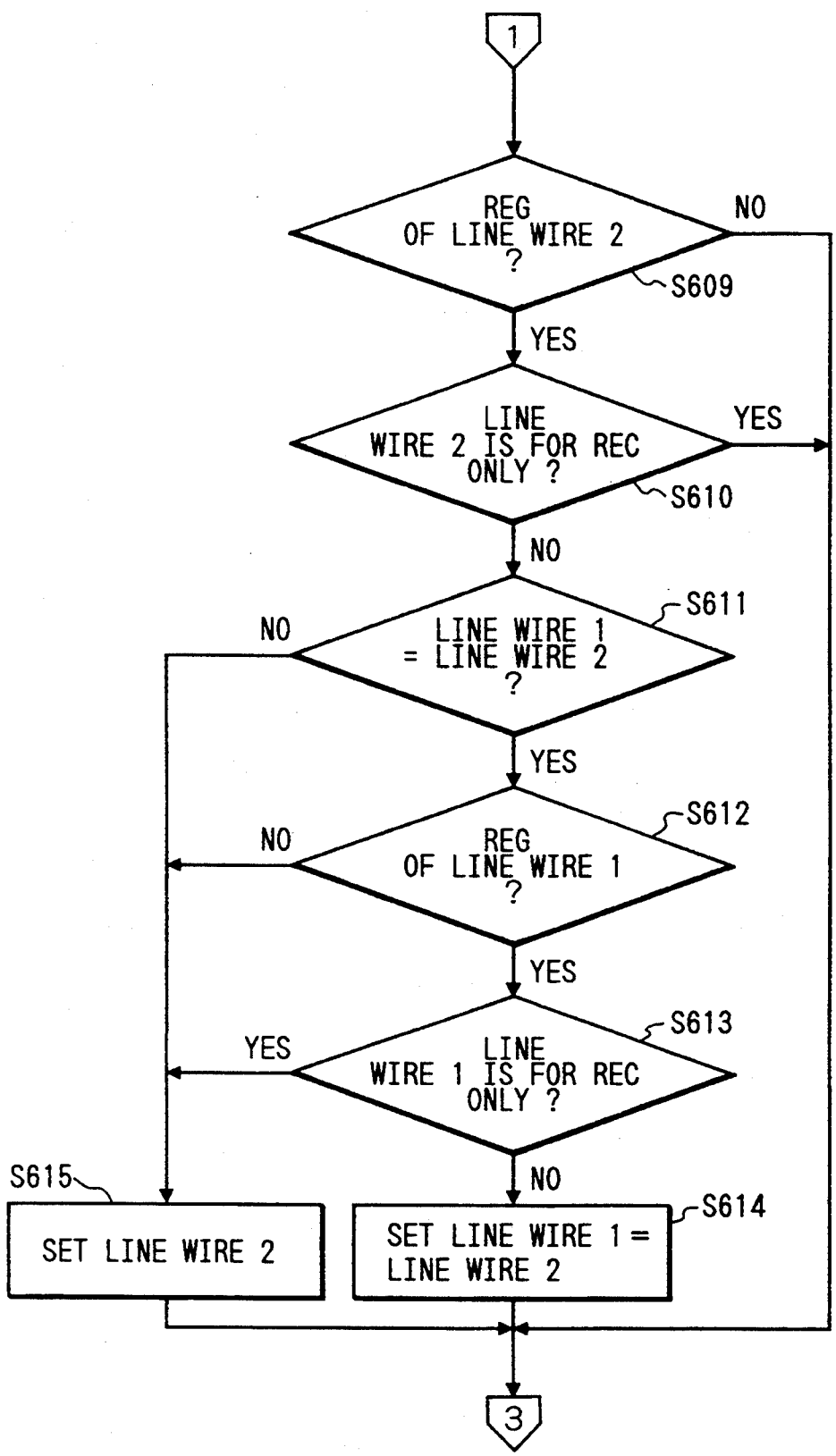
Figure 26:
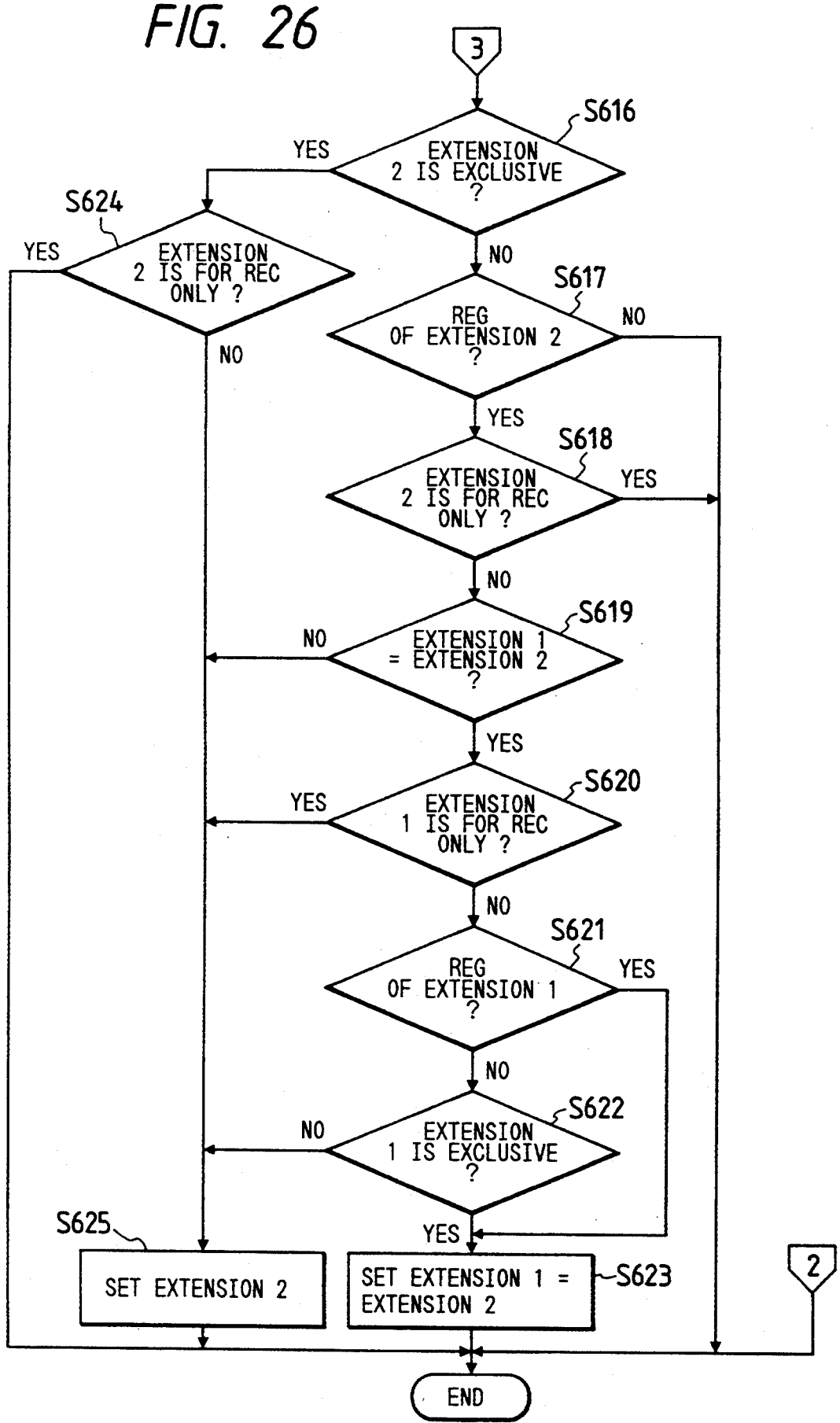

The line selection indicating information table 136 is generated according to processes shown in FIG. 24 to FIG. 26. Specifically, when the line wire "1" is registered and is different from a line used exclusively for reception, the line wire "1" is set into a callable state (steps S601 to S603). It should be noted that the callable state means a state which can accept a call. When the extension "1" differs from an exclusive line and is registered and also the extension "1" differs from a line used exclusively for reception (a step S604, NO, a step S605, YES, a step S606, NO) or when the extension "1" is registered as an exclusive line and is different from a line used exclusively for reception (the step S604, YES, the step S606, NO), the extension "1" is set into a callable state (a step S607). Thus, the processing related to the CCBch1 is completed.

After the provision of the CCBch2 is detected (a step S608, YES), the following processes are executed. In the case where the line wire "2" is registered and is different from a line used exclusively for reception (a step S609, YES, a step S610, NO), when the line wire "1" and the line wire "2" are required to be handled as lines of different types for issuing a call (a step S611, NO) or when the line wire "1" is not registered (a step S612, NO) or when the line wire "1" is used exclusively for reception (a step S613, YES), the line wire "1" is set into callable state (a step S615). In the case where the line wire "1" and the line wire "2" can be handled as lines of the same type (the step S611, YES), when the line wire "1" is registered and is different from a line used exclusively for reception, the line, wire "1" and the line wire "2" are set as lines of the same type (steps S612 to S614). Next, decisions concerning the extension "2" are executed as follows. When the extension "2" is an exclusive line and is different from a line used exclusively for reception, the extension "2" is set into a callable state (steps S616, S624, and S625). In the case where the extension "2" differs from an exclusive line, when the extension "2" is registered and is different from a line used exclusively for reception and when the extension "1" and the extension "2" can not be handled as lines of the same type, the extension "2" is set into a callable state (steps S617, S618, and S625). In the case where the extension "1" and the extension "2" can be handled as lines of the same type, when the extension "1" is used exclusively for reception or when the extension "1" is neither a line used exclusively for reception nor an exclusive line, the extension "2" is set into a callable state. In the other cases, the extension "1" and the extension "2" are set as lines of the same type (a step 623).

According to such processing, only the lines set into the callable states are indicated on the liquid crystal display panel 118 as proposed lines regarding the communication reservations. The lines of the same type are indicated as they are.

Communication Unit Indication Selecting Process

There are a plurality of types of the indication of information on the liquid crystal display panel 118. The operator can change the indication type by operating an indication changing button on the operation panel 117. During the operation of communication reservations, the indication of information on the liquid crystal display panel 118 its in a format (a type) corresponding to "communication reservations". When the operation of communication reservations is ended, the indication of information on the liquid crystal display panel 118 is automatically changed to a normal format (a normal type). Similarly, when the operation of setting functions or the operation of setting conditions related to the print-out of the received image information is ended, the indication of information on the liquid crystal display panel 118 is automatically changed from a corresponding format (a corresponding type) to the normal format (the normal type). The normal type of the indication of information is changed between a first communication unit indication mode and a second communication unit indication mode representing conditions of the CCBch1 and CCBch2 respectively. The first communication unit indication mode and the second communication unit indication mode are also referred to as "communication unit (1) indication" and "communication unit (2) indication" respectively.

Figure 27:
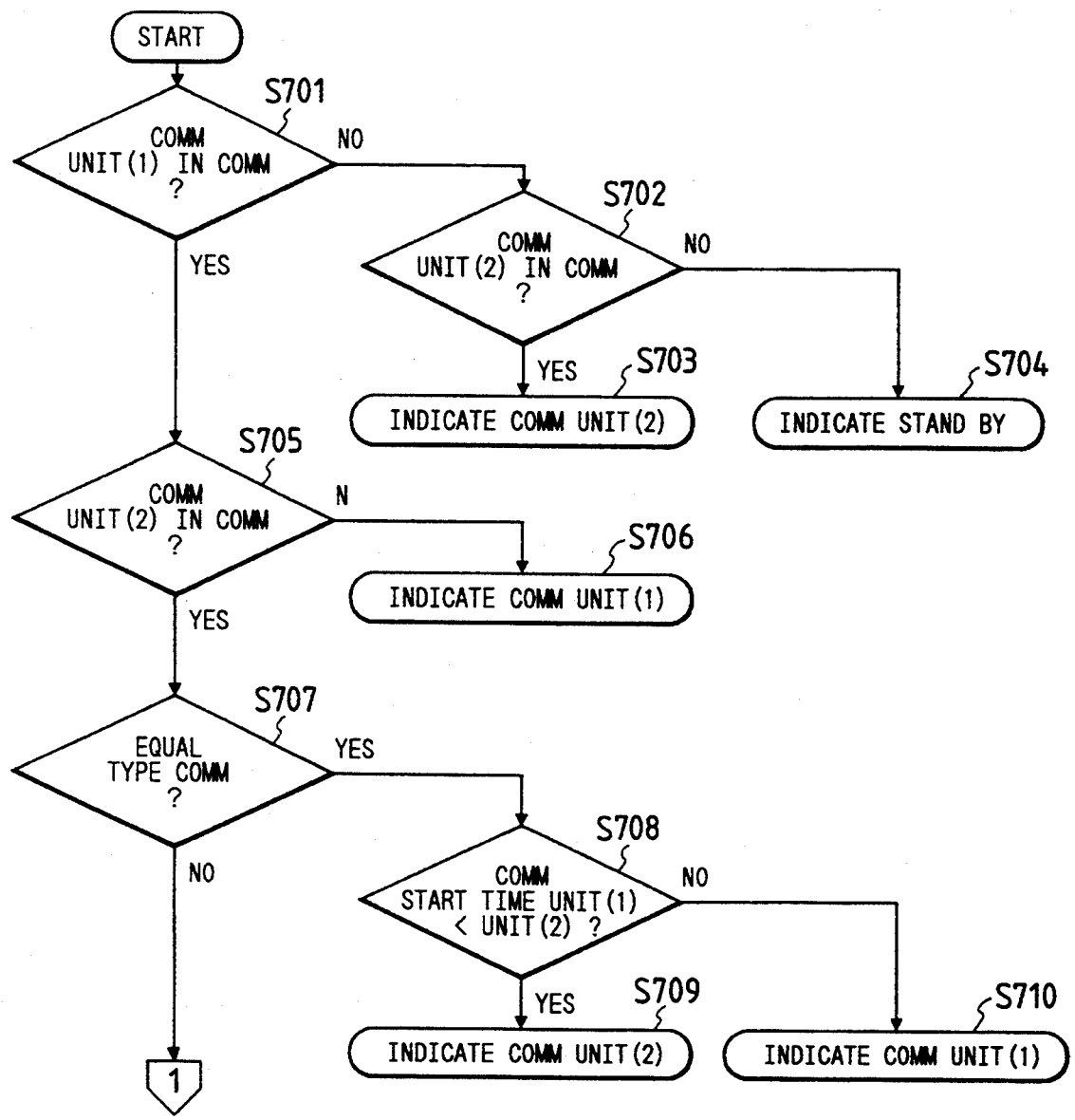
FIGS. 27 and 28 are a flowchart of processes of selecting a communication unit indication mode.
Figure 28:
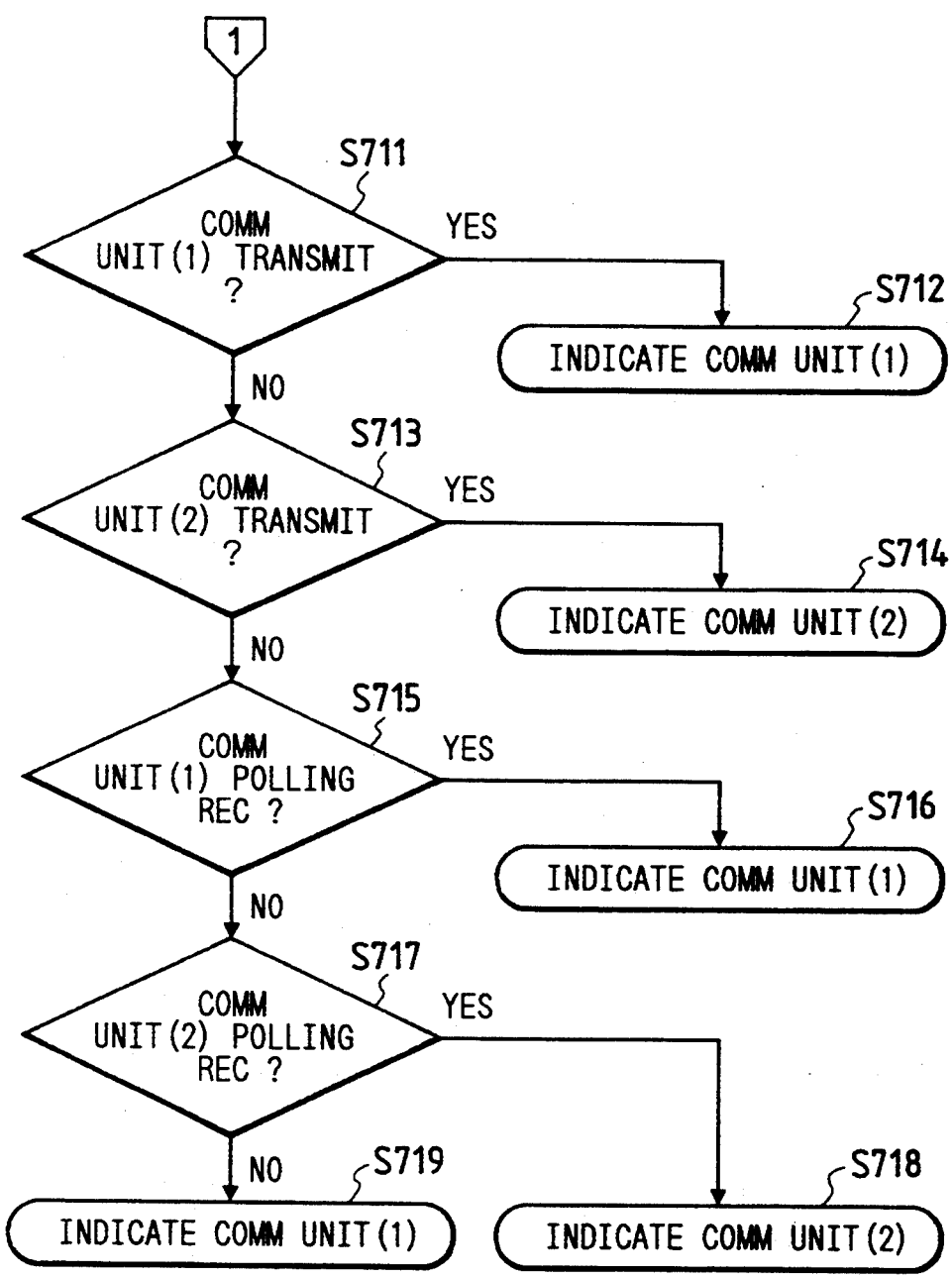

In the image communication apparatus, for improving the use of the apparatus and enhancing the rationality of the indication of information, the communication unit indication mode executed after the completion of the communication reserving process or others is selected according to a processing sequence shown in FIG. 27 and FIG. 28.

When only the CCBch2 is in communication so that only the status thereof is "in operation" (a step S701, NO, a step S702, YES), the second communication unit indication mode or "communication unit (2) indication" is selected and executed (a step S703). On the other hand, when only the CCBch1 is in communication (the step S701, YES, a step S705, NO), the first communication unit indication mode or "communication unit (1) indication" is selected and executed (a step S707). It is rational that, when only one of the communication units 101 is in use, the conditions thereof are indicated. Especially, in the case where processing a communication job is started immediately after the end of communication reservations, this fact can be easily confirmed by monitoring the liquid crystal display panel 118.

In the case where both the CCBch1 and the CCBch2 are in communication, when the communications executed via the CCBch1 and the CCBch2 are of the same type or when the communications correspond in common to one of transmission and reception (a step S707, YES), the communication unit indication mode or "communication unit indication" corresponding to the communication unit having a later communication starting time is selected and executed (steps S708, S709, and S710). This design is convenient in confirming the start of a communication job after the end of communication reservations.

In the case where the communication units currently execute communications of different types respectively, priority is given to the communication unit indication mode or "communication unit indication" corresponding to the communication unit which is in transmission. Thus, when the CCBch1 is in transmission, the first communication unit indication mode or "communication unit (1) indication" is selected and executed (steps S711 and S712). When the CCBch2 is in transmission, the second communication unit indication mode or "communication unit (2) indication" is selected and executed (steps S713 and S714). In the case where neither the CCBch1 nor the CCBch2 is in transmission and the CCBch1 is in polling reception, the first communication unit indication mode or "communication unit (1) indication" is selected and executed (steps S715 and S716). In the case where neither the CCBch1 nor the CCBch2 is in transmission and the CCBch2 is in polling reception, the second communication unit indication mode or "communication unit (2) indication" is selected and executed (steps S717 and S719).

In the image communication apparatus, during the processing of a communication job, telephone-set reservations can be done. The communication unit 101 required for telephone-set reservations does not disconnect the line with the destination after the end of the communication. In addition, this communication unit 101 transmits an operator call signal to the line, and changes the connection of the line from the side of the modem 103 to the side of the telephone set 121. Furthermore, when a telephone set of the communication opposite party is hooked off, a buzzer (not shown) is activated to force the operator to hook off the telephone set 121. Thus, the operator can communicate with the opposite party via telephone.

Telephone Reservation Accepting Process

Figure 29:
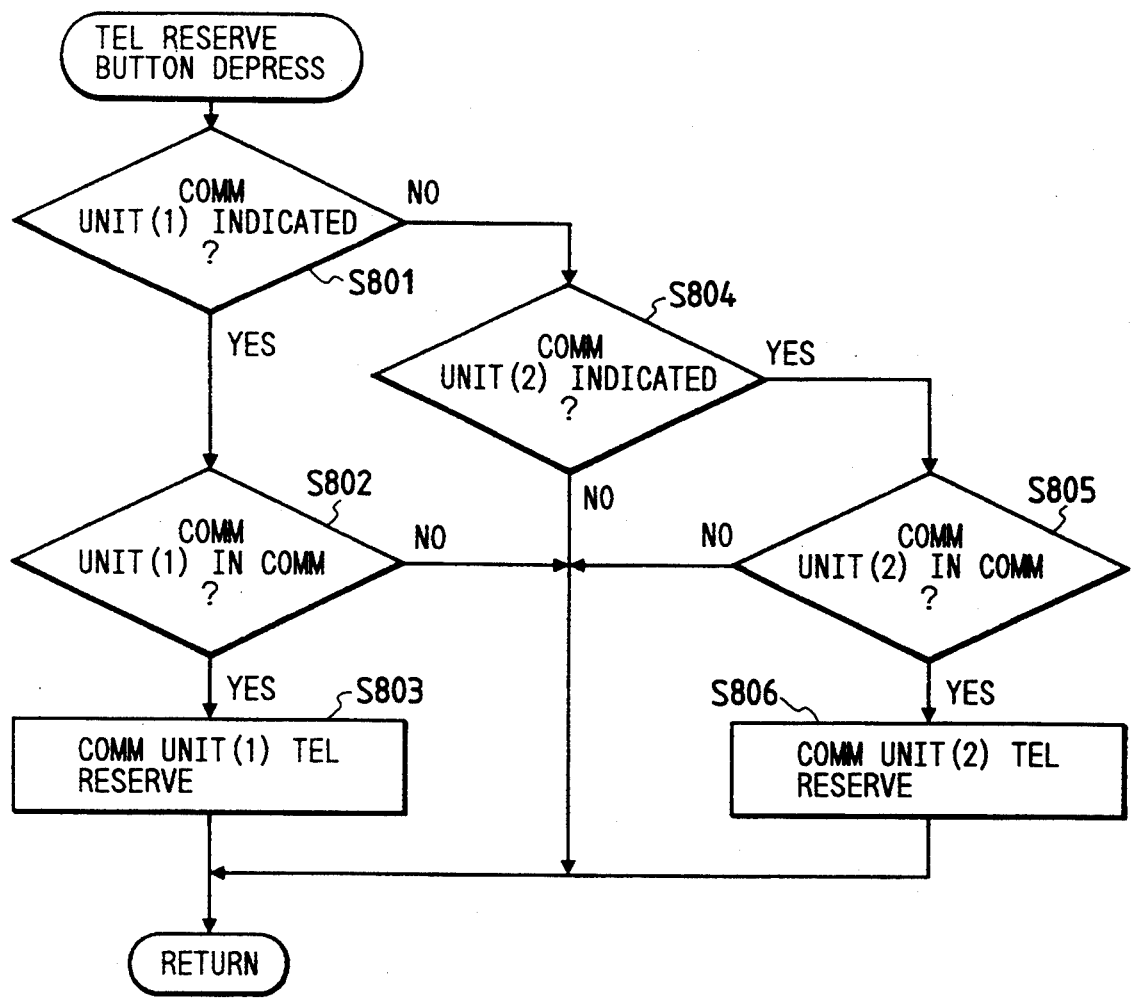
FIG. 29 is a flowchart of processes of accepting telephone-set reservations.

Telephone-set reservations are invalid if they are not done with respect to the communication unit 101 which is in communication. There are the two communication units 101. There is a chance that both the communication units 101 are in operation. Thus, a problem tends to occur such that telephone-set reservations are instructed to an improper communication unit 101. To prevent the occurrence of such a problem, the image communication apparatus is designed as follows. In the case where a telephone reserving button on the operation panel 117 is depressed, the communication unit 101 to which telephone-set reservations are instructed is automatically selected according to the states of the respective communication units 101 and the conditions of the information indicated on the liquid crystal display panel 118. This process is shown in FIG. 29.

It is now assumed that the first communication unit indication mode or "communication unit (1) indication" is executed at the moment of the depression of the telephone reserving button (not shown) on the operation panel 117. When the CCBch1 is in communication, the system controller 110 accepts telephone-set reservations and instructs the telephone-set reservations to the CCBch1 (steps S801, S802, and S803). It is now assumed that the second communication unit indication mode or "communication unit (2) indication" is executed at the moment of the depression of the telephone reserving button (not shown) on the operation panel 117. When the CCBch2 is in communication, the system controller 110 accepts telephone-set reservations and instructs the telephone-set reservations to the CCBch2 (steps S804, S805, and S806). Under conditions other than those in the above-mentioned cases, telephone-set reservations can not be accepted. When telephone-set reservations are accepted, this fact is indicated on the liquid crystal display panel 118. Thus, in the case where telephone-set reservations are not accepted, the operator can change the communication unit indication mode ("communication unit indication") to check the communication unit, and then the operator can re-depress the telephone reserving button to make correct telephone-set reservations.

Repeating Function

Figure 30:
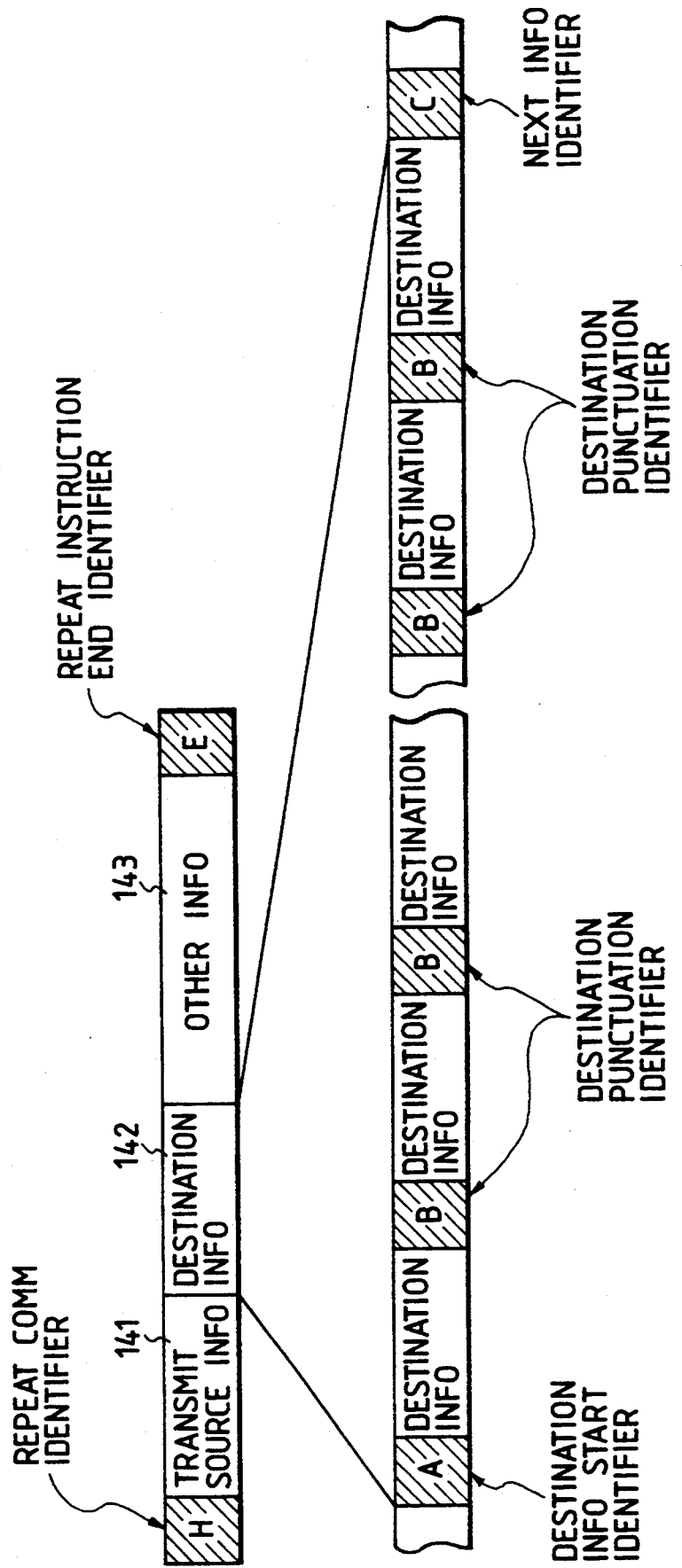
FIG. 30 is a diagram showing the format of repeating function requirement information.

When a repeating function is required, the image communication apparatus operates as follows. In the case of requirement for a repeating function, the character field of an NSS signal (a non-standard function setting signal according to CCITT advice T. 30) transmitted from a requiring side contains transmission source information 141, transmission destination information 142 and other designated item information 143 (information representing a confidential memorized number, pass word transmitting designation, a report return destination, and a report return being unnecessary) in a format such as shown in FIG. 30. In FIG. 30: H denotes an identification code for repeating communication; E denotes an identification code representing the end of repeating designation information; A denotes an identification code representing the start of destination information; B denotes an identification code representing a punctuation between destinations; and C denotes an identification code representing a punctuation for separating subsequent information.

In the case where such a repeating function requirement is received, the received destination information lacks CCBSEL. Thus, as described previously in respect of FIG. 11 and FIG. 12, during the generation of a corresponding communication job, the system controller 110 executes processes including a process of generating destination information containing CCBSEL. The contents of these processes are shown in FIG. 31, The contents of a step S909 in FIG. 31 are shown in FIG. 32.

Figure 31:
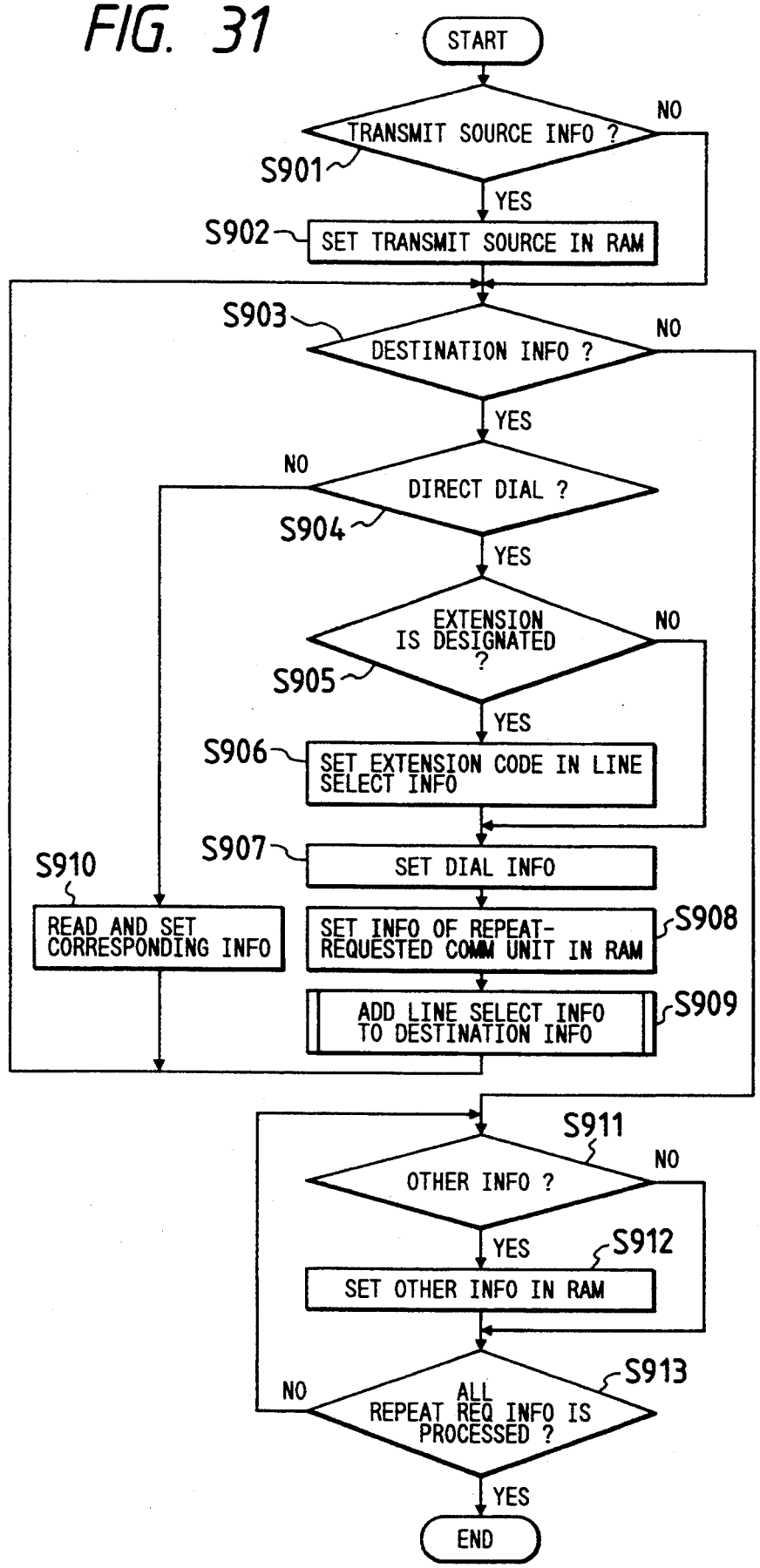
FIG. 31 is a flowchart of processes of generating a communication job in response to a repeating function requirement.
Figure 32:
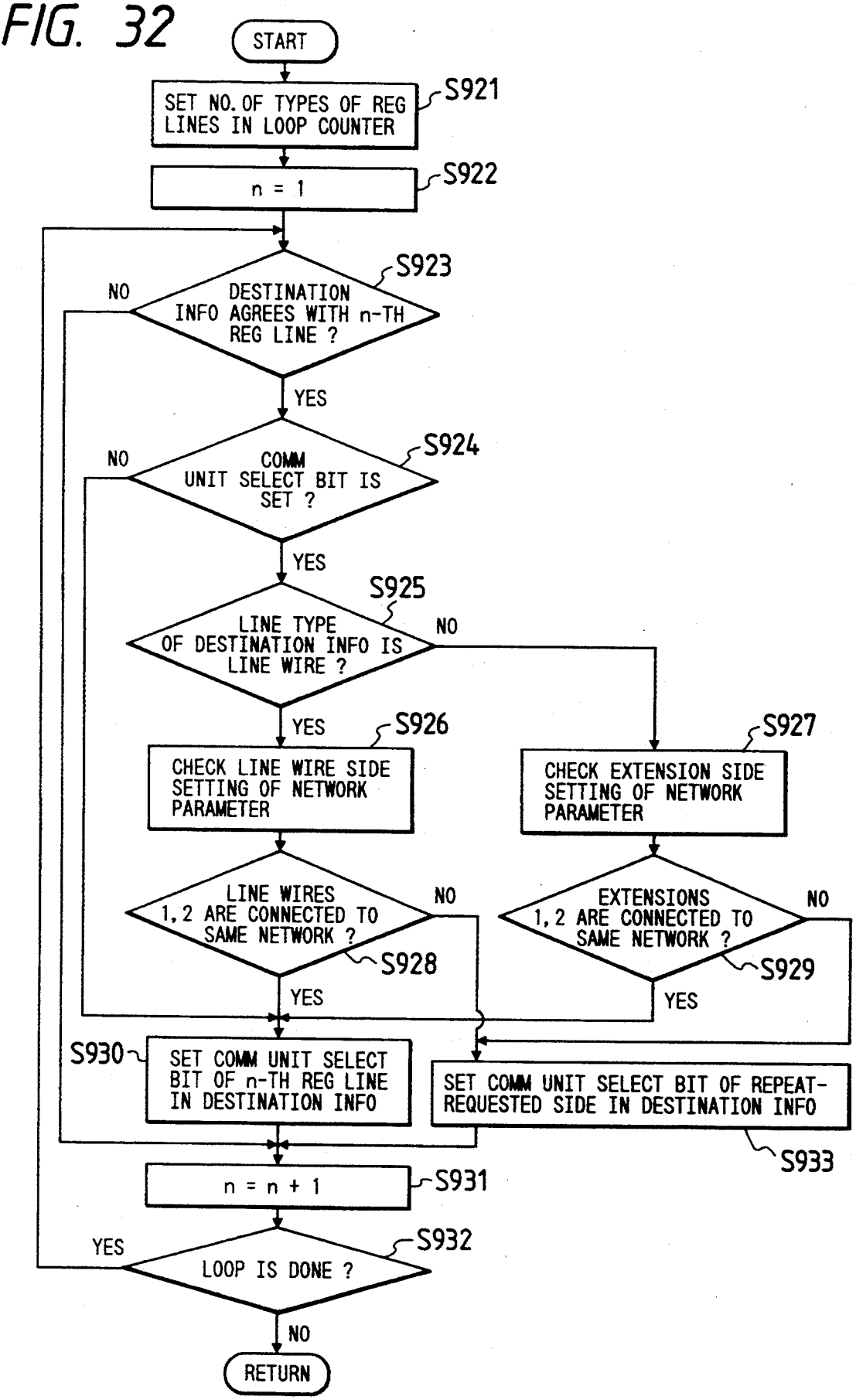
FIG. 32 is a flowchart of processes of setting CCBSEL information.

With reference to FIG. 31, when transmission source information is received, the received information is set to the JIB (steps S901 and S902). Next, a check is made as to whether each of pieces of the destination information agrees with direct dial information or shortened dial information (a step S904). In the case of shortened dial information, preset destination information containing the CCBSEL related to the destination is stored in the hard disk device 116, and the destination information is read out from the hard disk device 116 and is then set (a step S910).

In the case of direct dial information, the direct dial information is set into the JIB. Furthermore, in the case of an extension, an extension code is set (steps S905 to S907). In addition, information related to the communication unit receiving a repeating function requirement in the CCBSEL of the present destination is previously stored into the RAM 111 (a step S908). Next, the CCBSEL is set at a step S909.

Similar processes are executed on later and last destinations (a step S903, NO). When other identification information is present, this information is set into the JIB (steps S911 to S913).

Figure 33:
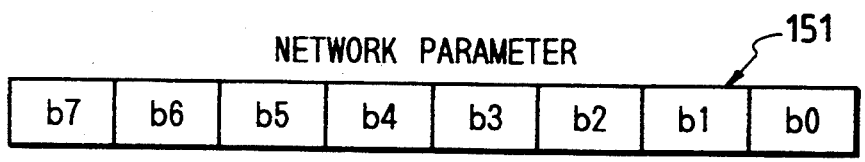
FIG. 33 is a diagram showing the bit structure of a network parameter.

The step S909, that is, the subroutine of FIG. 32, executes the following processes for each destination. First, the total number of different types of the registered lines is set to a loop counter (a step S921). While "n" is incremented from "1" to more than the number set in the loop counter one by one, the following steps are executed. In the case where the destination information corresponds to the type of the n-th registered line and thus corresponds to a line wire (steps S923, S924, and S925, YES), the setting of the line wire side of a network parameter 151 (corresponding to the registered contents shown in FIG. 22) shown in FIG. 33 is referred to (a step S926). When the line wire "1" and the line wire "2" are connected to the same network (a step S928, YES) or when the communication unit selecting information bit is not set (a step S924, NO), the bit of the CCBSEL which corresponds to the n-th registered line (line wire) is set to "1" (a step S930). In the case where destination information corresponds to an extension (the step S925, NO), the setting of the extension side of the network parameter 151 is referred to (a step S927). When the extension "1" and the extension "2" are connected to the same network (a step S929, YES), the bit of the CCBSEL which corresponds to the n-th registered line is similarly set to "1" (the step S930). In the case where the extension "1" and the extension "2" are not connected to the same network (the step S928, NO), the communication unit selecting bit is set to the destination information in accordance with the information stored in the RAM 111 which relates to the communication unit.

As shown in FIG. 33, the network parameter 151 has bits b0 to b7. The bit b0 being "0" represents that the line wire of the CCBch1 is used for both transmission and reception. The bit b0 being "1" represents that the line wire of the CCBch1 is used for only reception. The bit b1 being "0" represents that the extension of the CCBch1 is used for both transmission and reception. The bit b1 being "1" represents that the extension of the CCBch1 is used for only reception. The bit b2 being "0" represents that the line wire of the CCBch2 is used for both transmission and reception. The bit b2 being "1" represents that the line wire of the CCBch2 is used for only reception. The bit b3 being "0" represents that the extension of the CCBch2 is used for both transmission and reception. The bit b3 being "1" represents that the extension of the CCBch2 is used for only reception. The bit b4 being "0" represents that the networks of the line wire sides are of the same type. The bit b4 being "1" represents that the networks of the line wire sides are of different types respectively. The bit b5 being "0" represents that the networks of the extension sides are of the same type. The bit b5 being "1" represents that the networks of the extension sides are of different types respectively.

DESCRIPTION OF THE SECOND PREFERRED EMBODIMENT

An image communication apparatus according to a second embodiment of this invention has a hardware structure similar to the hardware structure of FIG. 1. To more efficiently process communication, the image communication apparatus of the second embodiment has additional features including additional functions, modified control procedures, and modified processing steps. Specifically, the additional features concern the following factors:

(a) communication priority control;
(b) prevention of multiple calls to destination in communication;
(c) automatic transfer of received image information.

FIGS. 34 to 38 show the entire flow of controlling and processing steps executed by a system controller 110 which corresponds to the flowchart of FIGS. 8 to 12. The flowchart of FIGS. 34 to 39 differs from the flowchart of FIGS. 8 to 12 in points described hereinafter.

Figure 34:
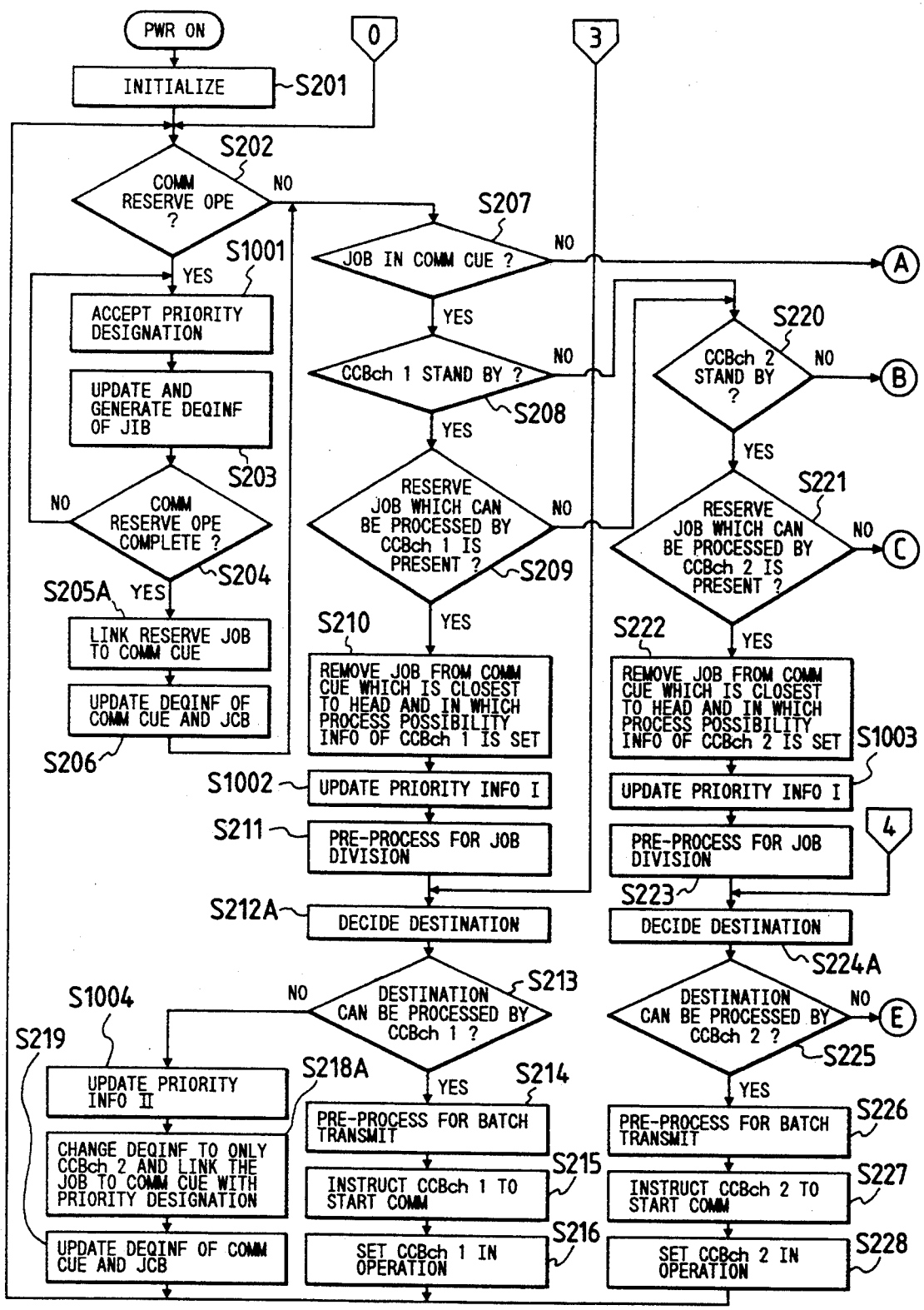
FIGS. 34–38 are a flowchart of the entire processing operation of an image communication apparatus according to a second embodiment of this Invention.
Figure 35:
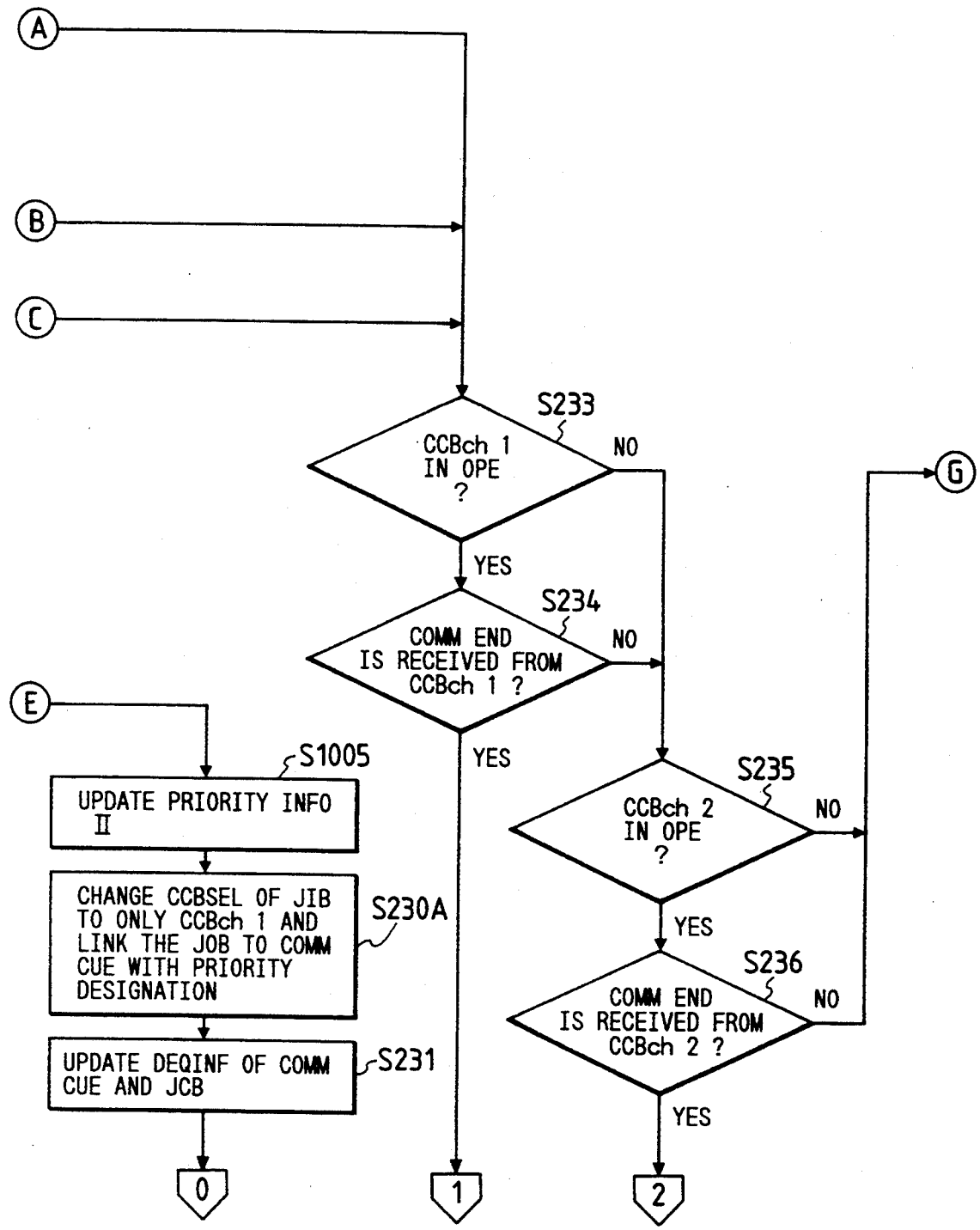
Figure 36:
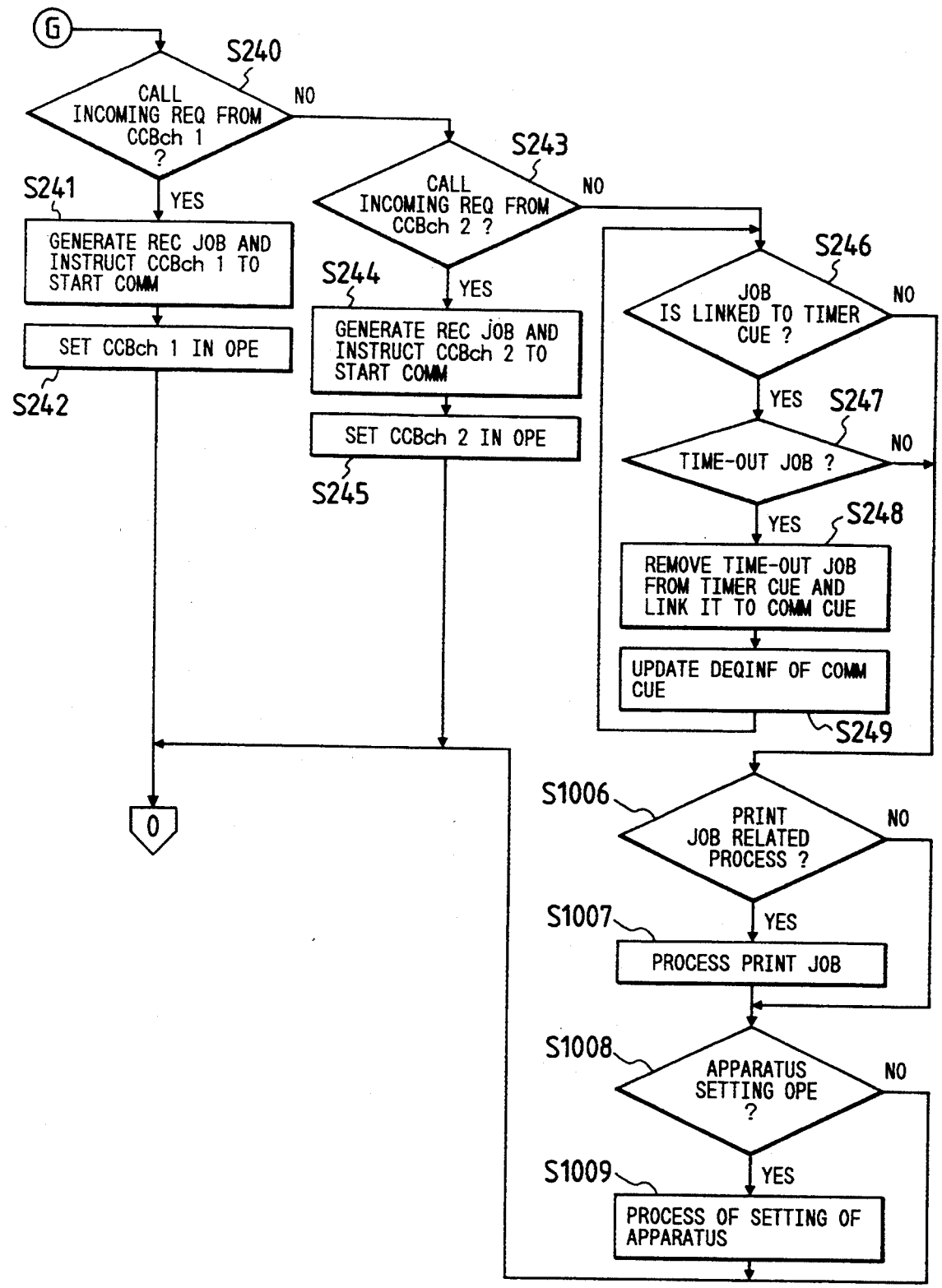
Figure 37:
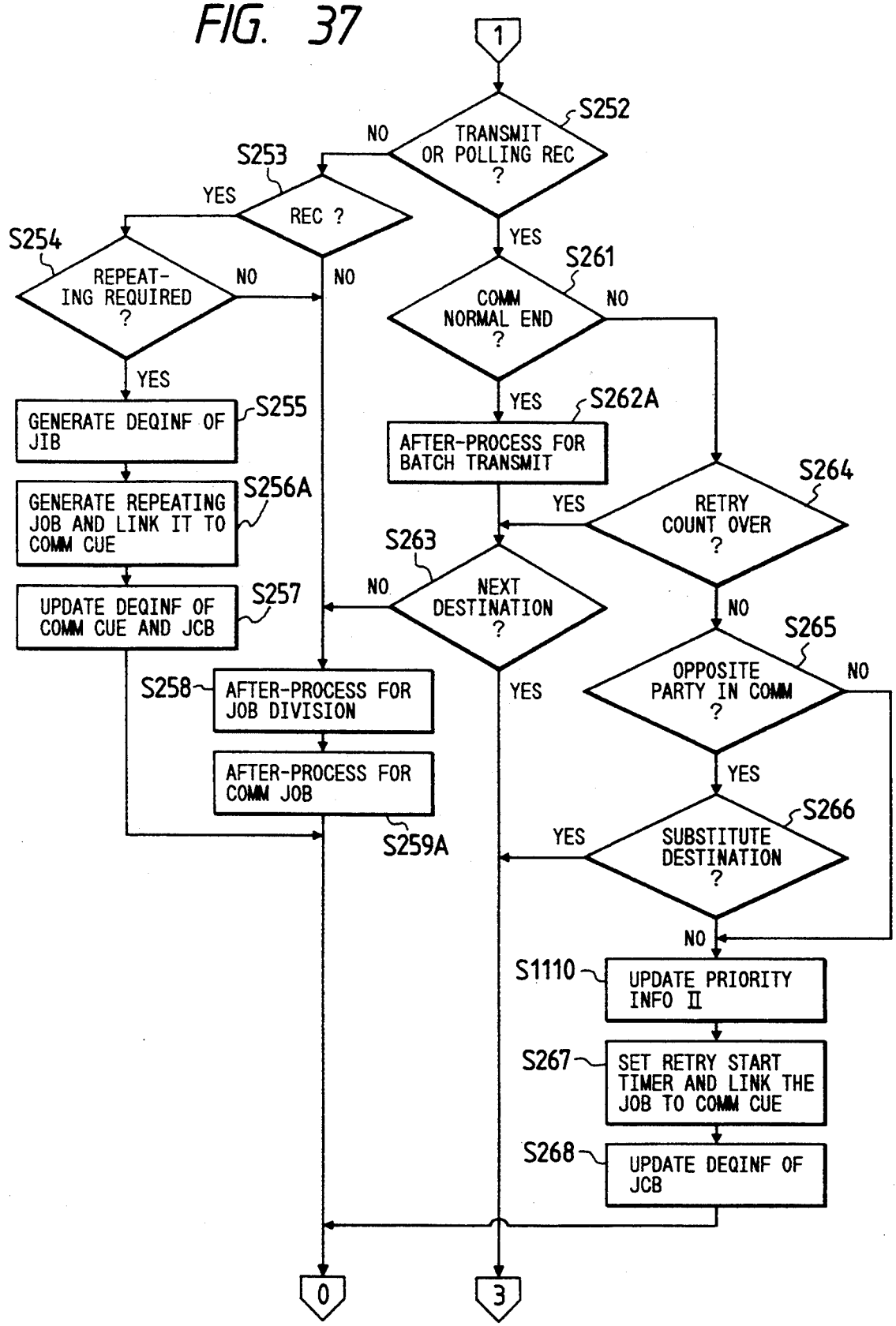
Figure 38:
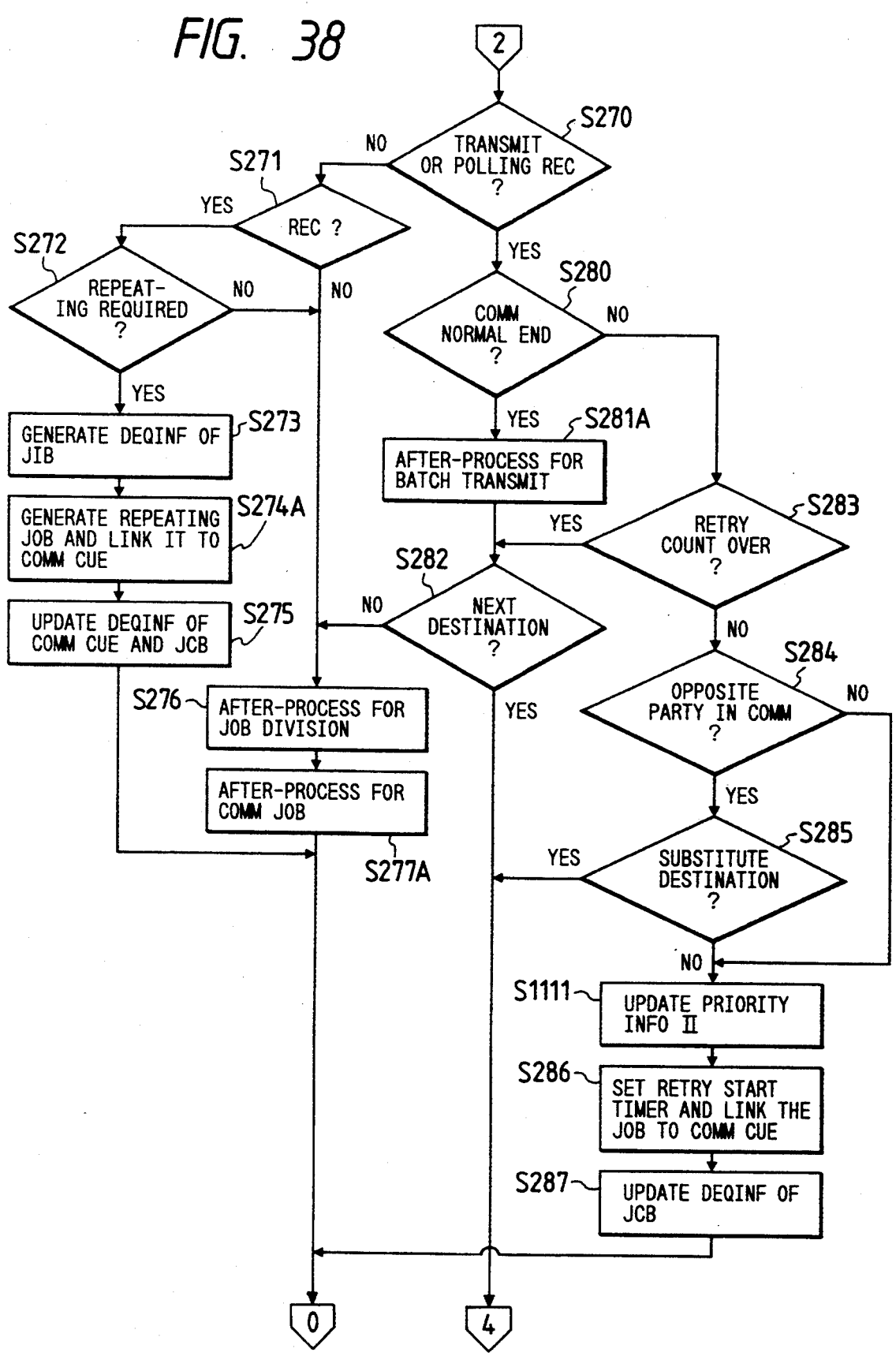

In FIG. 34, the characters S1001, S1002, S1003, and S1004 denote added processing steps. In addition, processing steps S205A, S212A, S218A, and S224A agree with modifications of the processing steps S205, S212, S218, and S224 of FIG. 8 respectively. In FIG. 35, the character S1005 denotes an added processing step. In addition, a processing step S230A agrees with a modification of the processing step S230 of FIG. 9. In FIG. 36, the characters S1006–S1009 denote added processing steps. In FIG. 37, the character S1110 denotes an added processing step. In addition, processing steps S256A, S259A, and S262A agree with modifications of the processing steps S256, S259, and S262 of FIG. 11. In FIG. 38, the character S1111 denotes an added processing step. In addition, processing steps S274A, S277A, and S281A agree with modifications of the processing steps S274, S277, and S281 of FIG. 12.

Figure 39:
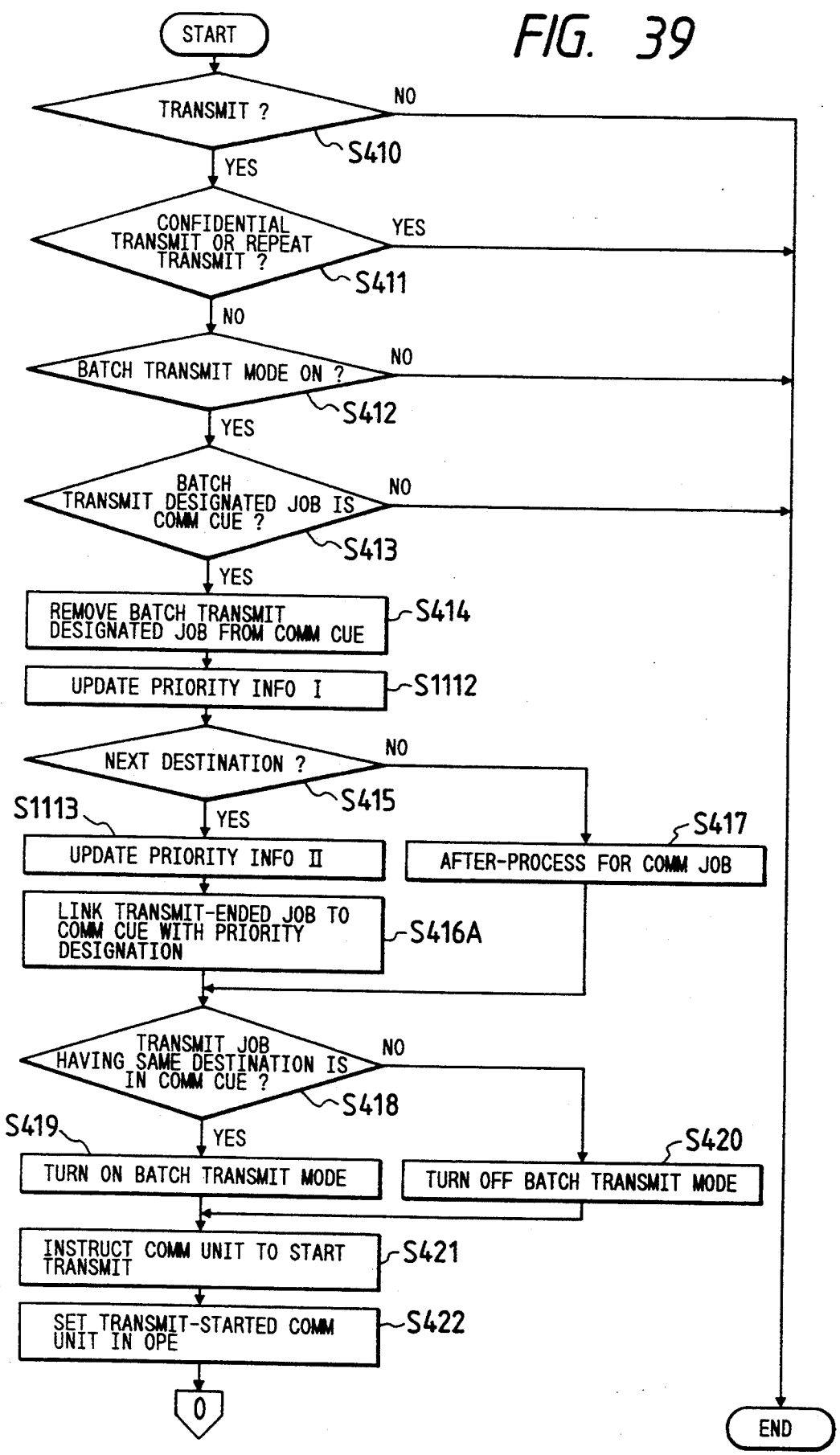
FIG. 39 is a flowchart of after-processes concerning batch transmission.

FIG. 39 shows a flowchart of after-processes for batch transmission which corresponds to the flowchart of FIG. 16. In FIG. 39, the characters S1112 and S1113 denote added processing steps. In addition, a processing step S416A agrees with a modification of the processing step S416 of FIG. 16. The contents of the modifications of the processing will be described hereinafter.

Communication Priority Control (Summary)

Figure 40:
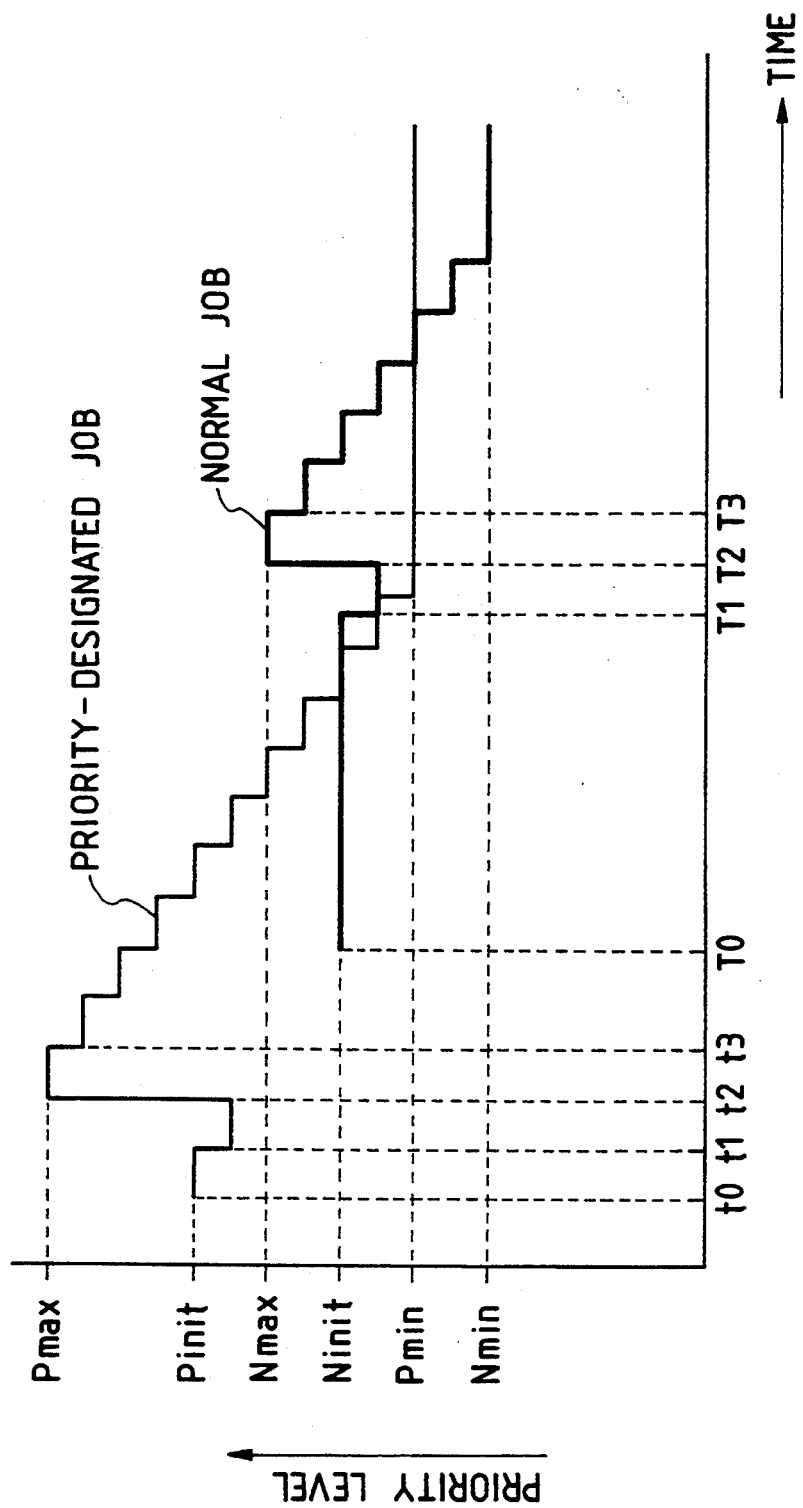
FIG. 40 is a time-domain diagram showing variations in a priority level.

First, a summary of communication priority control will be described. FIG. 40 shows conditions of a time-domain variation in the priority level of a communication job. The priority level means the degree of priority a communication job of interest has over other communication jobs during the processing thereof. A higher priority level means a higher priority degree.

As will be explained later, the operator can designate priorities to respective communication jobs during communication reservations. A communication job given priority designation is linked to the communication cue (at a moment to of FIG. 40) with a priority level "Pinit". During a subsequent period, when the priority-designated job is removed from the communication cue for the first time, the related priority level is decreased by one rank (at a moment t1 of FIG. 40). When a destination is occupied or a communication error occurs and thus communication can not be completed so that the priority-designated job is re-linked with the communication cue for the first time, or when a next destination remains regarding a job of transmitting equal information to a plurality destinations and thus the job is re-linked to the communication cue for the first time, the priority level is increased to the priority designation maximum level "Pmax" (at a moment t2 of FIG. 40). During a later period (after a moment t3 of FIG. 40), the priority level is decreased by one rank each time the priority-designated communication job Is removed from the communication cue. The priority level of the priority-designated communication job is prevented from being decreased below the minimum level "Pmin".

At first, a normal communication job which does not undergo priority designation is linked to the communication cue (at a moment TO of FIG. 40) with a priority level "Ninit". When the normal communication job is removed from the communication cue for the first time, the related priority level is decreased by one rank (at a moment T1 of FIG. 40). When communication fails and thus the normal communication job is re-linked to the communication cue or the timer cue for the first time, or when a next destination remains regarding a job of transmitting equal information to a plurality destinations and thus the job is re-linked to the communication cue for the first time, the priority level is increased to the maximum level "Nmax" (at a moment T2 of FIG. 40). During a later period (after a moment T3 of FIG. 40), the priority level is decreased by one rank each time the normal communication job is removed from the communication cue. The priority level of the normal communication job is prevented from being decreased below the minimum level "Nmin".

The priority levels "Pinit", "Pmax", "Pmin", "Ninit", "Nmax", and "Nmin" are set by the operator during the setting of the system. Details of the priority control will be explained hereinafter.

(Priority Designation Acceptance)

Figure 41:
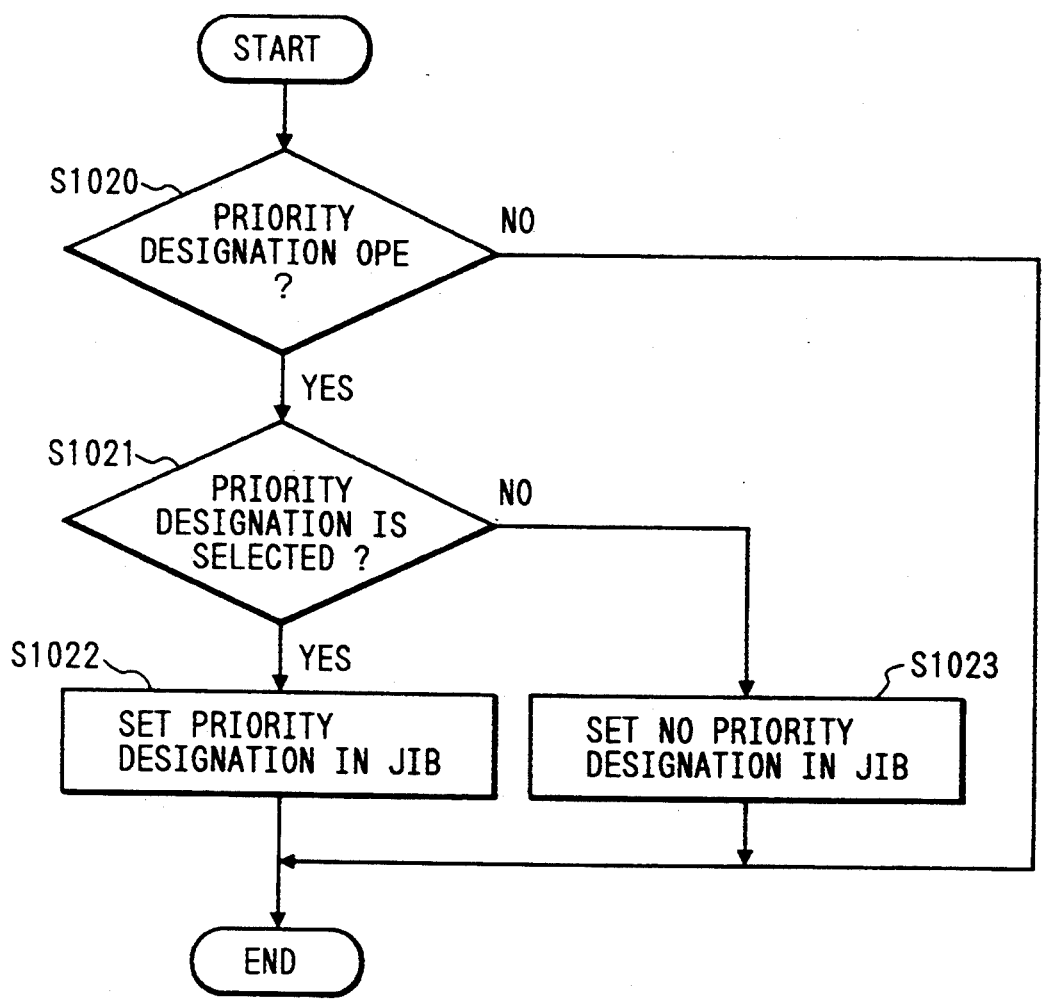
FIG. 41 is a flowchart of processes of accepting priority designation.

In the case where the operator performs operation of communication reservations, a priority designation accepting process (the step S1001 of FIG. 34) is executed. The details of the priority designation accepting process are shown in FIG. 41.

First, a check is made as to whether or not operation of priority designation is executed (a step S1020). When operation of priority designation is not executed (the step S1020, NO), nothing is done.

In the case where operation of priority designation is executed (the step S1020, YES), when the contents of the operation by the operator agree with the presence of priority designation (a step S1021, YES), a given flag is set to "1" which indicates the presence of priority designation (a step S1022). The given flag is equal to the highest bit b7 of 1-byte PRIOR_FLG in priority job control information of the JIB of a reservation job. Thereby, the reserved communication job is handled as a priority-designated job. On the other hand, when priority designation is absent, the bit b7 of PRIOR_FLG is set to "0" which indicates the absence of priority designation (a step S1023).

Furthermore, in the presence of priority designation, 1-byte PRIOR_LEVEL in the priority job control information of the reservation job is set to "Pinit". In the absence, of priority designation, the PRIOR_LEVEL is set to "Ninit".

(Communication Job Cuing)

Figure 42:
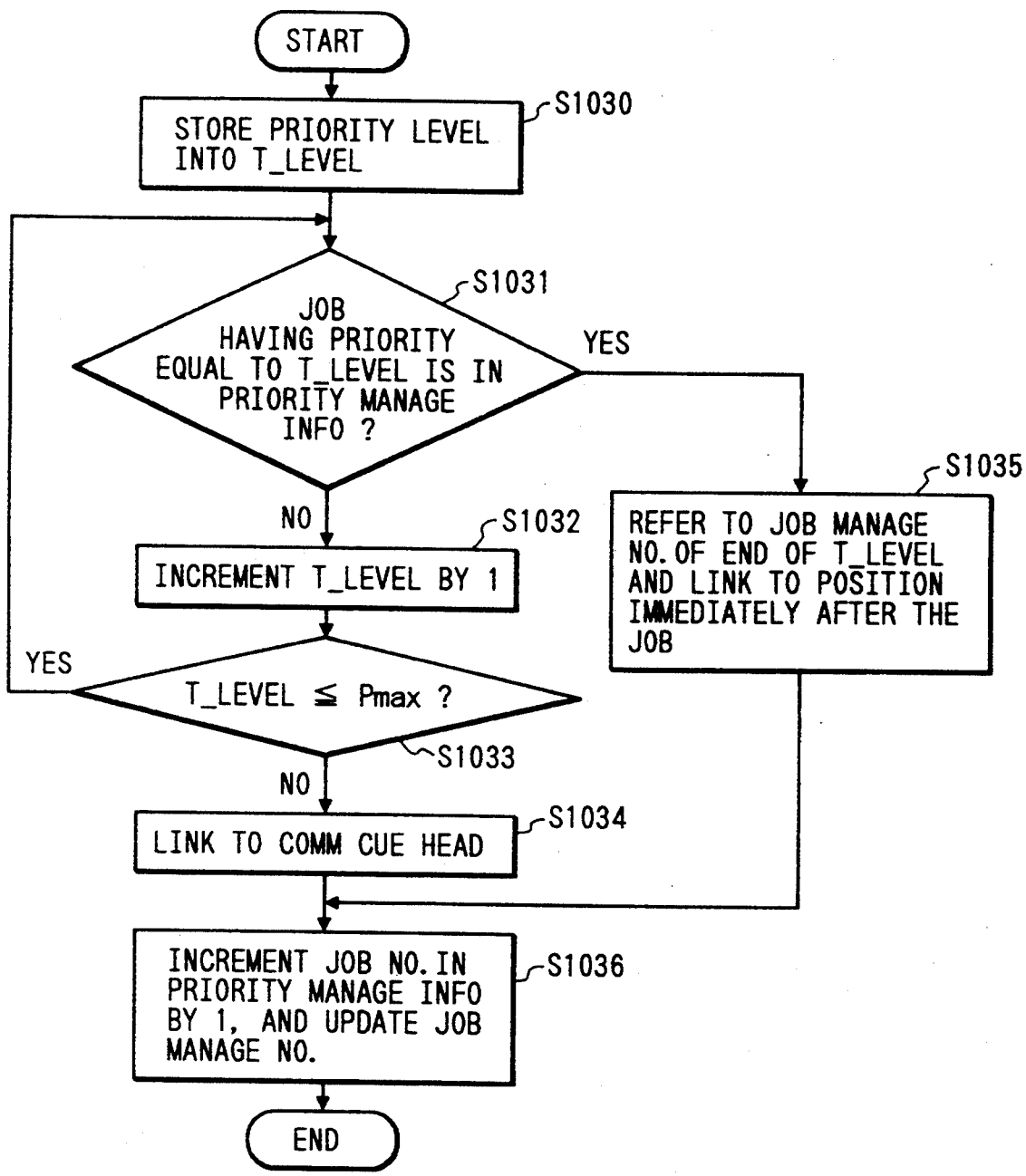
FIG. 42 is a flowchart of priority linking processes.

When communication reservations are completed, the reserved communication job is linked to the communication cue with an order according to the priority level thereof (the step S205A). The details of this process are shown in FIG. 42.

First, the priority level ("Pinit" or "Ninit") of a communication job which will be linked to the communication cue, that is, a communication job which occurs immediately after reservations, is stored into an area T_LEVEL of the RAM 111 (a step S1030). By referring to the priority job management information in the communication cue management table (CUQM) 132, a check is made as to whether or not the communication cue has a job of a priority level equal to the priority level T_LEVEL (a step S1031). In the case where the communication cue has a job of a priority level equal to the priority level T_LEVEL (the step S1031, YES), the priority job management information in the CUQM is referred to and the present communication job is linked to a position of the communication cute which immediately follows the last communication job of the priority level (a step S1035). Then, the number of the jobs of the priority level in the priority job management information is incremented by "1", and the end job management number is updated (a step S1036).

In the case where the communication cue does not have a job of a priority level equal to the priority level T_LEVEL (the step S1031, NO), the value T_LEVEL is incremented by "1" (a step S1032) and then a check is made again as to whether or not the communication cue has a job of a priority level equal to the priority level T_LEVEL (the step S1031) . In the case where a job of a priority level equal to the priority level T_LEVEL can not be found in the communication cue even when the priority level T_LEVEL exceeds the maximum level "Pmax" (a step S1033, NO), the job (the reservation job) which will be linked to the communication cue has a priority level higher than the priority levels of any jobs in the communication cue. Thus, In this case, the present job is linked to the head of the communication cue (a step S1034), and the priority job management information is updated commensurately (a step S1036).

(First Priority Information Updating Process)

Figure 43:
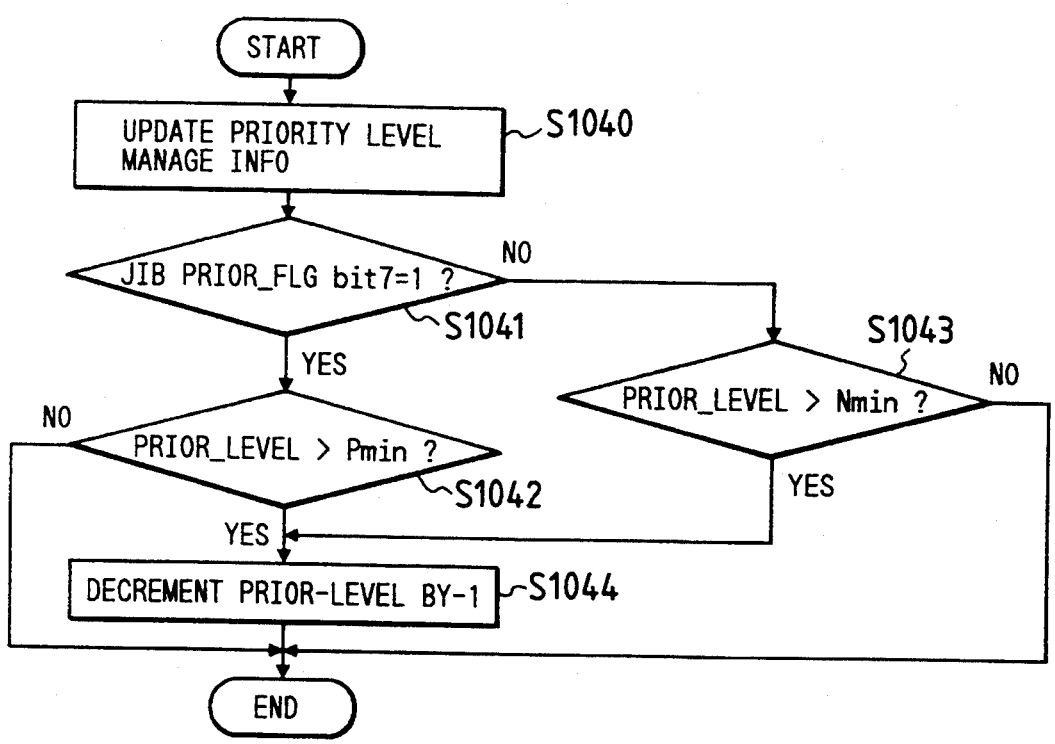
FIG. 43 is a flowchart of a first priority information updating process.

In the case where a communication job which will be processed by the CCBch1 or the CCBch2 is removed from the communication cue (the step S210 or S222 of FIG. 34), a first priority information updating process is executed (steps S1002 and S1003). The contents of this process are shown in FIG. 43.

First, with respect to the priority job management information of the CUQM, the job number and the end job management number are updated in connection with the priority level of a de-cued communication job (a step S1040). Next, a check is made as to whether or not the highest bit b7 of PRIOR_FLG of the JIB of the present communication job is "1" (indicating the presence of priority designation).

In the case where the bit b7 is "1" (a step S1041, YES), only when the priority level of the present job, that is, the priority level PRIOR_LEVEL in the JIB, is greater than "Pmin" (a step S1042, YES), the priority level is decreased by "1" (a step S1044). In the case where the bit b7 is "0" (the step S1041, NO), only when the priority level of the present job is greater than "Nmin" (a step S1043, YES), the priority level is decreased by "1" (the step S1044).

The after-processes (the step S262A of FIG. 37, and the step S281A of FIG. 38) regarding batch transmission are shown in FIG. 39. During these after-processes, the first priority information updating process is executed (a step S113) when a communication job is de-cued.

(Second Priority Information Updating Process)

Figure 44:
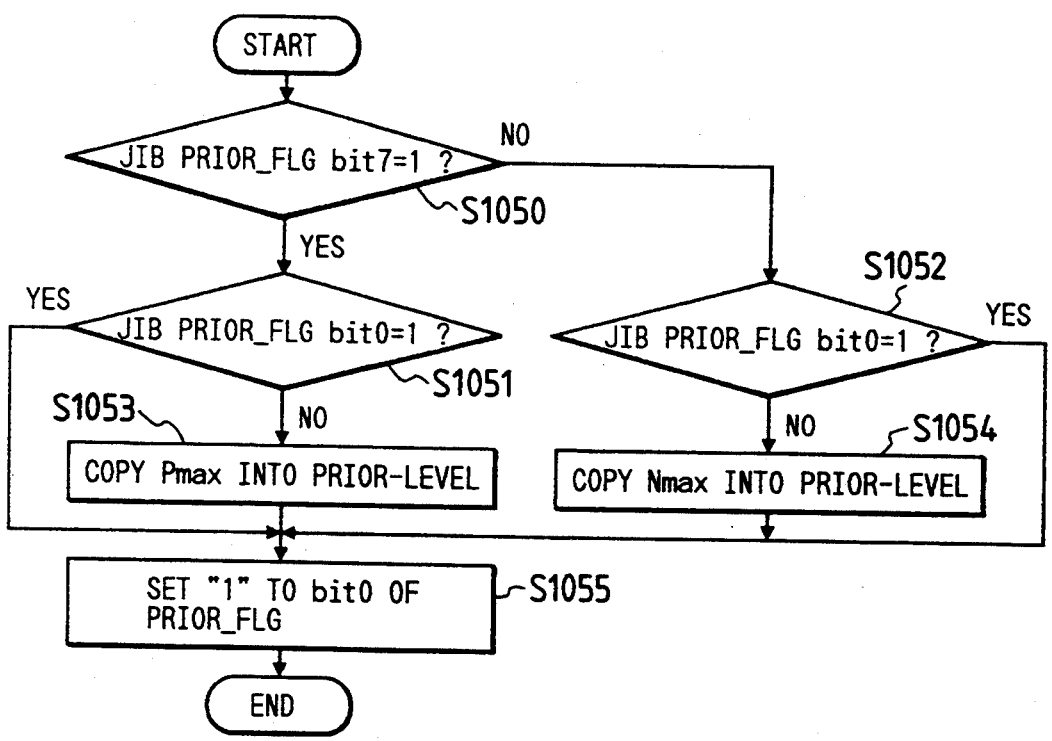
FIG. 44 is a flowchart of a second priority information updating process.

In the case where communication with a selected destination regarding a de-cued communication job via the CCBch1 or the CCBch2 is impossible or the destination is occupied so that communication therewith fails, or in the case where the result of the decision in the step S415 regarding the batch transmission after-process is YES, a second priority information updating process is executed (steps S1004, S1005, S1110, S1111, and S1113). The contents of this process are shown in FIG. 44.

When the highest bit b7 of PRIOR_FLG of the priority job control information in the JIB of a communication job of interest is "1" indicating the presence of priority designation (a step S1050, YES), a check is made as to whether or not the lowest bit b0 of PRIOR_FLG is "1" (a step S1051). When the bit b0 is not "1" (the step S1051, NO), "Pmax" is copied into PRIOR_LEVEL of the priority job control information in the JIB. In other words, the priority level of the present communication job is increased to the maximum level which occurs when priority designation is present. Then, the bit b0 of PRIOR_FLG is set to "1" (a step S1055). In the case where the bit b0 of PRIOR_FLG is already "1" (the step S1051, YES), the priority level was increased to the maximum level, and thus the priority level is avoided from being increased.

In the case where the present communication job does not undergo priority designation (the step S1050, NO), when the bit b0 of PRIOR_FLG of the priority job control information in the JIB thereof is "0" (a step S1052, NO), "Nmax" is copied into PRIOR_LEVEL. In other words, the priority level of the present communication job is increased to the maximum level which occurs when priority designation is absent (a step S1054). Then, the bit b0 of PRIOR_FLG is set to "1" (a step S1055).

Prevention of Multiple Calls to Destination it Communication

Figure 45:
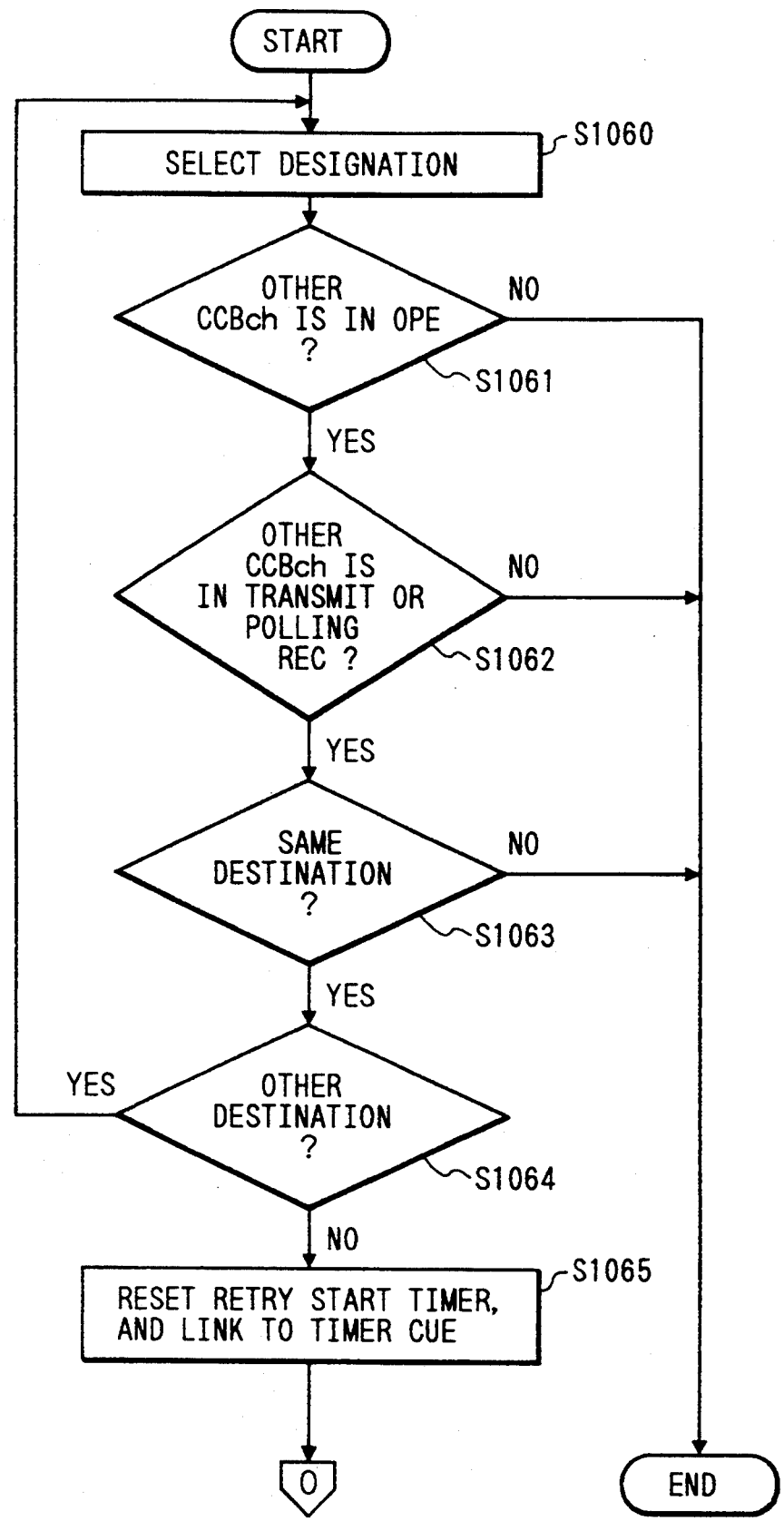
FIG. 45 is a flowchart of processes of determining a communication destination.

There are two channels corresponding to the communication units 101 (the CCBch1 and the CCBch2). When one of the channels is in connection with a destination for transmission or polling reception, communication with the same destination via the other channel is impossible. Control for preventing multiple calls to such a communication-impossible destination is executed by processing steps S212A and S224A. The details of these processing steps are shown in FIG. 45.

With respect to a communication job which will be processed by the CCBch1, the communication destination information of the JIB thereof is referred to and thereby one destination is selected from its head (a step S1060). When the status of the CCBch2 is different from "in operation" (a step S1061, NO), this process is ended and the currently-selected destination is used as a finally-selected destination. Thus, a call is given to the finally-selected destination, and the communication job is processed.

In the case where the status of the CCBch2 is "in operation" (the step S1061, YES) and communication via the CCBch2 differs from both transmission and polling reception (a step S1062, NO), it is possible to confirm the communication destination regarding the CCBch2. Thus, the currently-selected destination is used as a finally-selected destination, and a call is given to the finally-selected destination.

When the communication via the CCBch2 agrees with transmission or polling reception (the steps S1061, S1062, YES), the destination of the communication via the CCBch2 is compared with the currently-selected destination (a step S1063). When the destination of the communication via the CCBch2 differs from the currently-selected destination (the step S1063, NO), the currently-selected destination is used as a finally-selected destination and a call is given to the finally-selected destination.

When the destination of the communication via the CCBch2 is equal to the currently-selected destination (the step S1063, YES), it is fruitless to give a call to the currently-selected destination. Thus, when the present communication job has a subsequent destination (a step S1064, YES), the return to the step S1060 is done so that the processing by the step S1061 and later steps are executed.

In the case where the present communication job does not have a subsequent destination (the step S1064, NO), the present communication job can be processed until the communication via the CCBch2 ends. Thus, the processing of the present communication job is interrupted, and a retry start timer is set and the present communication job is linked to the timer cue (a step S1065). In this case, the advance to the next step S213 or S225 is not done, and the return to the step S202 of FIG. 34 is executed.

Automatic Transfer of Received Information

Automatic transfer instructed by a call incoming program enables the following process. In the case where a call incoming from a specified line is received, image information of received documents can be automatically transferred to a specified destination even when the transmission side does not instructs a repeating function in the communication sequence.

(Registration of Call Incoming Program)

Figure 46:
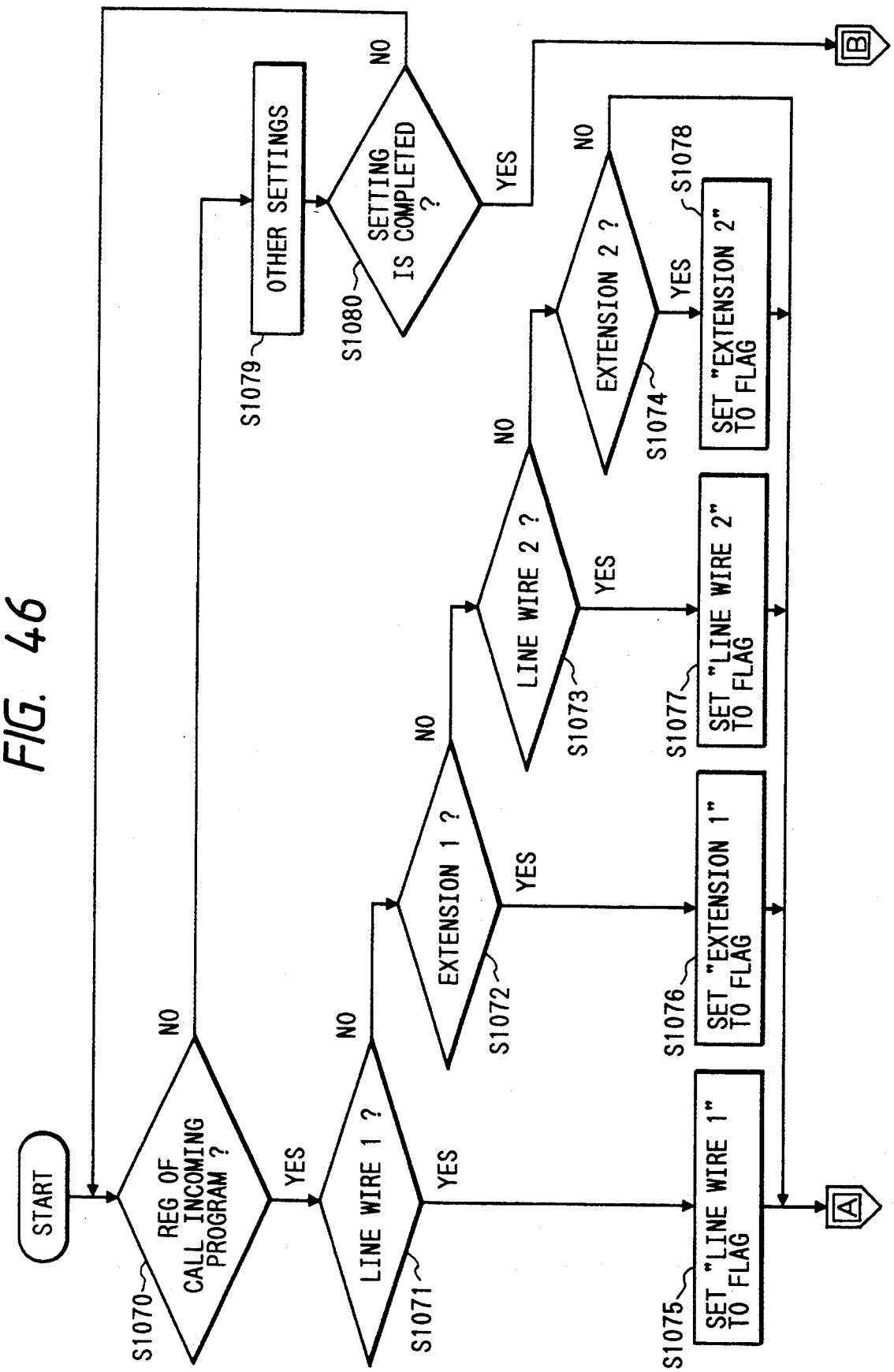
FIGS. 46 and 47 are a flowchart of processes of registering a call incoming program and others.
Figure 47:
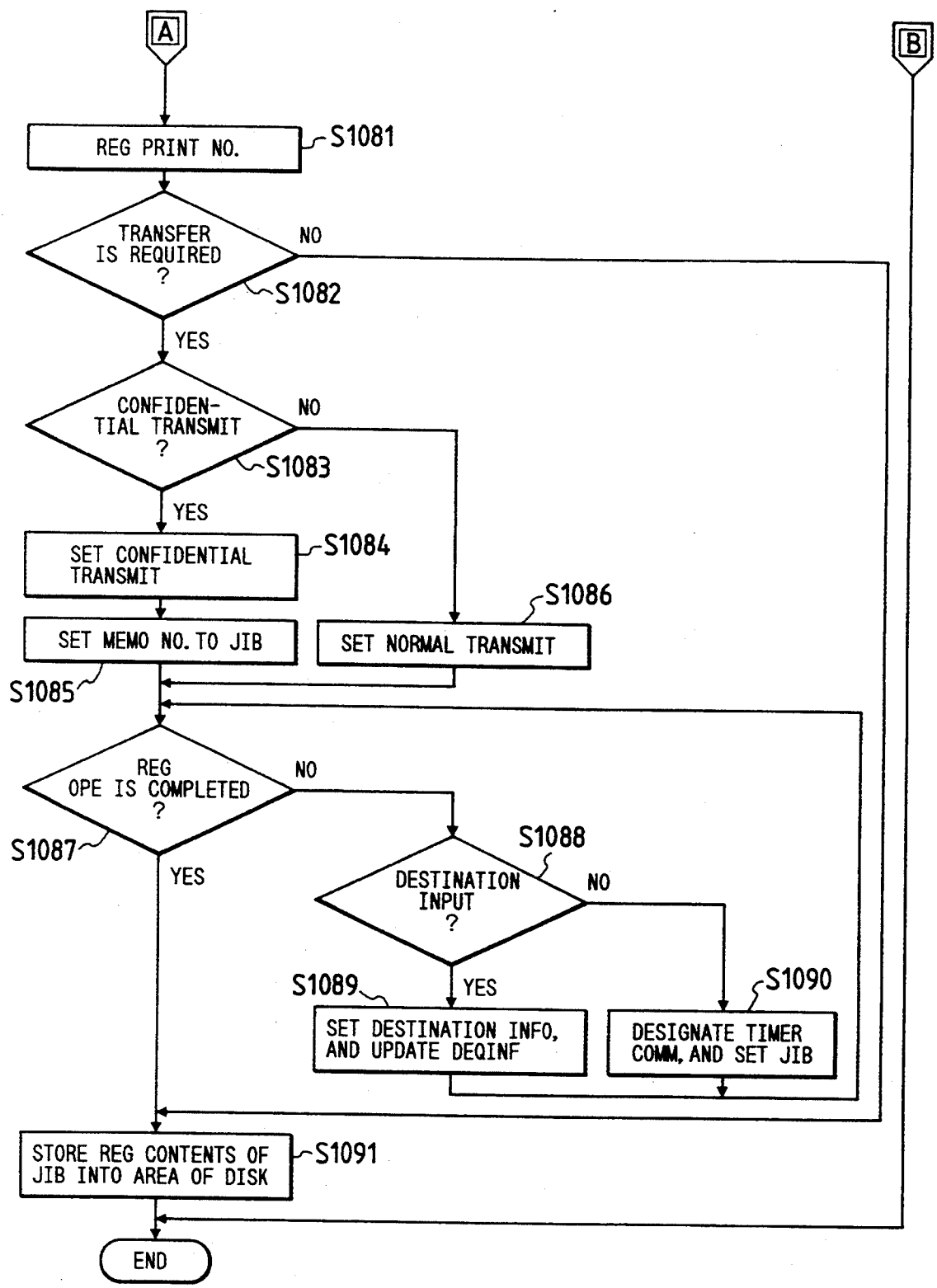

The registration of a call incoming program will now be explained. The registration of a call incoming program can be done when the operator designates a call incoming program setting mode by operating the operation panel 117. This registration process is contained in a processing step S1009 (FIG. 36) for setting various conditions of the apparatus. The contents of the processing step S1109 will be described hereinafter with reference to FIG. 46 and FIG. 47.

In the case of a call incoming program setting mode (a step S1070, YES), a process of registering a call incoming program is started. First, the operator designates the type of a call incoming line, and thus a decision is made as to the line (steps S1071 to S1074). Information representing the decided line is set into a line identification information flag (steps S1075 to S1078).

Next, the operator designates the number of printing received documents, and thus the designated number is registered (a step S1081). The number of printing received documents means the number of printing out received documents in the image communication apparatus. The number of printing received documents can be set to a number in the range of 0 to 99.

Subsequential, the operator designates whether or not the transfer of received documents is necessary. In the case where the operator designates that the transfer of received documents is necessary, the operator designates whether the transfer will be executed by confidential transmission or normal transmission. In the case where transfer designation is present (a step S1082, YES) and the transfer of received documents is accorded with confidential transmission (a step S1083, YES), "confidential transmission" is registered as a job type of the JIB regarding the transfer job (a step S1084). Next, a memorized number inputted by the operator is registered as user management information of the JIB (a step S1085). In the absence of the designation of confidential transmission (the step S1083, NO), "normal transmission" is registered as the job type of the JIB (a step S1086).

Then, the operator executes inputting a destination to which received documents are transferred, timer communication designation, priority designation, print character designation in a transmission source, document size reduction designation, acceptance report print designation, result report print designation, acceptance report transmission designation, result report transmission designation, and report transmission destination designation. Finally, the operator instructs the end of the registering operation. When a destination is inputted (a step S1088, YES), the destination is registered as the communication destination information of the JIB and the DEQINF of the JIB is updated (a step S1089). When timer communication designation or priority designation is inputted (the step S1088, NO), the designation is registered in the JIB (a step S1090).

After such an inputting process is ended and an end of the registering operation is instructed (a step S1087, YES), the registered contents of the JIB of the transfer job are stored into an area in the hard disk device 116 which corresponds to the conditions (the type of the line) of setting of the line identification information flag (a step S1091). Then, the step S1009 is ended.

In the case a setting mode different from the call incoming program registering mode (the step S1070, NO), a process of setting various conditions of the image communication apparatus is executed according to the information inputted by the operator (a step S1079). When an ending instruction is inputted by the operator (a step S1080, YES), the step S1009 is ended.

(Image Information Reception by Call Incoming)

Figure 48:
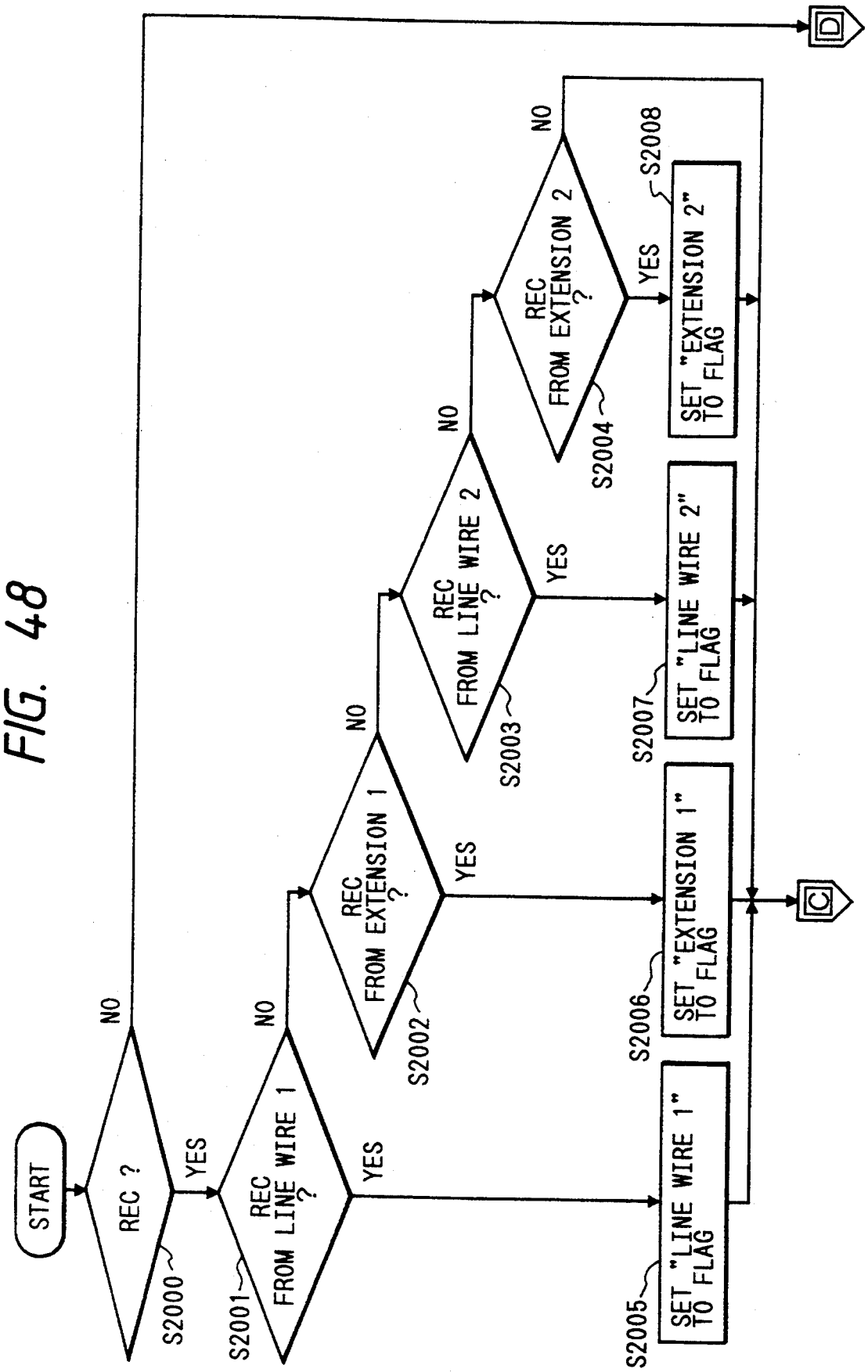
FIG. 48 and 49 are a flowchart of after-processes concerning a communication job.
Figure 49:
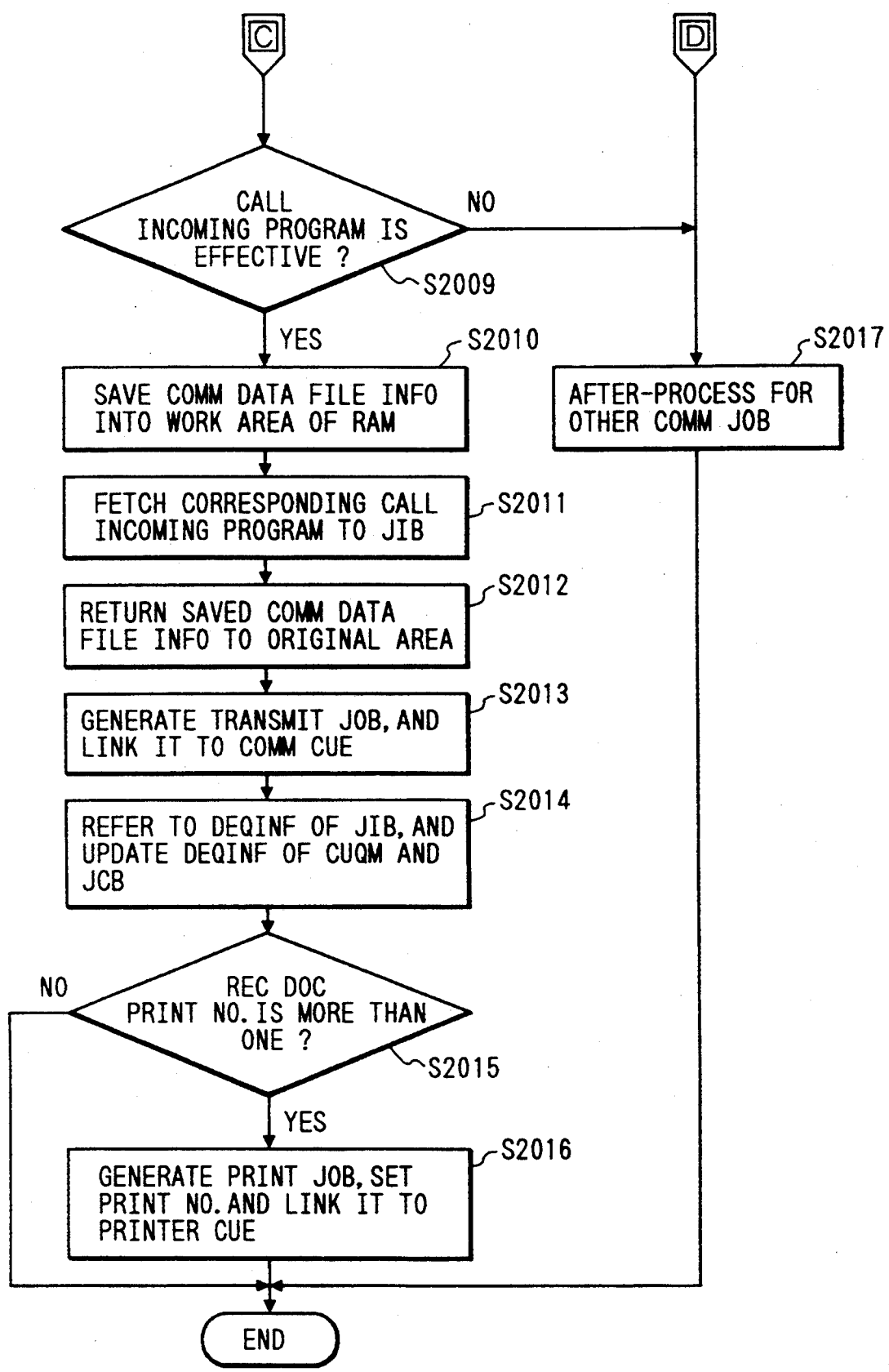

Next, a process of transferring received documents will be explained hereinafter. This process is contained in the step S259A (FIG. 37) and the step S277A (FIG. 38) which agree with after-processes regarding a communication job. The contents of these after-process steps are shown in FIG. 48 and FIG. 49.

First, a decision is given of whether or not a call incoming relates to reception (a step S2000). It should be noted that the reception means reception by a call incoming from an external device.

In the case where a call incoming relates to reception (the step S2000, YES), a decision is given of the line relating to the call incoming (steps S2001 to S2004) and the decided line is set into the line identification information flag (steps S2005 to S2008). Next, a check is made as to whether or not the call incoming line is a line which is registered as a transfer-designation line by the call incoming program (a step S2009).

When the call incoming line is a transfer-designated line (the step S2009, YES), the reception data file information in the JIB (provided on the RAM 111) of the reception job is saved and stored into a work area on the RAM 111 (a step S2010). In addition, the contents of the call incoming program corresponding to the call incoming line are read out from the area of the hard disk device 116 which corresponds to the contents of the line identification information flag, and are then transmitted to the area of the JIB (a step S2011). The saved communication data file information of the reception job is returned to the original area of the JIB (a step S2012). Then, a job of confidential transmission for transfer is generated when the registration of confidential transmission is present, or a job of normal transmission is generated when the registration of confidential transmission is absent. The generated transmission job is linked to the communication cue (a step S2013). By referring to the DEQINF information in the JIB, the DEQINF of the CUQM and the JCB are updated (a step S2014).

During a later period, the confidential transmission job or the normal transmission job which is generated and linked to the communication cue in this way is de-cued and executed. Thereby, the image information of the received documents is transferred to one or more specified destinations registered by the call incoming program through the confidential transmission or the normal transmission.

Finally, when the number of printing the received image which is registered in the call incoming program is one or greater (a step S2015, YES), a print job regarding the received image information is generated. In addition, the print number designated in the JIB thereof is set and is linked to the printer cue (a step S2016). This print job is de-cued at the step S1007 (FIG. 36), and is thus executed.

On the other hand, in the case where the call incoming line is not a transfer-designated line (the step S2009, NO), other after-processes are executed (a step S2017).

Print Job Processing

Figure 50:
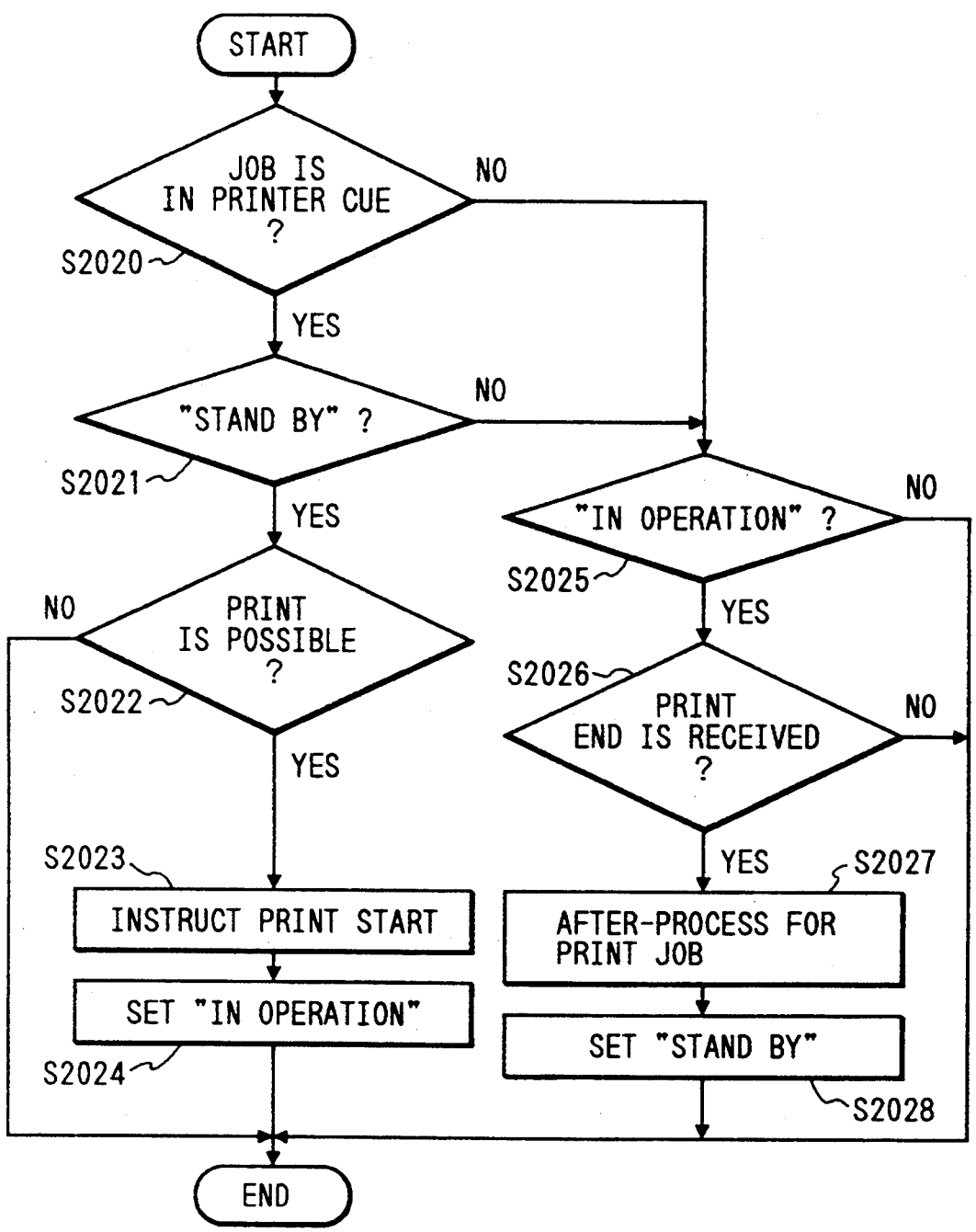
FIG. 50 is a flowchart of print job processing.

Next, a process executed by a step S1007 of FIG. 36 will be explained. FIG. 50 is a flowchart of the details of this process.

In the case where the presence of a print job in the printer cue is confirmed (a step S2020, YES), when the print status is "stand-by" and the laser beam printer 113 can print information (steps S2021 and S2022, YES), the print job is de-cued and the printer controller 114 is instructed to start printing (a step S2023). In addition, the print status is set to "in operation" (a step S2024). At the same time, the print number registered by the call incoming signal is designated.

In the case where a pint job is absent from the printer cue (the step S2020, NO) or in the case where a print job is present in the printer cue but the print status differs from "stand by" (the step S2021, NO), the pint status is checked (a step S2025). When the print status differs from "in operation", nothing is done. When the print status is "in operation" but a signal indicative of print end has not yet received from the printer controller 114 (a step S2026, NO), nothing is done. In the case where a signal indicative of print end has received from the printer controller 114 (the step S2026, YES), after-processes concerning the print job are executed (a step S2027) and the print status is returned to "stand by" (a step S2028).

What is claimed is:

1. An image communication apparatus comprising:
a plurality of different types of communication units each connectable to lines of different types so different ones of the communication units are connectable only to certain of said lines with which they are compatible, at least one of the units being connected to a line for only receiving information signals and at least another of the units being connected to a line for transmitting and receiving information signals;
an operating portion responsive to operator arbitrary settings for uses of the lines, said operator arbitrary settings including an exclusive reception use and a reception and transmission dual use;
a recording portion responsive to the operating portion for registering the communication units as different types respectively on the basis of said settings of the uses;
a display portion for selecting and displaying one of plural representations of communication conditions of the respective communication units; and
a control portion responsive to the recording portion registering that communications of the same type are to be simultaneously executed by the communication units for controlling the display portion to select and display a representation of communication conditions of a communication unit having the most recent communication starting time.

2. An image communication apparatus comprising:
a plurality of different types of communication units each connectable to lines of different types so different ones of the communication units are connectable only to certain of said lines with which they are compatible, at least one of the units being connected to a line for only receiving information signals and at least another of the units being connected to a line for transmitting and receiving information signals;
an operating portion responsive to operator arbitrary settings of uses of the lines, said operator arbitrary settings including an exclusive reception use and a reception and transmission dual use;
a recording portion responsive to the operating portion for registering the communication units as different types respectively on the basis of said settings of the uses;
a display portion for selecting and displaying one of plural representations of communication conditions of the respective communication units; and
a control portion responsive to the recording portion registering that communications of different types are to be simultaneously executed by different ones of the communication units for controlling the display portion to select and display a representation of communication conditions of a communication unit which is currently executing the transmission.

3. An image communication apparatus comprising:
a plurality of different types of communication units each connectable to lines of different types so different ones of the communication units are connectable only to certain of said lines with which they are compatible, at least one of the units being connected to a line for only receiving information signals and at least another of the units being connected to a line for transmitting and receiving information signals;
an operating portion for performing operations related to communications using the communication units, said operating portion responding to arbitrary settings for uses of the communication units, said operator arbitrary settings including an exclusive reception use and a reception and transmission dual use;
a display portion for selectively displaying representations of communication conditions of the respective communication units or representation of other conditions; and
a control portion responsive to the operating portion indicating telephone reservations are to be coupled to the lines for (a) accepting the telephone reservations via one of the communication units only when conditions of said one communication unit are communicated to and displayed by the display portion and are being currently executed and (b) executing speech communication via said one communication unit after the communication of the accepted telephone represenations ends so the communication units are connected to lines compatible therewith.

* * * * *